US 12,448,909 B2

(12) United States Patent
McCarthy, Jr. et al.

(10) Patent No.: US 12,448,909 B2
(45) Date of Patent: Oct. 21, 2025

(54) SYSTEM AND METHOD TO MAINTAIN HOT AFTERTREATMENT AT ENGINE IDLE

(71) Applicant: Eaton Intelligent Power Limited, Dublin (IE)

(72) Inventors: James E. McCarthy, Jr., Kalamazoo, MI (US); Mihai Dorobantu, Mission Viejo, CA (US); Gary Neely, Boerne, TX (US); Andrew Matheaus, San Antonio, TX (US); Viken Yeranosian, Farmington Hills, MI (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 0 days.

(21) Appl. No.: 18/792,986

(22) Filed: Aug. 2, 2024

(65) Prior Publication Data

US 2024/0392713 A1 Nov. 28, 2024

Related U.S. Application Data

(63) Continuation of application No. 17/486,889, filed on Sep. 27, 2021, now Pat. No. 12,071,884, which is a
(Continued)

(51) Int. Cl.
*F01N 3/20* (2006.01)
*F01N 3/10* (2006.01)
*F02D 41/02* (2006.01)

(52) U.S. Cl.
CPC ............ *F01N 3/2013* (2013.01); *F01N 3/10* (2013.01); *F01N 3/2066* (2013.01); *F02D 41/024* (2013.01); *F01N 2900/1602* (2013.01)

(58) Field of Classification Search
CPC .......... F01N 3/021; F01N 3/10; F01N 3/2013; F01N 3/2066; F01N 9/00; F01N 9/002;
(Continued)

(56) References Cited

U.S. PATENT DOCUMENTS 9,976,462 B2   5/2018   Lutz et al.
10,408,103 B1*  9/2019  Miao .................. B01D 53/9477
(Continued)

FOREIGN PATENT DOCUMENTS

EP   3150814 B1   8/2019
GB   2334903 A    9/1999
(Continued)

OTHER PUBLICATIONS

International Search Report and Written Opinion issued in International Application No. PCT/EP2020/025146, mailed Jul. 21, 2020, 12 pages.

*Primary Examiner* — Dapinder Singh
(74) *Attorney, Agent, or Firm* — Talem IP Law, LLP

(57) ABSTRACT

A transmission system selectively coupled to an engine crankshaft of an internal combustion engine arranged on a vehicle includes a transmission, an aftertreatment system, an accessory device and a controller. The aftertreatment system reduces emissions in an exhaust of the internal combustion engine. The accessory device is configured to provide power. The controller operates in an aftertreatment heat-up mode such that the aftertreatment system is heated up to an elevated temperature and emissions are thereby reduced based on the elevated temperature. The controller is configured to heat up the aftertreatment system to reach between one (1) and two (2) kilowatt hours (kWh) of enthalpy before two minutes at engine startup by (i) operating the internal combustion engine in cylinder deactivation mode (CDA); (ii) operating the internal combustion engine at an elevated idle speed; and (iii) operating the accessory device at a threshold power.

20 Claims, 48 Drawing Sheets

Related U.S. Application Data continuation-in-part of application No. PCT/EP2020/025146, filed on Mar. 25, 2020.

(60) Provisional application No. 63/170,914, filed on Apr. 5, 2021, provisional application No. 63/170,931, filed on Apr. 5, 2021, provisional application No. 63/170,925, filed on Apr. 5, 2021, provisional application No. 63/112,528, filed on Nov. 11, 2020, provisional application No. 62/886,537, filed on Aug. 14, 2019, provisional application No. 62/823,584, filed on Mar. 25, 2019.

(58) Field of Classification Search
CPC ............ F01N 2240/16; F01N 2590/11; F01N 2560/06; F01N 2900/1602; F01N 2900/00; F01N 2900/0602; F01N 2900/08; F01N 2900/10; F01N 2900/12; F01N 2900/14; F01N 2900/1404; F02D 41/0087; F02D 41/024; F02D 41/0255; F02D 2041/026; Y02A 50/20; Y02T 10/12; Y02T 10/40

See application file for complete search history.

(56) References Cited

U.S. PATENT DOCUMENTS

| | | | |
|---|---|---|---|
| 10,571,366 | B2 | 2/2020 | Dudar |
| 10,900,425 | B2 | 1/2021 | Yuan et al. |
| 11,549,455 | B2 | 1/2023 | Carlson et al. |
| 11,572,830 | B2 | 2/2023 | Martin et al. |
| 2003/0145582 | A1* | 8/2003 | Bunting ............... B60K 6/46 180/65.23 |
| 2006/0086546 | A1 | 4/2006 | Hu et al. |
| 2010/0115927 | A1* | 5/2010 | Sano .................. F01N 13/009 60/287 |
| 2011/0258992 | A1* | 10/2011 | Gonze ................. F01N 13/009 60/297 |
| 2017/0234253 | A1 | 8/2017 | Serrano et al. |
| 2018/0223757 | A1 | 8/2018 | Mccarthy, Jr. et al. |
| 2018/0334162 | A1 | 11/2018 | Lin et al. |
| 2019/0155230 | A1* | 5/2019 | Culbertson ............ F01N 3/208 |
| 2020/0011257 | A1* | 1/2020 | Stretch .................. F02D 17/02 |
| 2020/0291839 | A1* | 9/2020 | Lambert ............... F01N 3/0807 |
| 2023/0010915 | A1 | 1/2023 | Harris et al. |

FOREIGN PATENT DOCUMENTS

| | | |
|---|---|---|
| WO | 2012092401 A1 | 7/2012 |
| WO | 2017127219 A1 | 7/2017 |
| WO | 2018165438 A1 | 9/2018 |
| WO | 2020192973 A1 | 10/2020 |

\* cited by examiner

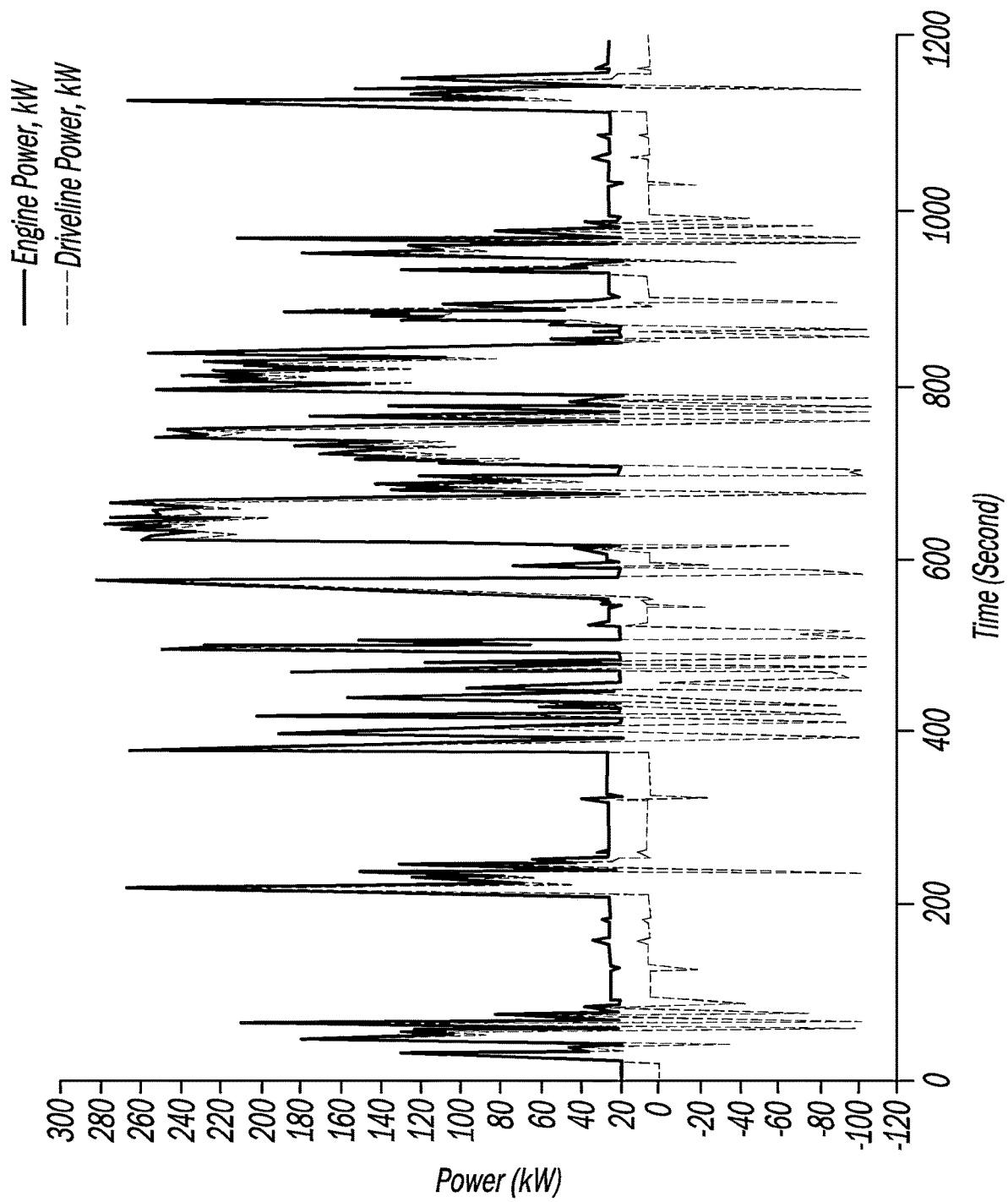

SCENARIO 1
12.5 kw incremental total heat
21 total engine power, kW 10 kW HEATER in EXHAUST
This kW Powers eRAD
20% Losses
10.0 Available eRAD power, kW
10.0 Transfer to the AT heat 35% BTE
60 Power In, kW[Fuel Energy In]
32% Exh. % [Exhaust Energy Relative to Fuel Energy]
19.20 kW to Exhaust (from engine only)

29.2 Total kW to Exhaust AT
2.66 min.
1.295 kw-hr

*FIG-16*

SCENARIO 2
  25.0 kw incremental total heat
                                33.5 total engine power, kW 35% BTE
                                95.71429 Power In, kW[Fuel Energy In]
                                32% Exh. % [Exhaust Energy Relative to Fuel Energy]
20 kW HEATER in EXHAUST         30.63 kW to Exhaust (from engine only)
This KW Powers eRAD
  20% Losses
  20.0 Available eRAD power, kW  50.6 Total kW to Exhaust AT
  20.0 Transfer to the AT heat   1.53 min.
                                 1.295 kw-hr

*FIG - 17*

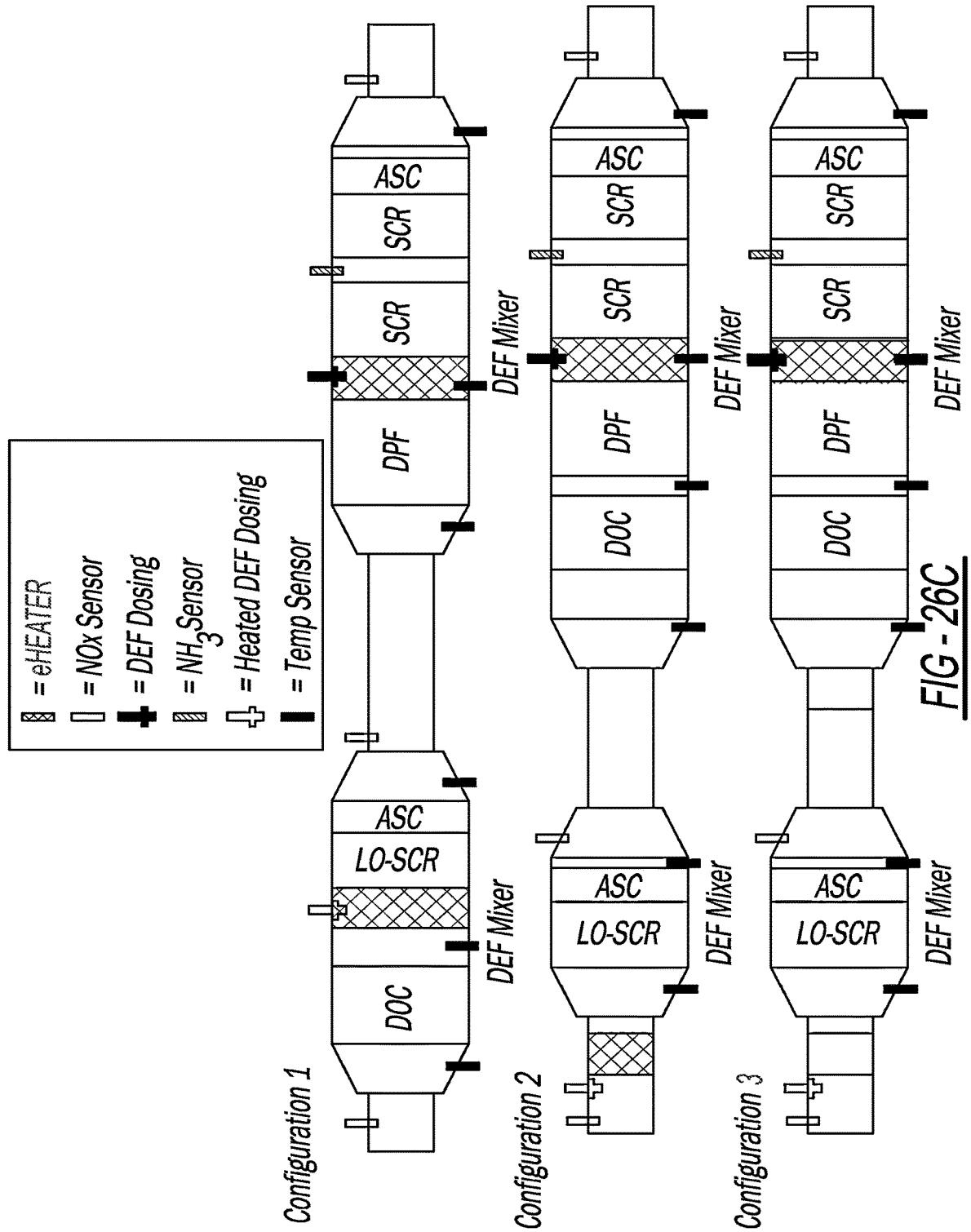

Medium Duty Diesel

| Key Variable | Best Fuel Economy | Best Heat Up Calibration Equivalent BSNOx (g/hp-hr) | | |
|---|---|---|---|---|
| # Cylinders Firing | 6 | 6 | 4 | 4 |
| Engine Speed, rpm | 800 | 800 | 1000 | 1240 |
| Engine Torque, ft lbs | 50 | 50 | 50 | 50 |
| Normalized Fuel Rate | 1 | 1.64 | 1.43 saves 12.7% fuel | 1.67 equal fuel |
| Exhaust Temperature C | 150 | 259 >250 C | 257 >250 C | 261 >250 C |
| Enthalpy, kW (relative to ambient) | 256 | 7.40 | 7.17 equal heat | 9.15 24% more heat |

*Heavy Duty Diesel*

| Key Variable | Baseline | Best Heat Up Calibration (at Equivalent NOx) | | | | | |
|---|---|---|---|---|---|---|---|
| Mode | | 5CF | 4CF | | 3CF | | 2CF |
| Engine RPM | 600 | 1000 | 1200 | 1000 | 1200 | 1000 | 1200 |
| Engine Torque | 0 Nm | | | | | | |
| Normalized Fuel Rate | 1.00 | 3.50 | 3.42 | 2.50 | 2.28 | 1.71 | 2.15 |
| Exhaust Temperature C | 81 | 200 | 205 | 195 | 203 | 202 | 251 |
| Enthalpy, kW (relative to ambient) | 1.9 | 15.4 | 21.6 | 11.0 | 13.4 | 7.0 | 12.0 |

Adding 15kW engine power @ 1000 rpm:
- 2CF achieves 279 to 296 C TOT
- 6CF limited to 159 C TOT

FIG - 31

SYSTEM AND METHOD TO MAINTAIN HOT AFTERTREATMENT AT ENGINE IDLE

Technical field

The present disclosure relates generally to a transmission system and related method for operating a motor generator coupled to a countershaft of the transmission system at engine startup to create higher exhaust heat in the exhaust aftertreatment.

BACKGROUND

Federal Test Protocol (FTP) are forcing current engine design trends to require lower emissions and improved fuel economy. The addition of the low load cycle, in-use emissions compliance and extended idle operation increases this level of stringency. One of the challenges in lowering emissions is to effectively manage emissions at engine startup. As is known, nitrogen oxides (NOx) aftertreatment systems are temperature sensitive. High NOx conversion begins between 220 C and 280 C depending on catalyst formulation. Typically at engine startup, idle exhaust temperatures can be between 110 C and 150 C. In this regard, an amount of time is needed for the exhaust to heat up from the typical exhaust temperatures to the elevated temperatures that satisfy the desired 95% (or above) efficiency target. Engine operation during this amount of time is inefficient for NOx conversion. In some examples this amount of time is around 600 seconds. Even using cylinder deactivation, selective catalytic reduction (SCR) temperature can decrease to about 200 C at idle. It would be desirable to provide a system that efficiently raises the SCR temperature quickly at startup and further can maintain temperatures within the efficiency target throughout idle or forever while the engine is on.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

BRIEF SUMMARY

A transmission system selectively coupled to an engine crankshaft of an internal combustion engine arranged on a vehicle includes a transmission, an aftertreatment system, an accessory device and a controller. The transmission includes an input shaft, a mainshaft, an output shaft and a countershaft offset from the input shaft. The countershaft is drivably connected to the first input shaft and the mainshaft. The aftertreatment system reduces emissions in an exhaust of the internal combustion engine. The accessory device is configured to provide power. The controller operates in an aftertreatment heat-up mode such that the aftertreatment system is heated up to an elevated temperature and emissions are thereby reduced based on the elevated temperature. The controller is configured to heat up the aftertreatment system to reach between one (1) and two (2) kilowatt hours (kWh) of enthalpy before two minutes at engine startup by (i) operating the internal combustion engine in cylinder deactivation mode (CDA); (ii) operating the internal combustion engine at an elevated idle speed; and (iii) operating the accessory device at a threshold power.

According to additional features operating the internal combustion engine in CDA and operating the internal combustion engine at an elevated idle speed provides between 7 and 11 kilowatts of power. The accessory device is operated at between 9 and 14 kilowatts of power. The controller can operate in the aftertreatment heat-up mode to provide between 27 and 33 kilowatts of power to reach between one (1) and two (2) kilowatt hours (kWh) of enthalpy before three minutes by concurrently operating the internal combustion engine in CDA and at elevated idle speed and operating the accessory drive at the threshold power.

In other features the transmission system can comprise at least one battery that provides voltage regulation. The at least one battery can be 48 volts. The accessory device can be an electric heater. The controller can be configured to suspend the aftertreatment heat-up mode upon reaching between the one (1) and two (2) kWh of enthalpy until a selective catalytic reduction (SCR) temperature falls below a threshold. The controller can re-enter the aftertreatment heat-up mode upon the SCR temperature falling below the threshold until the aftertreatment system returns to between one (1) and two (2) kWh of enthalpy. The controller can be configured to heat up the aftertreatment system to reach 1.3 kWh of enthalpy.

A transmission system selectively coupled to an engine crankshaft of an internal combustion engine arranged on a vehicle includes a transmission, an aftertreatment system, an electric heater and a controller. The transmission can include an input shaft, a mainshaft, an output shaft and a countershaft offset from the input shaft. The countershaft can be drivably connected to the first input shaft and the mainshaft. The aftertreatment system can reduce emissions in an exhaust of the internal combustion engine. The electric heater can be disposed in the aftertreatment system. The controller can operate in an aftertreatment heat-up mode such that the aftertreatment system is heated up to an elevated temperature and emissions are thereby reduced based on the elevated temperature, the controller operating in the aftertreatment heat-up mode during idle.

According to additional features, during aftertreatment heat-up mode, the controller operates the engine in cylinder deactivation mode (CDA) causing the aftertreatment system to operate at an elevated temperature. During aftertreatment heat-up mode, the controller turns on the electric heater in conjunction with operating the engine in CDA mode. The controller can operate in aftertreatment heat-up mode for a first period of time to elevate the aftertreatment system to a predetermined temperature. The predetermined temperature can be about 350 degrees Celsius. More particularly, the predetermined temperature is about 350 degrees Celsius to ensure against cool down, thus maintaining the heat-up function to a minimum. After the first period of time the controller can turn off the electric heater. Subsequent to a dwell time, the controller can determine that the aftertreatment system has decreased in temperature below a desired degree Celsius value and turns on the electric heater.

The method of operating a transmission system selectively coupled to an engine crankshaft of an internal combustion engine, the transmission system having a transmission, an aftertreatment system and an accessory device configured to provide power is provided. Control determines whether the aftertreatment system is operating below a threshold temperature. Control operates the transmission system in an aftertreatment mode. The internal combustion engine is operated in cylinder deactivation mode (CDA). The internal combustion engine is operated at an elevated idle speed. The accessory device is operated at a threshold power. The aftertreatment heat-up mode is exited upon reaching between one (1) and two (2) kilowatt hours (kWh) of enthalpy before two minutes at engine startup.

According to other features, operating the internal combustion engine in CDA and operating the internal combustion engine at an elevated idle speed provides between 7 and 11 kilowatts of power. The accessory device is operated at between 9 and 14 kilowatts of power. The controller can operate in the aftertreatment heat-up mode to provide between 27 and 33 kilowatts of power to reach one (1) and two (2) kilowatt hours (kWh) of enthalpy before three minutes by concurrently operating the internal combustion engine in CDA and at elevated idle speed, and operating the accessory drive at the threshold power. The aftertreatment heat-up mode is exited until a selective catalytic reduction (SCR) temperature falls below a threshold. The aftertreatment heat-up mode is re-entered upon the SCR temperature falling below the threshold until the aftertreatment system returns to between one (1) and two (2) kWh of enthalpy. Operating the transmission system in aftertreatment heat-up mode comprises heating the aftertreatment system to reach 1.3 kWh of enthalpy.

BRIEF DESCRIPTION OF THE DRAWINGS

The present disclosure will become more fully understood from the detailed description and the accompanying drawings, wherein:

FIG. 9 illustrates HD FTP with 20 kW power to batteries showing a first plot of power demand during an emission cycle and a second plot showing an addition of 20 kW of power;

FIG. 16 illustrates a first exemplary scenario for operating a transmission system to reach hot aftertreatment at engine start up;

FIG. 17 illustrates a second exemplary scenario for operating a transmission system to reach hot aftertreatment at engine start up;

FIG. 31 illustrates another table showing various methods of getting the aftertreatment system hot quickly according to the present disclosure;

DETAILED DESCRIPTION

The following disclosure is directed toward optimizing aftertreatment efficiency. As identified above, Federal Test Protocol (FTP) are forcing current engine design trends to require lower emissions and improved fuel economy. The addition of the low load cycle, in-use emissions compliance and extended idle operation increases this level of stringency. As is known, nitrogen oxides (NOx) aftertreatment systems are temperature sensitive. High NOx conversion begins between 220 C and 280 C depending on catalyst formulation. In particular, as viewed in FIG. 3, NOx conversion can have an efficiency above 95% when the selective catalytic reduction catalyst (SCR) catalyst temperature is between 300 C and 450 C. Typically at startup, idle exhaust temperatures can be between 110 C and 150 C. In this regard, an amount of time is needed for the exhaust to heat up from the typical exhaust temperatures to the elevated temperatures that satisfy the desired 95% (or above) efficiency target. Engine operation during this amount of time is inefficient for NOx conversion. In some examples this amount of time is around 600 seconds. The present disclosure provides configurations and control strategies to elevate exhaust temperatures quickly, minimizing this amount of inefficient operating time and arriving at the desired 95% efficiency range.

As will become appreciated from the following discussion, the instant disclosure replaces a vehicle electrical system from a traditional "front end accessory drive" (FEAD) that drives accessory components such as the electrical charging system (alternator) and the compressor that drives the HVAC air conditioner. The vehicle electrical system according to the present disclosure is instead driven by the transmission countershaft. Such a configuration allows a new operating mode of coasting while the engine is off (Engine Off Coasting or EOC), while still providing electrical power by driving the charging system from the vehicle wheels while the engine is stopped (defueled) and the vehicle is still moving.

Figure 1A:
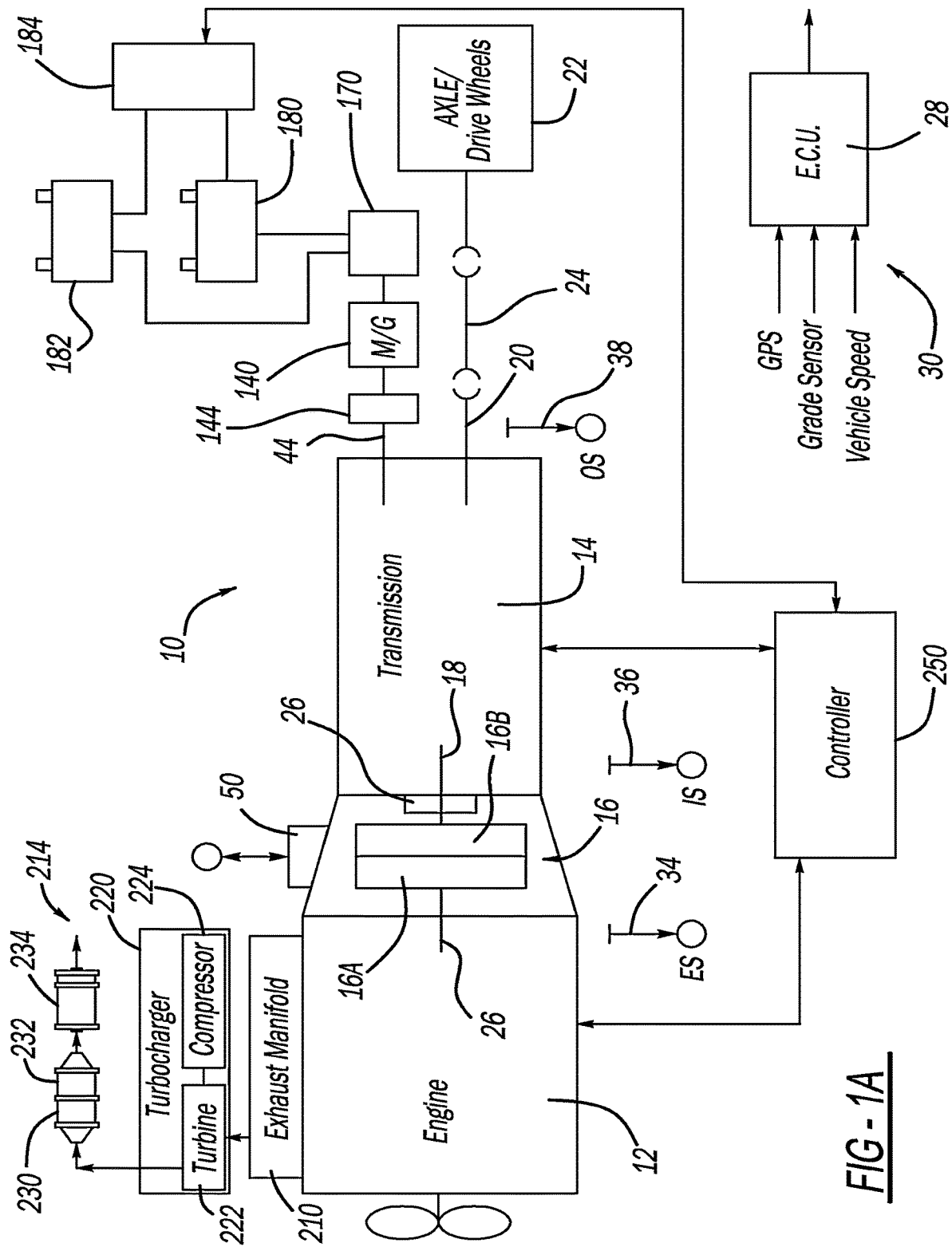
FIG. 1A is a schematic of a transmission system constructed in accordance to the present disclosure and configured to implement various aftertreatment heat-up modes.
Figure 1B:
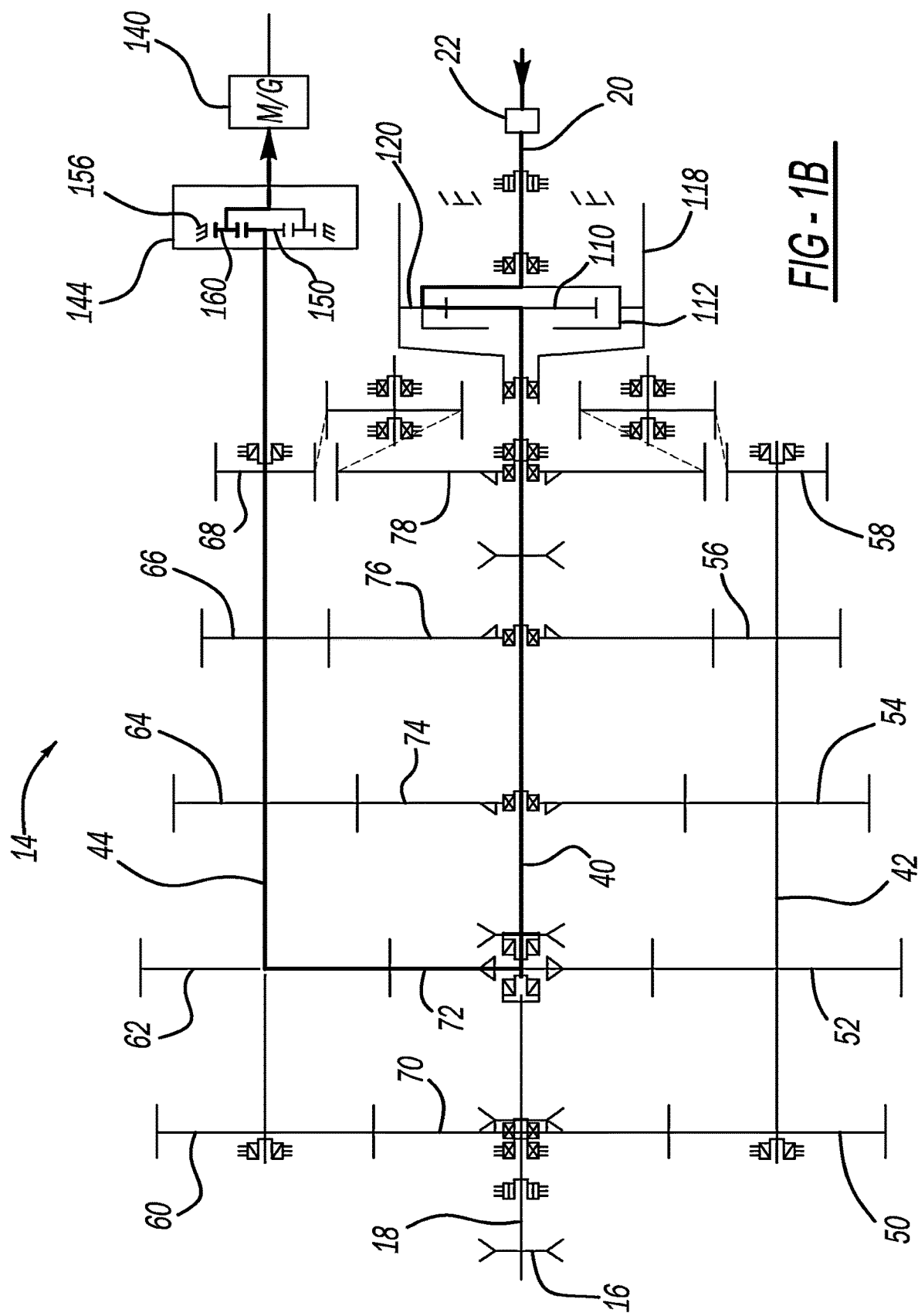
FIG. 1B is a schematic of an automated mechanical transmission system coupled to an engine, the transmission system having a motor generator coupled to a countershaft according to one example of the present disclosure.

With initial reference to FIGS. 1A and 1B, an AMT system constructed in accordance to one example of the present disclosure and referred to at reference 10. The AMT system 10 is selectively coupled to a fuel-controlled engine 12 (such as a diesel engine or the like), a multiple-speed, change-gear transmission 14 and a master clutch 16 drivingly interposed between the engine 12 and an input shaft 18 of the transmission 14. The transmission 14 may be of the compound type comprising a main transmission section connected in series with a splitter and/or range-type auxiliary section. Transmissions of this type, especially as used with heavy duty vehicles, typically have 9, 10, 12, 13, 16 or 18 forward speeds. A transmission output shaft 20 extends outwardly from the transmission 14 and is drivingly connected with vehicle drive axles 22, usually by means of a prop shaft 24.

The master clutch 16 includes a driving portion 16A connected to an engine crankshaft/flywheel 26 and a driven portion 16B coupled to the transmission input shaft 18 and adapted to frictionally engage the driving portion 16A. An electronic control unit (ECU) 28 is provided for receiving input signals 30 and for processing same in accordance with predetermined logic rules to issue command output signals 32 to the transmission system 10. The system 10 can also include a rotational speed sensor 34 for sensing rotational speed of the engine 12 and providing an output signal (ES) indicative thereof, a rotational speed sensor 36 for sensing the rotational speed of the input shaft 16 and providing an output signal (IS) indicative thereof, and a rotational speed sensor 38 for sensing the speed of the output shaft 20 and providing an output signal (OS) indicative thereof. The master clutch 16 may be controlled by a clutch actuator 50 responding to output signals from the ECU 28.

The transmission 14 has one or more mainshaft sections 40. The mainshaft 40 is coaxial with the input shaft 18. The transmission 14 has a first countershaft 42 and a second countershaft 44. The countershafts 42 and 44 are offset from the input shaft 18 and the mainshaft 40. The countershafts 42 and 44 are illustrated as being offset from one another, however in some examples the countershafts 42 and 44 may be coaxial with each other. The output shaft 20 may be coaxial with the mainshaft 40.

The first countershaft 42 is supported for rotation by the transmission 14 housing by bearings. The first countershaft 42 of the transmission 14 has countershaft gears 50, 52, 54, 56 and 58. The second countershaft 44 is supported for rotation by the transmission 14 housing by bearings. The second countershaft 44 of the transmission 14 has countershaft gears 60, 62, 64, 66 and 68. The mainshaft 40 of the transmission 14 has mainshaft gears 70, 72, 74, 76 and 78. The master clutch 16 can selectively communicate torque into the transmission 14. A headset clutch 84, a first sliding dog clutch 88 and a second sliding dog clutch 90 can move left and right as viewed in FIG. 2 to connect various mainshaft gears 70-78 and countershaft gears 50-58 and 60-68 for attaining a desired drive gear and torque path within the transmission 14.

The right hand end of the mainshaft 40 is drivably connected to a sun gear 110. A planetary carrier 112 is connected to or is integral with the output shaft 20, which is connected drivably through a drive axle 22 to vehicle traction wheels. A ring gear 118 engages planet pinions 120 carried by the carrier 112.

According to one example of the present disclosure, a motor generator 140 can be selectively coupled to the second countershaft 44 (or the transmission power take-off, PTO). As will become appreciated herein, the motor generator 140 is configured to run in two opposite modes. In a first mode, the motor generator 140 operates as a motor by consuming electricity to make mechanical power. In a second mode, the motor generator 140 operates as a generator by consuming mechanical power to produce electricity. In one configuration a planetary gear assembly 144 can be coupled between the second countershaft 44 and the motor generator 140. The planetary gear assembly 144 can be a speed up gear assembly having a sun gear 150. A planetary carrier 152 is connected to or integral with the second countershaft 44, which is connected drivably to the motor generator 140. A ring gear 156 engages planet pinions 160 carried by the carrier 152.

By way of example the motor generator 140 can be a 6-20 Kilowatt, 24-48 volt motor. The motor generator 140 can be ultimately driven by the second countershaft 44 and be electrically connected to an integrated motor drive and converter 170. The integrated motor drive and converter 170 can provide voltage down conversion and battery management. In the non-limiting example provided, the integrated motor drive and converter 170 can be a 24-48 volt three-phase inverter. A first battery 180 can be electrically connected to the integrated motor drive and converter 170. A second battery 182 can be electrically connected to the integrated motor drive and converter 170. The first battery 180 can be a 24-48 volt battery that powers various battery powered components 184 of the vehicle such as hybrid cooling, heating ventilation and air conditioning (HVAC), an air compressor, power steering and other components. While the above description sets for 24 and 48 volt implementation, in other examples, the motor generator and related components can be configured for 12 volt operation or even 300 volt operation. Further, in other examples, the transmission system 10 can incorporate an alternator in a generating only mode without the need for the integrated motor drive and converter 170. In the drawings, the feature 140 would be an alternator. It will be appreciated that the transmission system 10 can use only an alternator such that inertia brake and synchronization can be carried out given the second countershaft 44 is decelerating and not accelerating. In other examples, as will become appreciated herein, no voltage regulation is required for electric heater (FIG. 20) implementation. Batteries are not required. In this regard, voltage can vary during operation of the electric heater.

Figure 2:
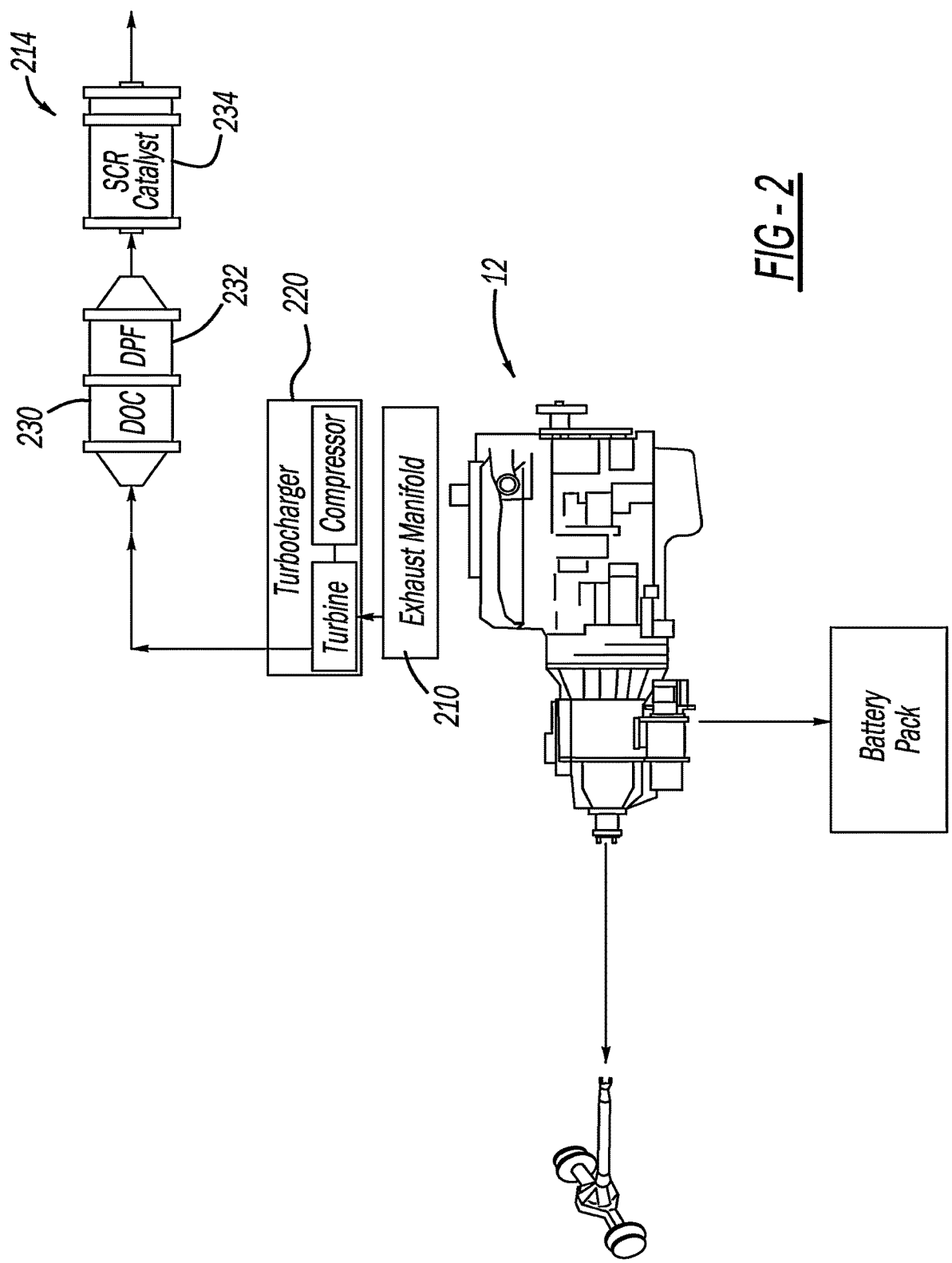
FIG. 2 is a another schematic illustration of the automated mechanical transmission system of FIG. 1.

With particular reference to FIG. 1A-2, additional features of the instant disclosure will be described in further detail. The engine 12 includes an exhaust manifold 210 that directs exhaust to an aftertreatment assembly 214 including a turbocharger system 220 having a turbine 222 and compressor 224. As is known, diesel exhaust can contain emissions including carbon monoxide (CO), unburned hydrocarbons (HC), nitrogen oxides (NOx) and particulate matter such as soot. The aftertreatment assembly 214 can further include a diesel oxidation catalyst (DOC) 230, a diesel particulate filter (DPF) 232 and a selective catalytic reduction catalyst (SCR) 234. Optional or additional light-off selective catalytic reduction catalyst (LO SCR), ammonia slip catalyst (ASC), diesel exhaust fluid (DEF) injector (doser), or mesh filters or mixers, among many other options exist in the art to include in the aftertreatment assembly 214.

The DOC 230 can be placed in the exhaust gas stream of a diesel engine and typically contain a platinum group metals and/or base metals. These catalysts promote the conversion of OC and HC emissions to carbon dioxide and water. The SCR 234 is used to convert NOx and $N_2$ and can comprise a base metal and utilize an ammonia reductant such as aqueous urea. The aqueous urea can be injected in the exhaust stream downstream from the DOC 230. The formed ammonia reacts with the NOx in the exhaust gas stream on the SCR 234 to form $N_2$. The DPF 232 collects soot from the engine exhaust. Accumulated particles are combusted at elevated temperatures to regenerate the filter.

Figure 3:
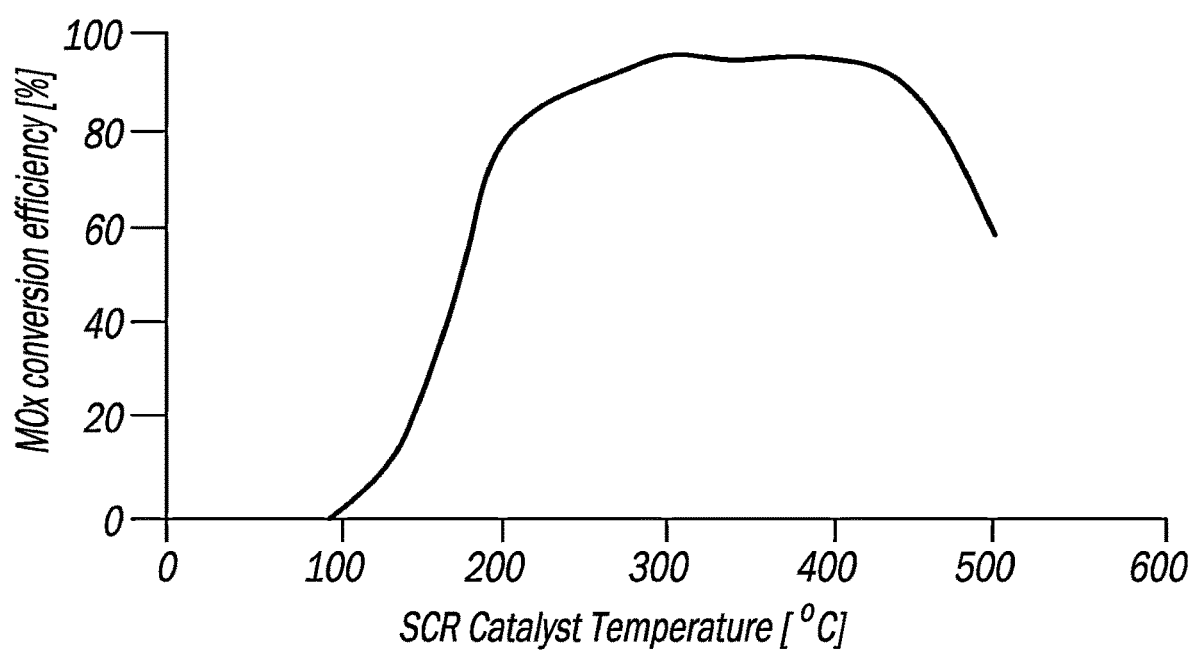
FIG. 3 is diagram illustrating NOx conversion efficiency versus selective catalytic reduction (SCR) temperature.

As shown in FIG. 3, the sweet spot for NOx conversion is generally between 300 C to 450 C. In this regard, it is desirable to heat up the aftertreatment assembly 214 quickly at startup. The teachings of the preset disclosure provide a system and method for operating the engine 12 in a fast heat-up mode. As used herein, the term "startup" is used to denote a period of time needed to reach the desired sweet spot for NOx conversion (300 C to 450 C). In other words, "startup" is used to define a period of time from engine crank to reaching the desired hot catalyst temperature.

It is desired to add heat to the aftertreatment assembly 214 as instantaneously as possible. Various aftertreatment assembly alternatives are explained further below with respect to the configurations of FIG. 26C. Techniques for powering the aftertreatment heat-up are shown in FIGS. 4A-4E. Systems and techniques for fast heat-up are shown in FIGS. 37-40.

With reference to FIGS. 4A-4E aftertreatment (fast) heat-up modes are shown according to the present disclosure. The aftertreatment heat-up modes provide extra load on the engine 12 to heat up the aftertreatment system 214 at cold startup and until the aftertreatment system 214 is heated up. The same power can be delivered to the wheels 22 while the extra load can be directed to the batteries 180, 182. In this regard, the motor generator 140 can implement a load onto the transmission 14 that can make the engine 12 run hot. As will become appreciated herein, the present disclosure provides many configurations and methods that may be used individually or in combination to load the engine 12 to make it run hot and therefore elevate the temperature of the aftertreatment system 214 to the desired range. The extra load can yield power to create enthalpy in the aftertreatment. A gap can be bridged for even faster heat-up than is achieved using CDA alone.

Figure 4A:
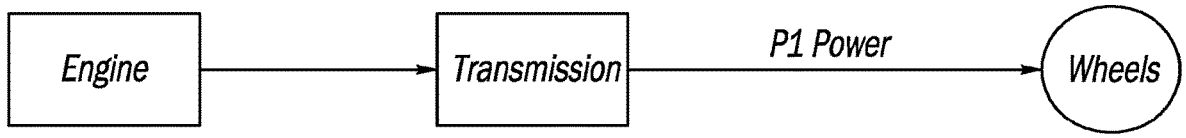
FIG. 4A-4E illustrate various power flow scenarios for configurations according to the present disclosure.
Figure 4B:
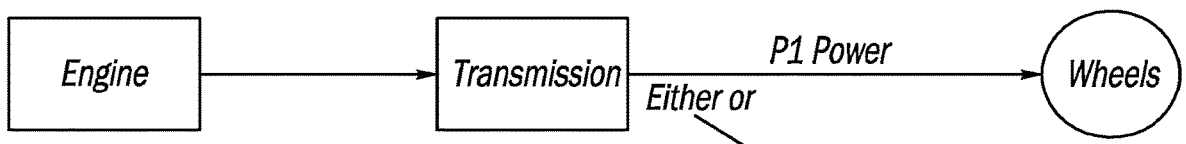
Figure 4C:
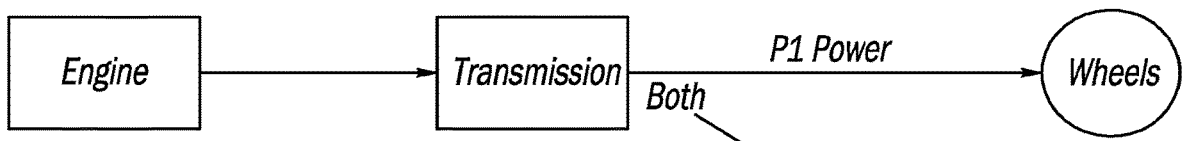
Figure 4D:
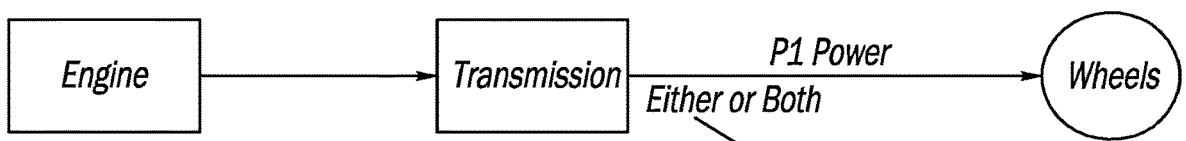
Figure 4E:
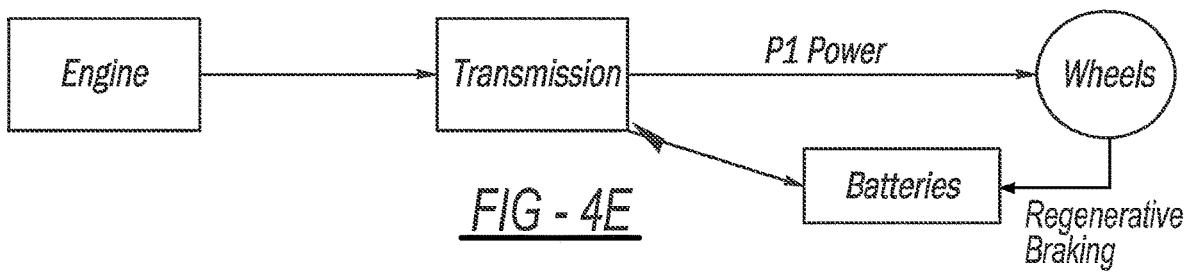

In some examples, it may not be necessary to account for extra load at startup if the aftertreatment system 214 is already hot. FIG. 4A illustrates that the engine can transmit power to the transmission, which can give primary power P1 to the wheels. In FIG. 4B, the power from the engine can be split off from the transmission to either power the wheels or the batteries. A controller 250 can manage engine power, transmission power routing and state of battery charge. A thermocouple provided in the aftertreatment system 214 can provide a signal to the controller 250 indicative of a temperature of the aftertreatment system 214. It will be appreciated that according to the present disclosure energy can be used by routing power (in this example +20 kW) to the batteries 180, 182. It will be appreciated that other kW may be routed such as 5 kW, 10 kW, 15 KW, 25 kW, 50 kW or other kW suitable to create load onto the engine 12. The more power that is being drawn, the quicker the engine 12 will get hot. The controller 250 can demand a continuous 20 kW of power or maintain a minimum or "floor" at 20 kW of power. When the power is above 20 kW the controller 250 can direct all power to the vehicle wheels 22 and stop charging the batteries 180, 182. In this regard, the transmission 14 can direct power to the wheels 22 or the batteries 180, 182. In FIG. 4C, the engine 12 can still motor with both configurations as the transmission 14 directs power to the correct location. The wheels are powered while the batteries are charged. In one configuration, the power can be sent to the wheels 22 and the batteries 180, 182 concurrently. In another configuration (FIG. 4D), the transmission 14 can disconnect power to the wheels 22 when motoring. In FIG. 4E, it is possible to power the batteries via regenerative braking from the wheels. Then the wheels can receive power from the transmission or batteries, and the batteries can receive power from the wheels or transmission. In yet another alternative, the regenerative braking energy can be supplied as free energy for powering the eHeater or other direct-drive accessories.

So, while FIGS. 4B-4E show a primary flow path from the transmission to the batteries, a reverse flow can be had, where the batteries or wheels power the motor generator and/or transmission. When the batteries are fully charged, the eHeater can be freely powered by either the batteries, regenerative braking, or an alternator or the like. In any case where the batteries aren't charged, it is possible to use the motor generator to power the eHeater. Powering the eHeater via the motor generator attached to the engine raises the engine exhaust enthalpy to the aftertreatment system by placing a load on the engine. But, during coasting or idle operation, it is possible to power the eHeater directly from the batteries. The transmission 14 can direct power to the motor/generator, as appropriate, to power the batteries. As discussed below, the motor-generator can also direct-drive accessories to use up power overage when the batteries and wheels are sufficiently powered. And, the motor-generator or batteries can power one or more eHeater for fast heat-up. So, control strategies can be devised for powering the eHeaters and accessories using the motor-generator, engine, transmission, batteries, or regenerative braking energy based on whether the batteries are fully charged or whether there is free energy in the system. If the batteries need charging, regenerative braking can be applied thereto while the motor-generator powers the one or more eHeater, for example. Or, as another example, if the batteries are fully charged, the regenerative braking energy can be applied to the one or more eHeater while the motor-generator is idle or used to power other accessories.

Other means of routing power can be additionally or alternatively used within the scope of the present disclosure. For example power can be used (energy drawn) by turning on the engine fan, charging air tanks, using any vehicle accessory, turning on lights, turning on fans, running the transmission 14 inefficiently (such as in a non-optimized gear ratio and/or precluding downspeeding), etc. So, it can be possible to direct-drive the accessories to use extra power generated during the aftertreatment heat-up iterations. Then, should the motor-generator create more power than is needed for heat-up of the aftertreatment, that extra power can be used actively in lieu of drawing off of the batteries or in lieu of venting the extra power. When the controller 250 routes the additional power, the engine 12 and therefore the aftertreatment system 214 will heat up quickly to achieve more efficient NOx conversion faster (see FIG. 3).

Figure 5A:
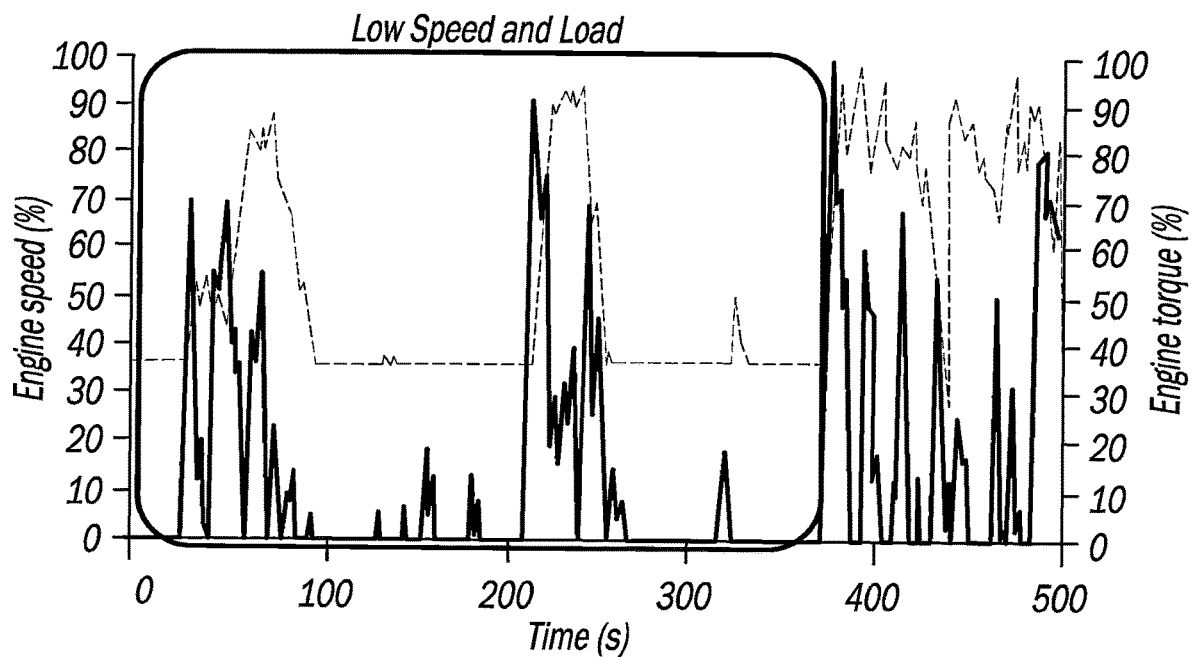
FIGS. 5A and 5B illustrate background information showing NOx requirement standards changing and heat up targets according to various examples of the present disclosure.
Figure 5B:
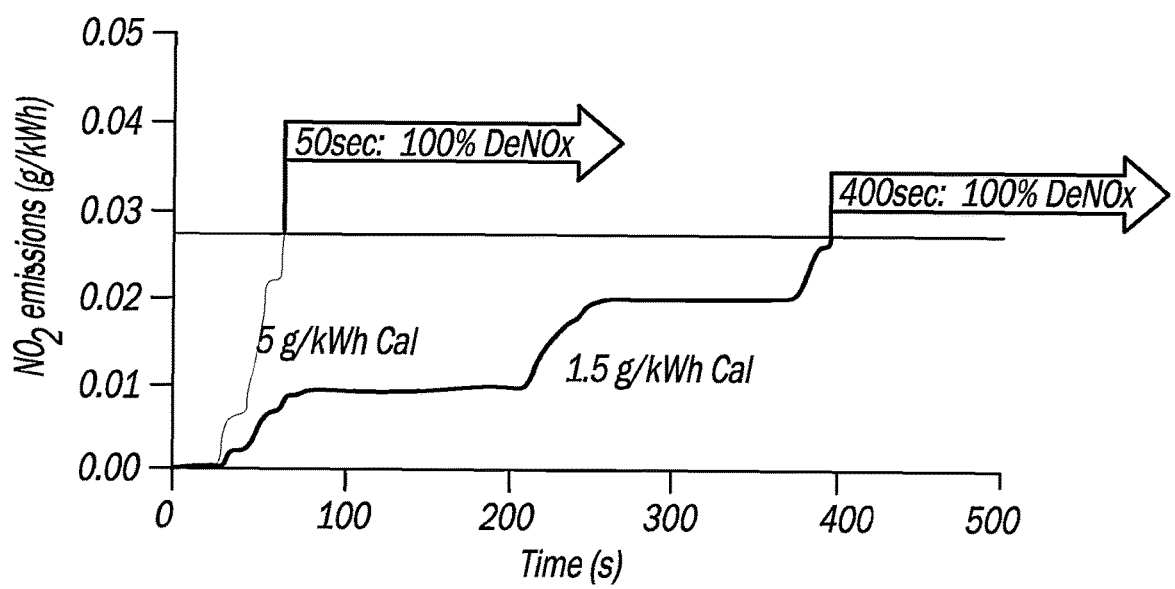

By way of example only, as shown in FIGS. 5A and 5B, the present disclosure is directed toward heating up the engine to a temperature that achieves the desired aftertreatment efficiency. A first plot illustrates running a 1.5 g/kWh of NOx (at engine out) calibration. A second plot illustrates running a 5 g/kWh of NOx (at engine out) calibration. When running a higher engine out NOx calibration, the fuel economy will be better. However, the aftertreatment system will exceed the desired limit at the tailpipe sooner. In this regard, when running 5 g/kWh of NOx (at engine out) calibration a 100% NOx conversion at 50 seconds into the cycle needs to be achieved. Similarly, when running 1.5 g/kWh of NOx (at engine out) calibration a 100% NOx conversion at 400 seconds (from engine start) into the cycle needs to be achieved. For emissions requirements in the year 2024, the engine is going to need to heat up by 400 seconds (and more preferably by 50 seconds) to meet Federal Test Protocol (FTP) requirements. The teachings of this disclosure provide solutions to heat up the aftertreatment system 214 fast for meeting this new requirement.

For perspective, in diesel engine configurations a conventional heat up mode may take up to ten minutes to reach the desired temperature for the aftertreatment system 214. The present disclosure provides solutions that heat up the aftertreatment system 214 significantly faster. The teachings of this disclosure can also be applicable to hybrid electric vehicles. In some examples the teachings are particularly useful in a hybrid electric configuration as the combustion engine is being used less and has less opportunity to get hot fast. In this regard, the motor generator 140 would be sized bigger as compared to what is set forth in FIGS. 1A-2. In other arrangements, the motor generator 140 can be coupled directly to the engine 12 without having the transmission 14 disposed therebetween. The point being, the motor generator 140 can be disposed at any position on the driveline where it demands load from the engine 12 making the engine reach higher temperatures faster.

Figure 6:
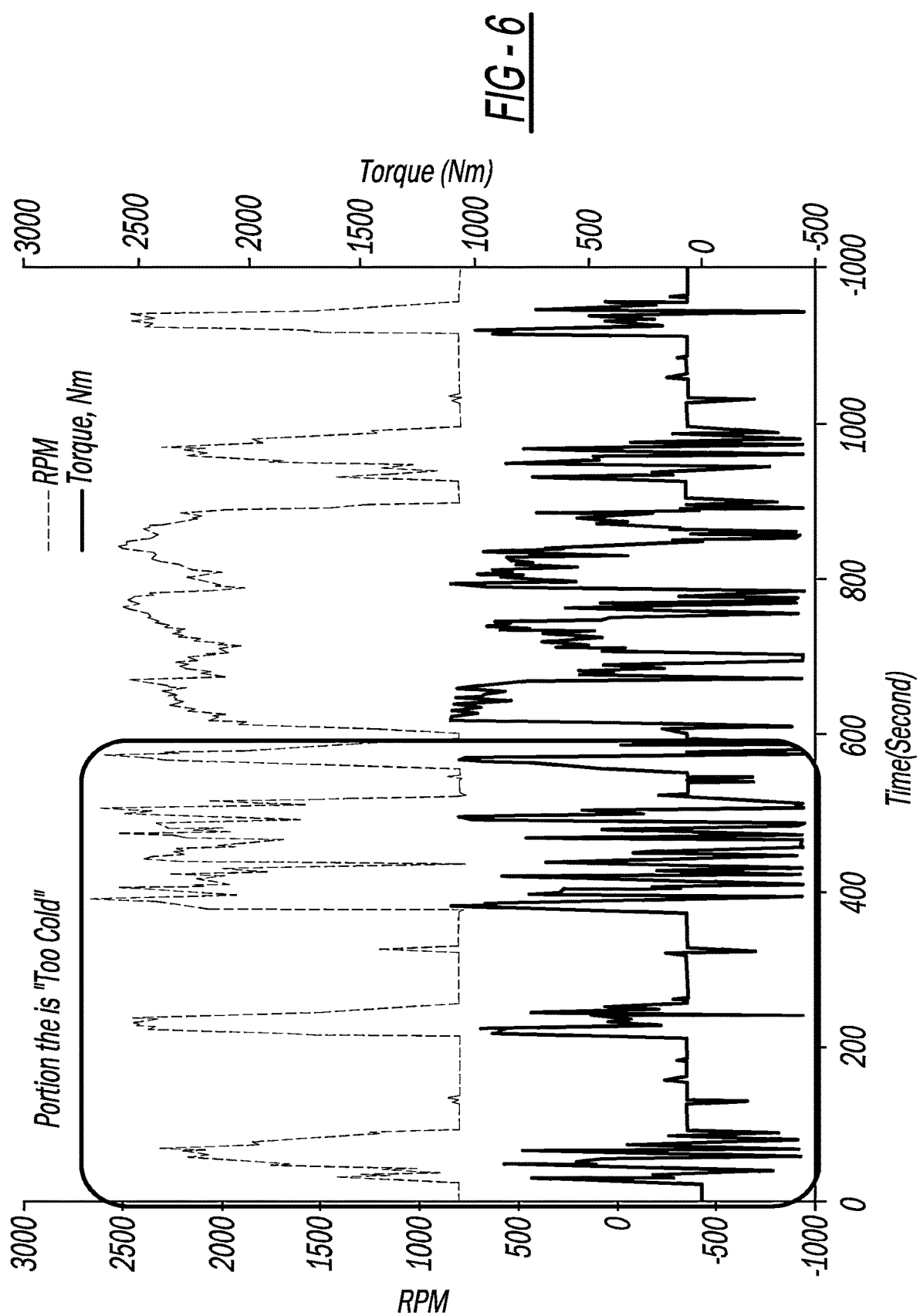
FIG. 6 is a plot of RPM and Torque examples wherein 0.02 g/hp-hr NOx is target in year 2024.
Figure 7A:
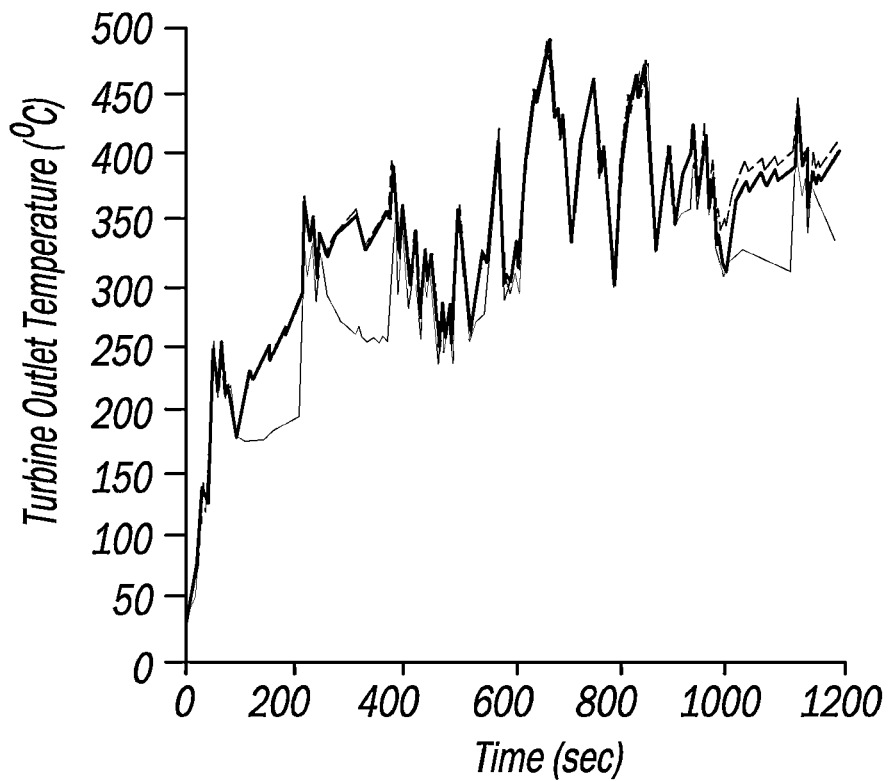
FIG. 7A is a cold cycle plot according to one example of the present disclosure.
Figure 7B:
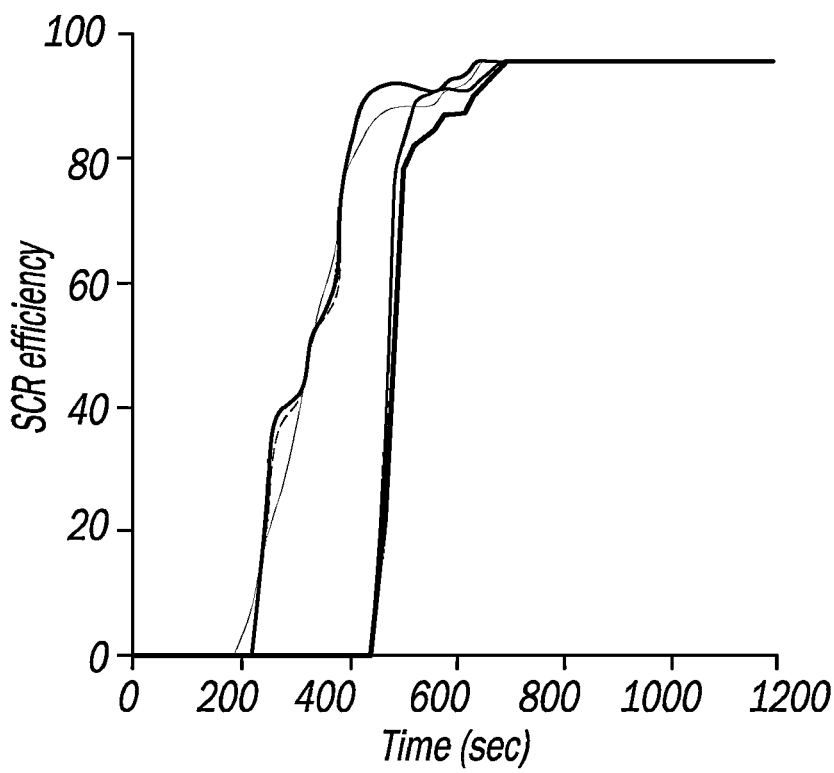
FIG. 7B is a plot of SCR efficiency for the cold cycle plot of FIG. 7A.
Figure 7C:
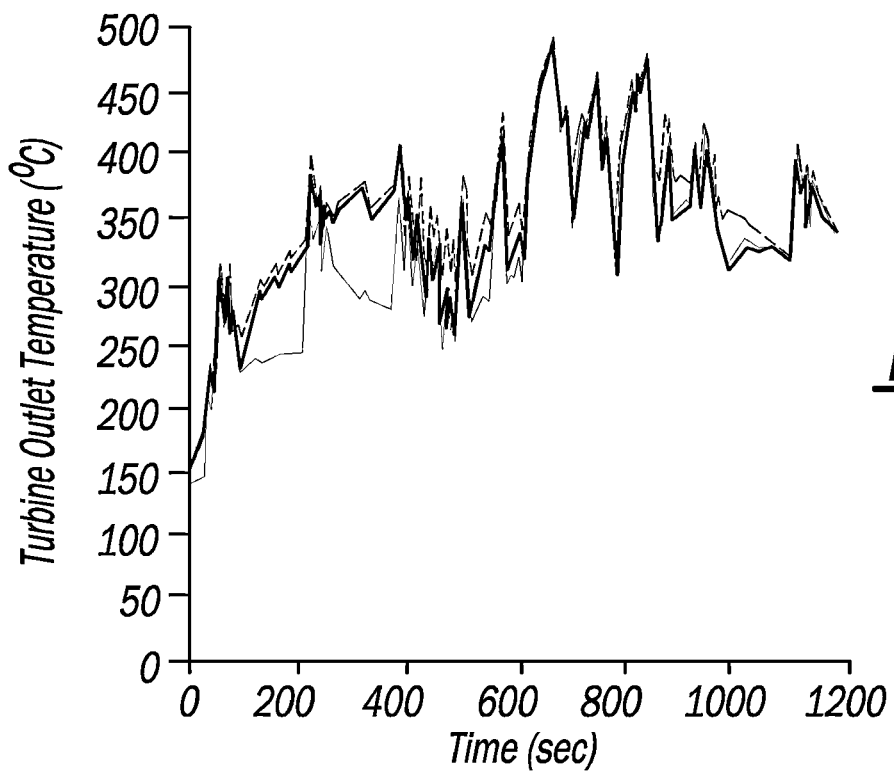
FIG. 7C is a hot cycle plot according to one example of the present disclosure.
Figure 7D:
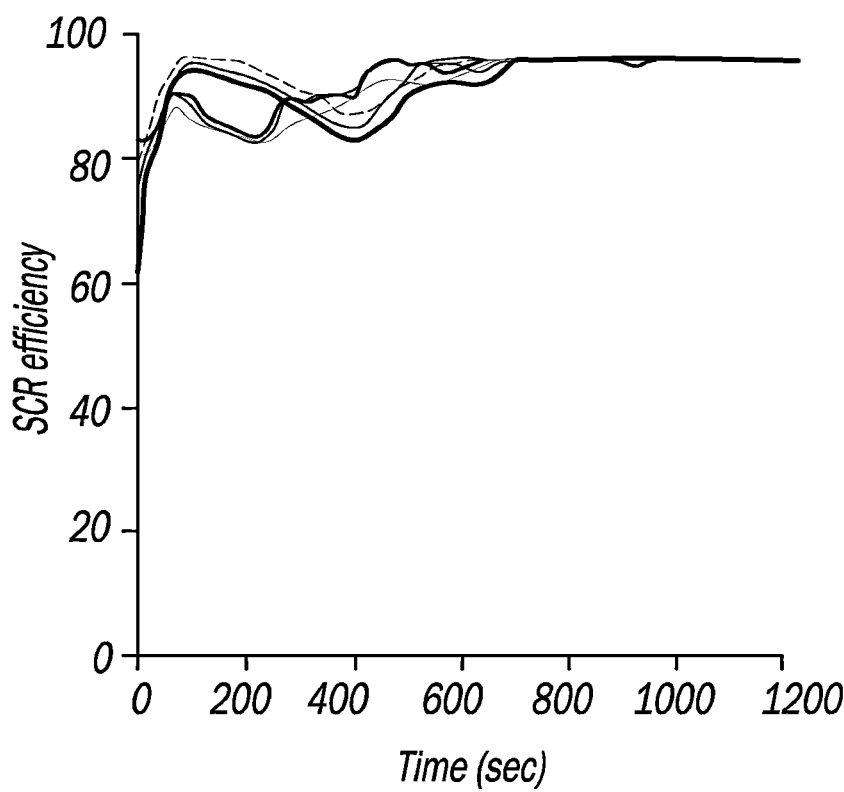
FIG. 7D is a plot of SCR efficiency for the hot cycle plot of FIG. 7C.
Figure 8A:
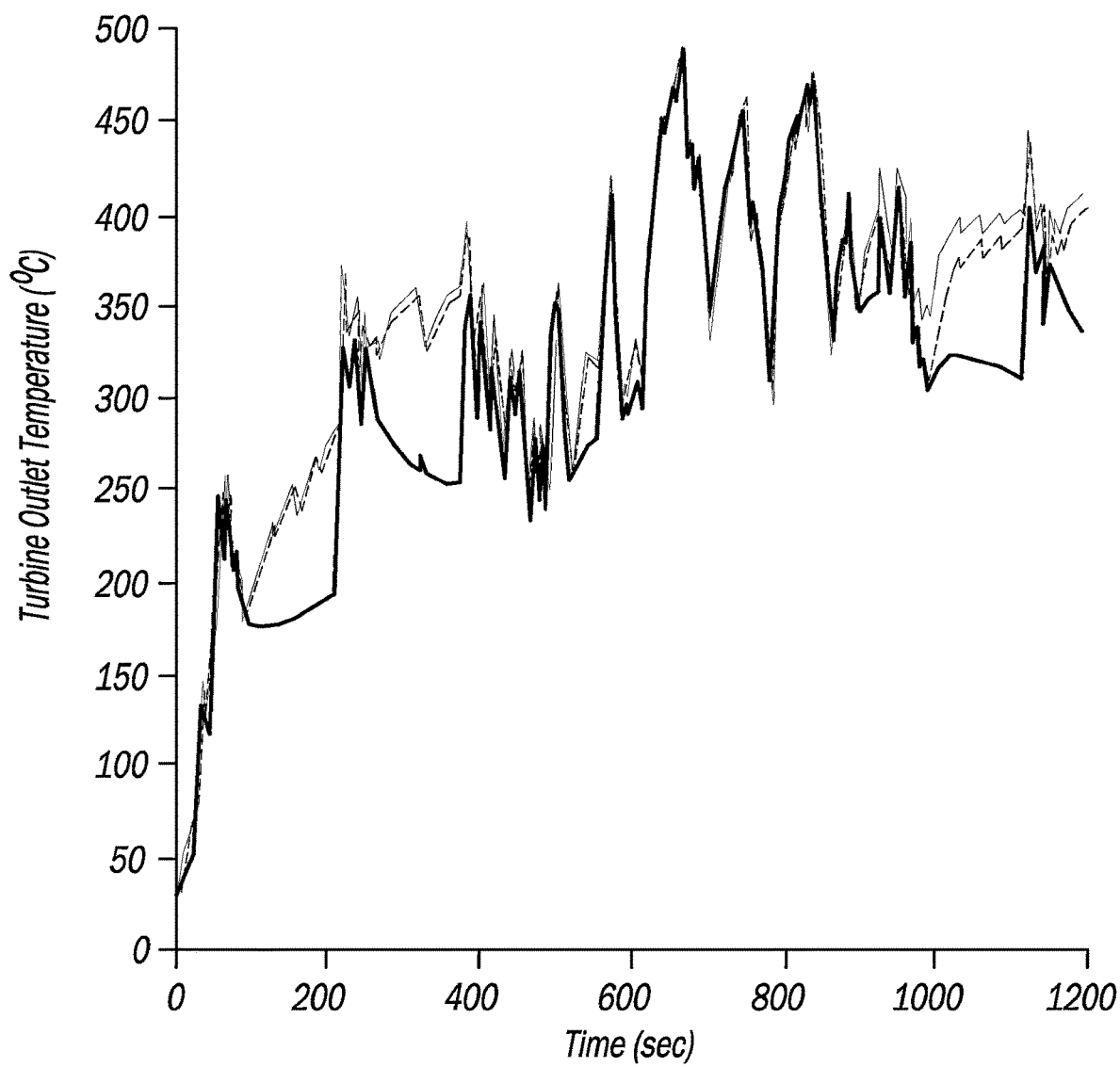
FIGS. 8A and 8B illustrate background plots of aftertreatment heat up turbine outlet and SCR temperature during heavy duty (HD) federal test procedure (FTP)
Figure 8B:
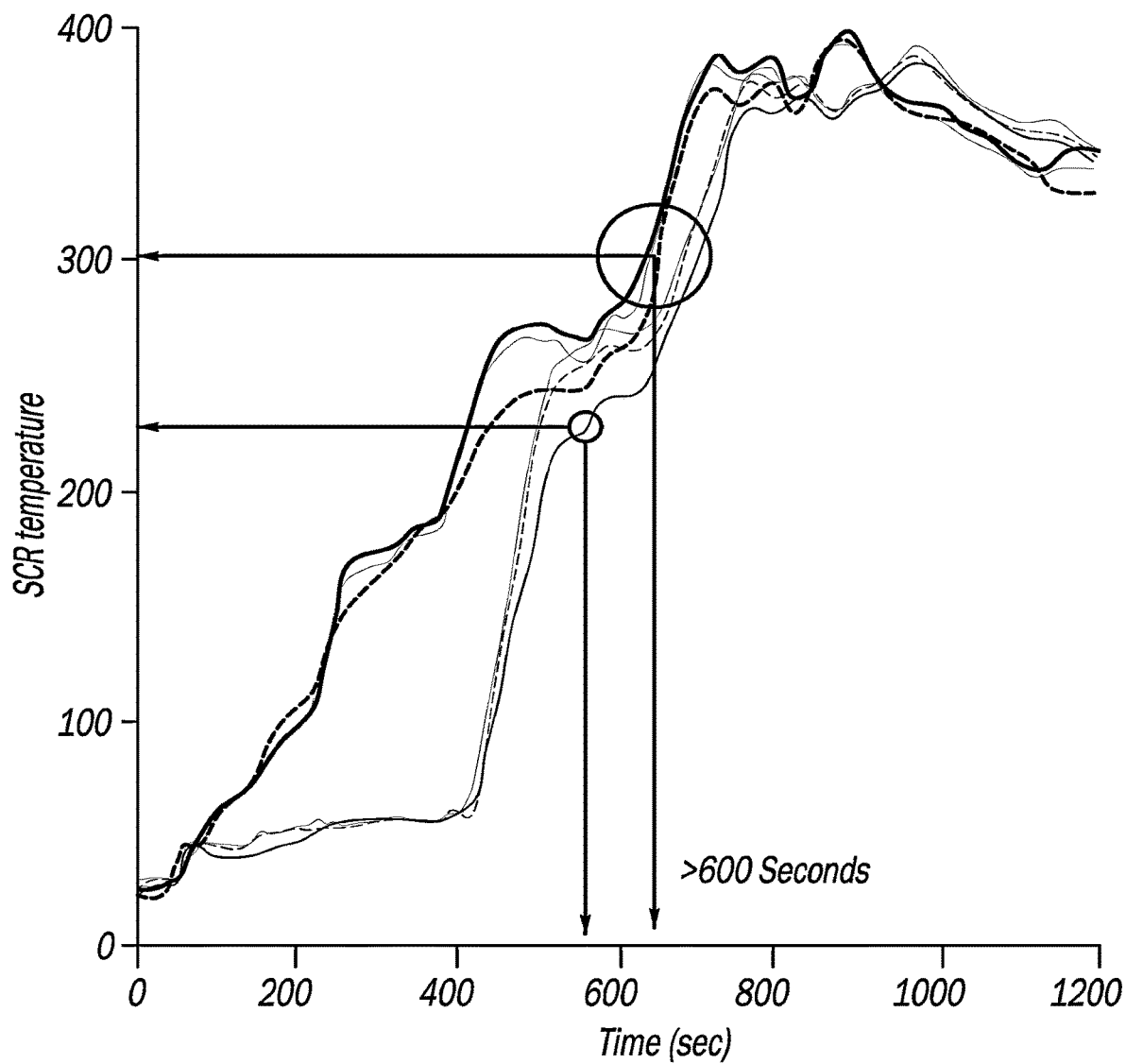

FIG. 6 illustrates an exemplary emission cycle test in a system that does not implement the fast heat-up teachings of the present disclosure. FIG. 6 shows time on the x-axis, RPM on the left y-axis and Torque in NM in the right y-axis. An area within 600 seconds is identified as too cold. It would be desirable to heat up quickly within this area. FIG. 7A illustrates outlet temperatures of the turbine 222 during the cycle shown in FIG. 6. Comparing FIG. 7A to the target catalyst temperature of 300 C to 450 C in FIG. 3, the turbine 222 is running too cold. FIG. 7B illustrates SCR efficiency as less than 95% which is undesirable. FIG. 7D shows SCR efficiency for a hot cycle shown in FIG. 7C. FIGS. 8A and 8B illustrate outlet temperature of the turbine 222 versus time for various engine operating modes (Thermal Management Calibration, exhaust gas recirculation (EGR), cylinder deactivation (CDA)). In general it will take more than 600 seconds to run the SCR 234 above 300 C.

Figure 10:
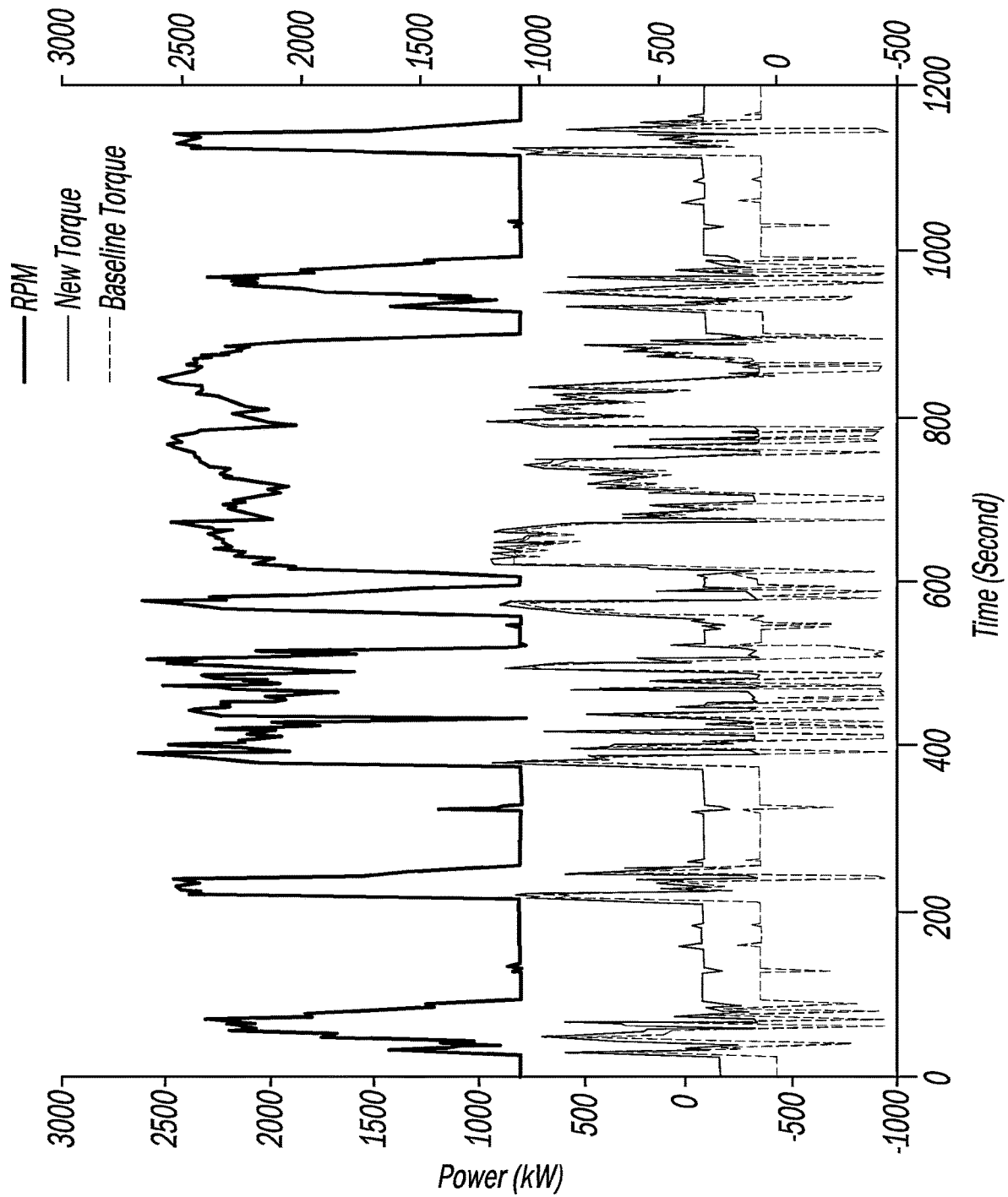
FIG. 10 shows a first plot of baseline torque, a second plot of new torque and a third plot of RPM according to the present disclosure.

FIG. 9 shows a first plot of power (torque times speed) demand during an emission cycle. A second plot shows an addition of 20 kW of power to the first plot. The engine runs hotter along the second plot. FIG. 10 shows a first plot of baseline torque, a second plot of new torque and a third plot of RPM. The second plot of new torque matches the power shown in FIG. 9.

Figure 11:
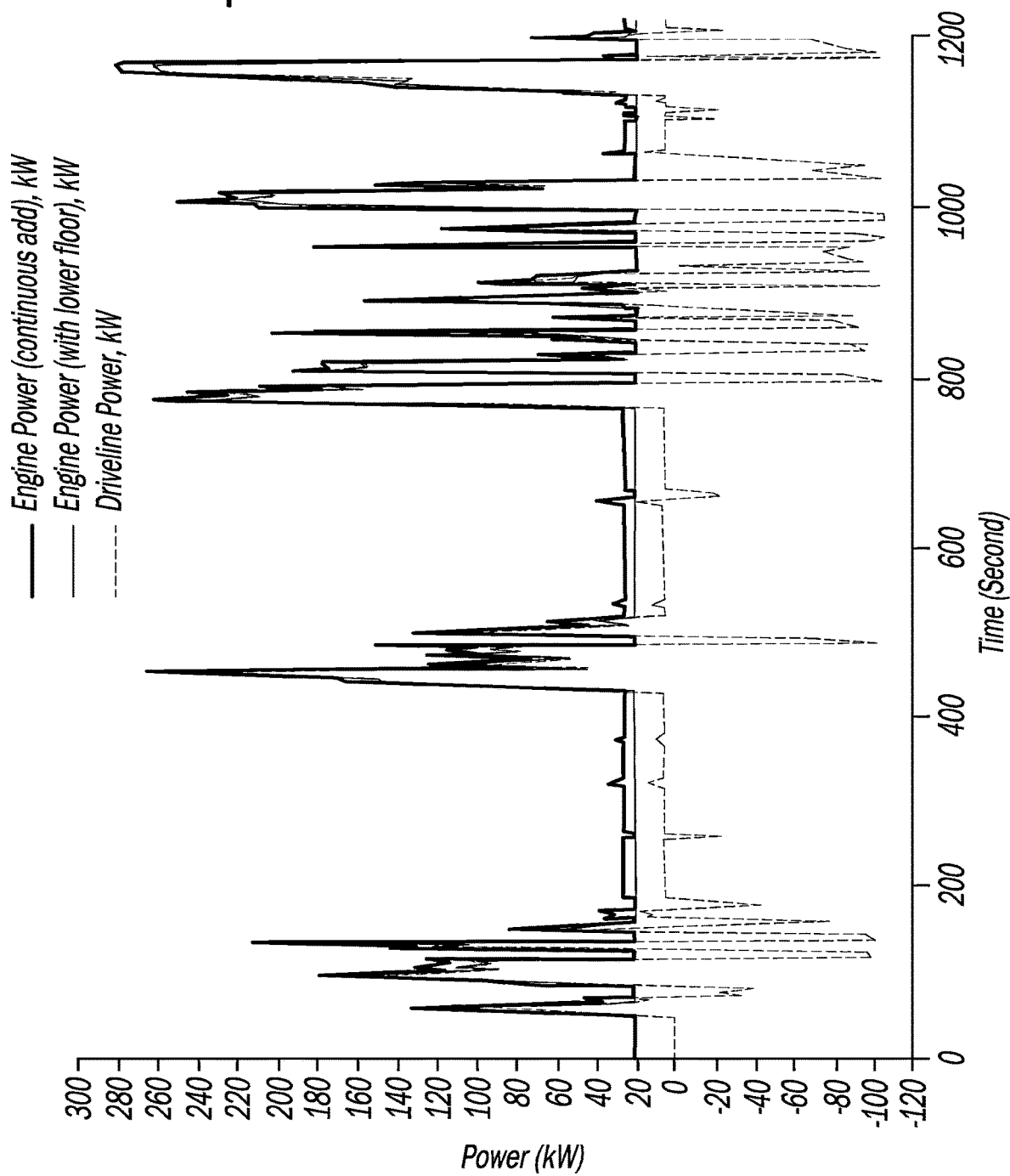
FIGS. 11 and 12 illustrate 20 kW continuous/floor power to batteries according to various examples of the present disclosure.
Figure 12:
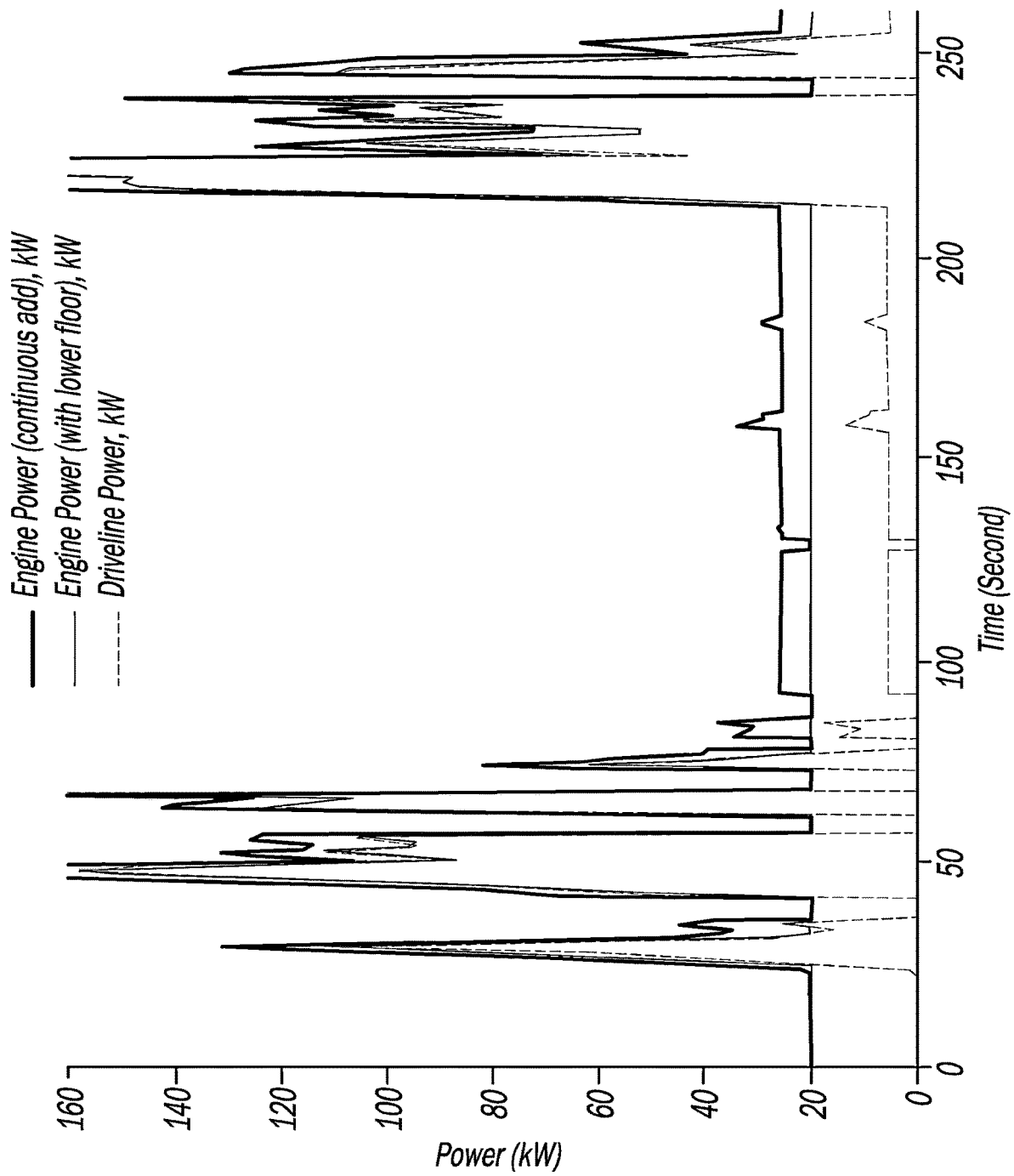
Figure 13:
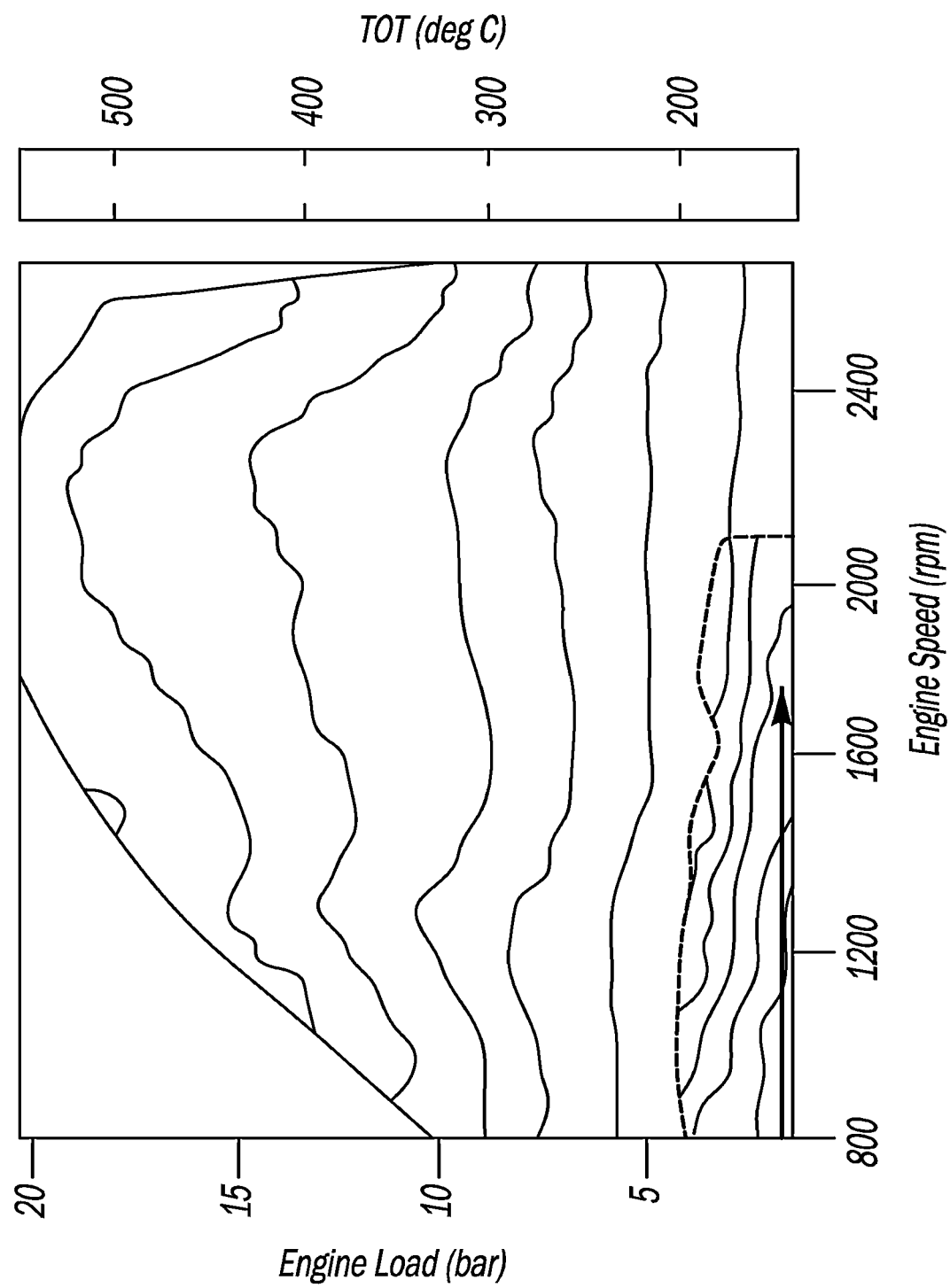
FIG. 13 is a plot of engine load versus engine speed illustrating cylinder deactivation benefits to fast heat up such that the exhaust is hotter and drives more enthalpy to the aftertreatment system.

FIGS. 11 and 12 show a first plot of driveline power, a second plot of engine power (with lower floor) and a third plot of engine power (with continuous addition). FIG. 13 illustrates additional features of the present disclosure. After treatment systems as discussed herein need high temperature to operate efficiently. Running the engine hot is important. Enthalpy to the aftertreatment is also important which is essentially temperature times exhaust flow rate. For fast heat up, the engine can be run at higher speeds (such as 1600 RPM or 2000 RPM for example) in cylinder deactivation mode where the temperature is already very hot. The high engine speed will increase the enthalpy to the catalyst. As shown in FIG. 13, when the engine load is below 3 and 4 brake mean effective pressure (bar or a measurement of engine torque normalized for engine displacement), the aftertreatment system 214 is too cold and is undesirable. However, running the engine in a fast heat up mode, such as in a cylinder deactivation mode (described more fully below) can raise the aftertreatment temperature.

Figure 14A:
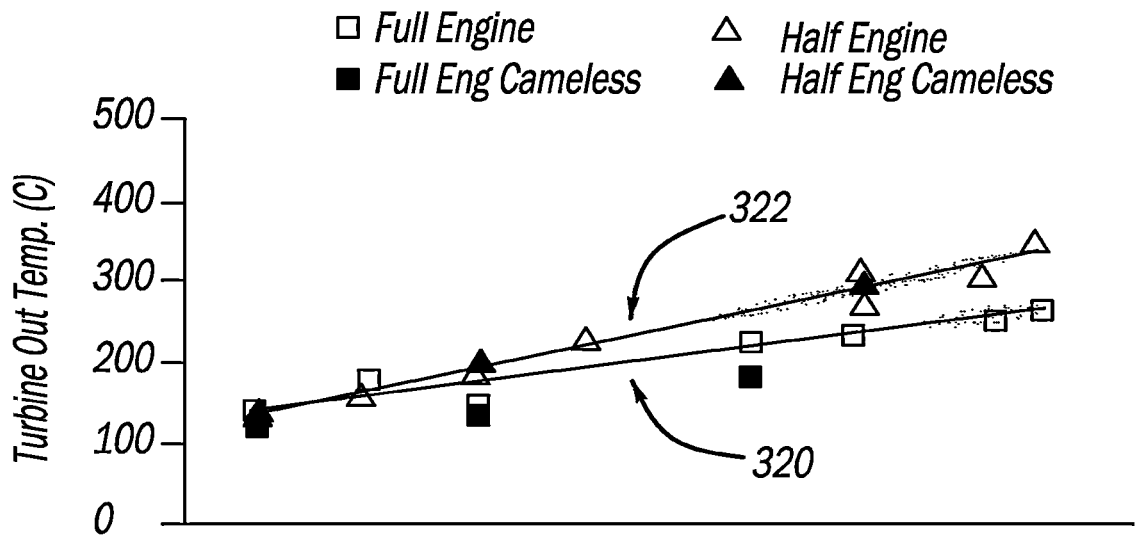
FIGS. 14A and 14B illustrate plots of torque for an engine operating in normal mode and an engine operating in cylinder deactivation mode.
Figure 14B:
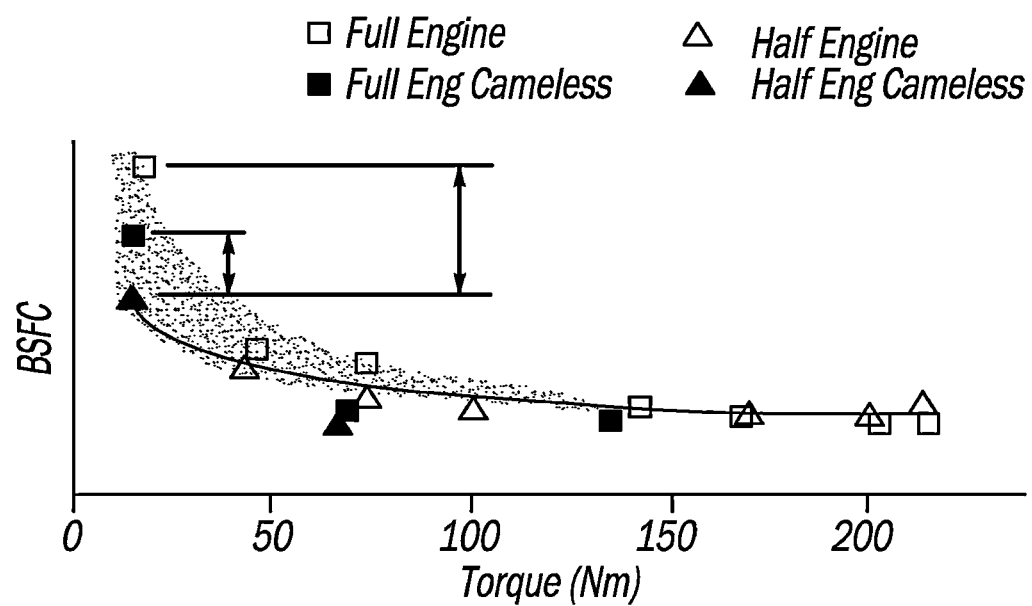

With further reference now to FIGS. 14A and 14B, the present disclosure can operate the engine in cylinder deactivation mode to create higher engine load and therefore elevated aftertreatment temperatures. FIG. 14A shows torque versus turbine outlet temperature. Plot 320 illustrates a temperature of the turbine 222 while in normal, all cylinders firing mode. Plot 322 illustrates a temperature of the turbine 222 while in cylinder deactivation mode. FIG. 14B shows torque versus brake specific fuel consumption (BSFC). As shown, running the engine 12 in cylinder deactivation mode will desirably raise the temperature in the aftertreatment system 214 sooner. Moreover, fuel economy is improved while running in cylinder deactivation which provides a double benefit.

Figure 15:
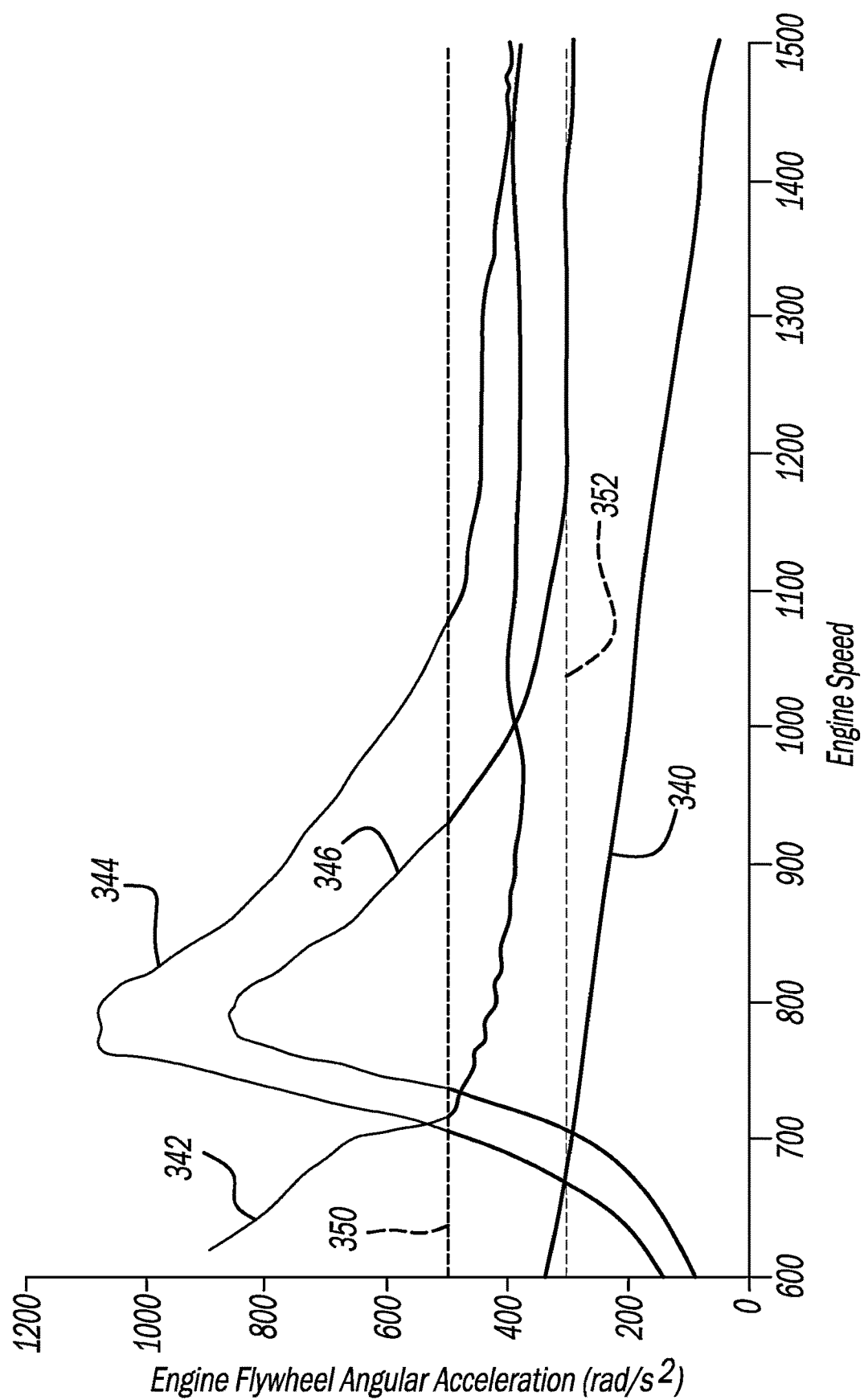
FIG. 15 illustrates engine flywheel angular acceleration (i.e. noise and/or vibration) versus engine speed.

FIG. 15 illustrates engine flywheel angular acceleration (i.e. noise and/or vibration) versus engine speed. Plot 340 shows normal firing of all cylinders (in this example six). Plot 342 shows a first cylinder deactivation mode where three cylinders are firing (three cylinders in CDA). As used herein the term "firing" is used to denote a cylinder that receives fuel and operates to provide power. Plot 344 shows a second cylinder deactivation mode where two cylinders are firing (four cylinders in CDA). Plot 346 shows a third cylinder deactivation mode where four cylinders are firing (two cylinders in CDA).

An acceptable noise and vibration range is identified between lines 350 and 352. As shown, the second and third cylinder deactivation modes (two or four cylinders firing, respectively) are within the acceptable noise and vibration range between 600 and 750 engine RPM. Explained further, during idle speeds, the preferred cylinder deactivation modes are the second (two cylinders firing) and third (four cylinders firing) cylinder deactivation modes. In this regard, these cylinder deactivation modes at startup will influence faster heat up of the aftertreatment, improved fuel economy (versus normal all cylinders firing mode) and be within an acceptable noise vibration range. Moreover, running the engine in the second and third cylinder deactivation modes actually offer improved noise vibration versus an all cylinders firing mode. Of course once engine load reaches between 3 and 4 bar the controller 250 does not need to operate in a cylinder deactivation mode any longer as the aftertreatment system 214 has reached the desired temperature.

FIGS. 16-23 illustrate additional features of the present disclosure using fast heat up with an electrically regenerative accessory drive (eRAD) and electric heater (eHeater). In current prior art implementations it takes about 10.5 minutes to heat up an aftertreatment assembly. According to the instant application, the motor generator 140 can be an eRAD that can load the engine 12 at 12 to 25 kW. The eRAD can be configured to send power to an electric exhaust heater in the exhaust. Alternatively, that power plus power already in batteries 180, 182 can be used to exhaust heat. Explained differently, the engine 12 can be run at a certain load. That load can be run through an eRAD and be converted to electrical heat. This would consequently heat up the exhaust gas running through the aftertreatment assembly 214.

A first scenario is shown in FIG. 16. The goal is to achieve a predetermined amount of heat (enthalpy) in the aftertreatment assembly 214. This procedure can be accomplished in about 2 to 3 minutes and generate about 30 kW of energy to heat up the exhaust. With 12.5 kW incremental shaft power to eRAD, 19.2 kW from engine exhaust plus 10 kW from the electric heater equals 29.2 kW to exhaust. The time to heat is about 2.7 minutes to reach 1.3 kWh. In another scenario (FIG. 17) using 25 kW incremental shaft power to eRAD, 30.6 kW from engine exhaust plus 20 KW from the electric heater equals 50.6 kW to exhaust. The time to heat is about 1.5 minutes to reach 1.3 kWh. As can be appreciated with a higher kW at the aftertreatment assembly 214, for example 50.6 kW (FIG. 17) versus 29.2 kW (FIG. 16), the goal of reaching 1.3 kWh is attained faster. While 1.3 kWh hours is used herein, it is appreciated that the same principles may be used for achieving between 1 kWh and 2 kWh. Additionally, heater power from batteries will shorten above time. The batteries can be charged in previous coasting events from regeneration without fuel penalty.

It is further contemplated that if an electrical element exists in the exhaust stream, this could be used to spray urea to vaporize the urea to inject the urea sooner. The present teachings can be used in conjunction with a urea injection where urea is injected on the electrical heater to aide in vaporization such that urea can be injected earlier in the cold cycle. The analysis shown in the figures is for a 6.7 liter diesel engine. It is contemplated that the present teachings can be used for other displacement diesel engines including 15 liter. The engine 12 can be run in cylinder deactivation (CDA) at high idle to nearly quadruple exhaust power to aftertreatment.

Figure 18:
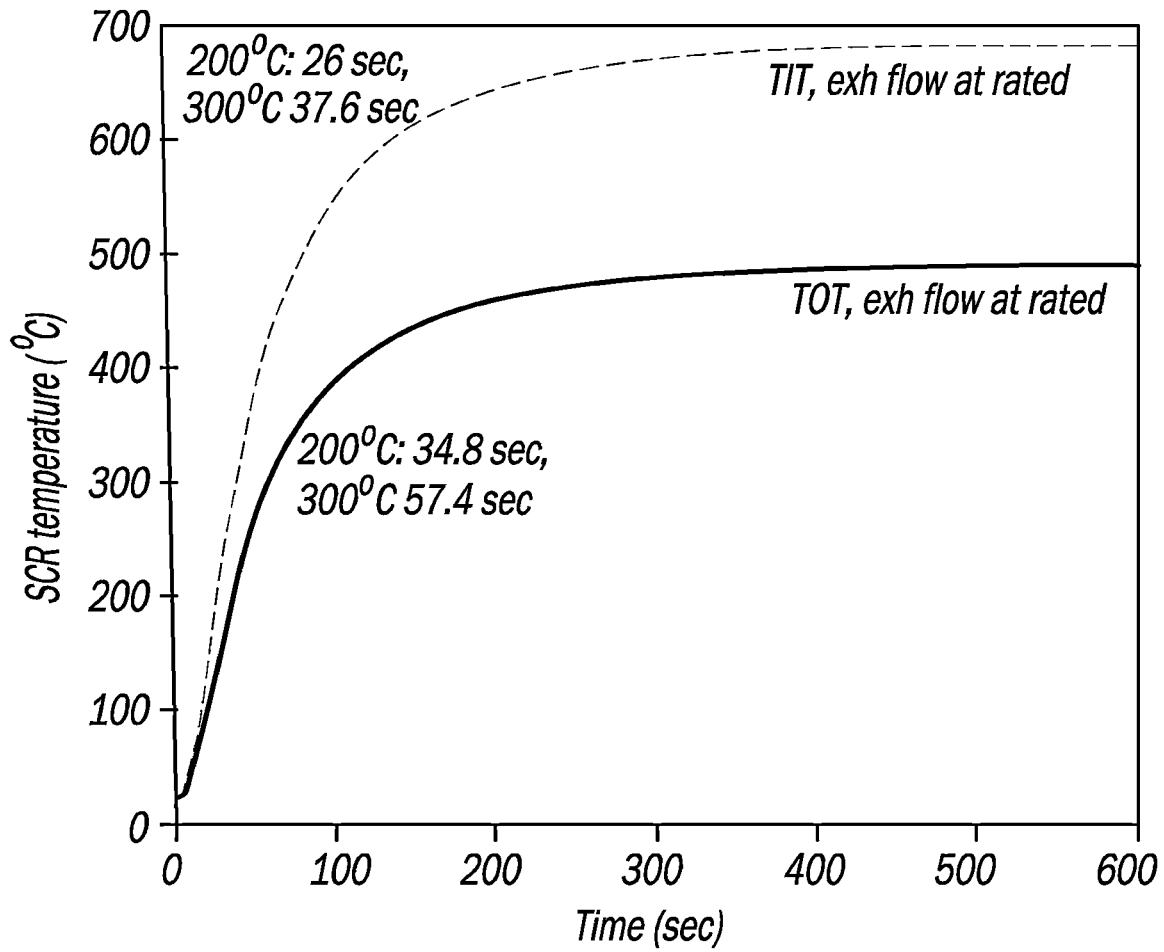
FIG. 18 illustrates exemplary power and speed for getting the aftertreatment hot at engine start up.
Figure 19:
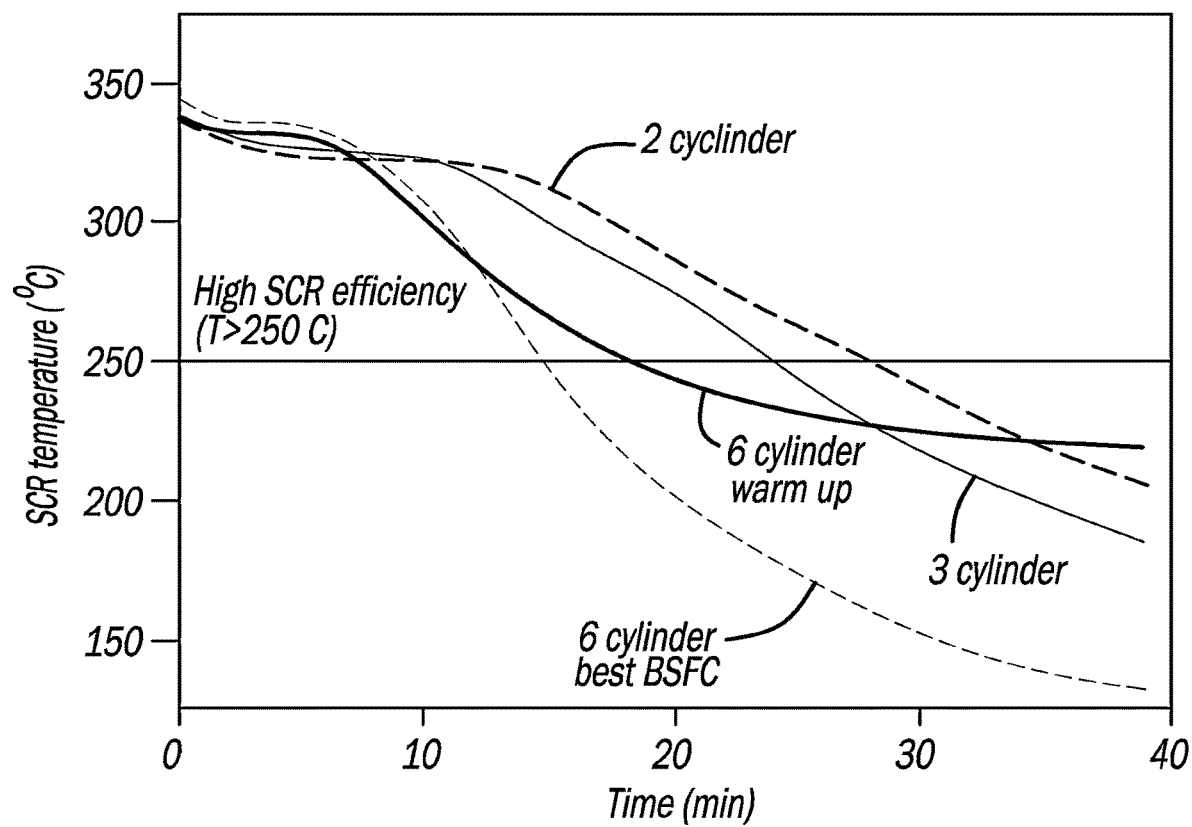
FIG. 19 illustrates temperature versus time for an SCR catalyst that decreases in temperature when running at idle for an extending period of time even when adding cylinder deactivation.

FIG. 18 illustrates background data demonstrating rated power getting hot in less than one minute. In the example shown a rated condition has 2500 RPM, 736 foot pounds of force, TIT of 710 degrees Celsius, TOT of 506 degrees Celsius and an exhaust flow of 24.46 kilograms per minute. While running at rated power and speed the SCR very quickly heats up to 200 degrees Celsius at 35 seconds and 300 degrees Celsius at 57 seconds. FIG. 19 illustrates temperature versus time for an SCR catalyst that decreases in temperature when running at idle for an extending period of time even when adding cylinder deactivation.

With reference now to FIGS. 19-34 additional features of the instant application will be described. While the previous description explains systems and methods for increasing temperature of an aftertreatment system at startup, the following description describes systems and methods for maintaining a hot temperature of an aftertreatment system after startup such as during idle. For the purposes of this disclosure "idle" is used to denote zero engine torque regardless of vehicle speed. Again, as used herein "hot temperature" is used to denote a temperature that satisfies an aftertreatment system that is operating at a temperature that satisfies acceptable operation. As will be described herein, the present system and methods use cylinder deactivation (CDA) and elevated idle engine revolutions per minute (RPM) to stay hot with intermittent generator load on the engine and/or use of an electric heater to keep the aftertreatment system at acceptable elevated (hot) temperature subsequent to startup such as during idle and thereafter.

With reference to FIG. 19, SCR catalyst will decrease in temperature when running at idle for an extended period of time, even when adding cylinder deactivation (CDA). It is desirable to avoid this temperature decrease while running at idle speeds and thereafter, such as during normal driving conditions to keep efficient operation of the aftertreatment system. While the aftertreatment system will tend to stay hot in CDA (such as in this case 2 cylinders firing), eventually the temperature will fall below desired levels (in this case below 250 degrees Celsius).

Figure 20:
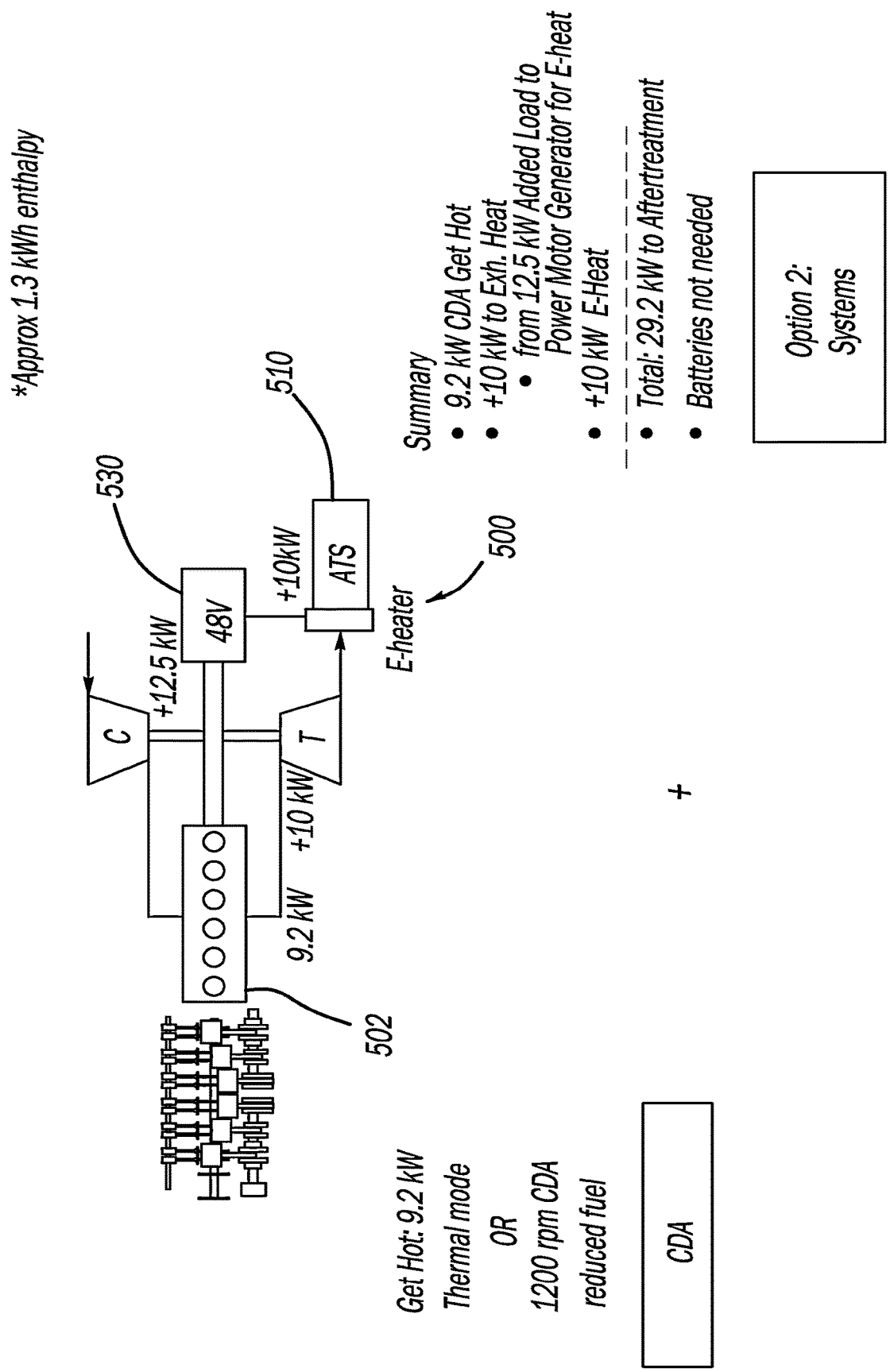
FIG. 20 illustrates a system and method for reaching elevated aftertreatment system temperatures in a short period of time achieving approximately 1.3 kWh of enthalpy according to one example of the present disclosure.
Figure 21:
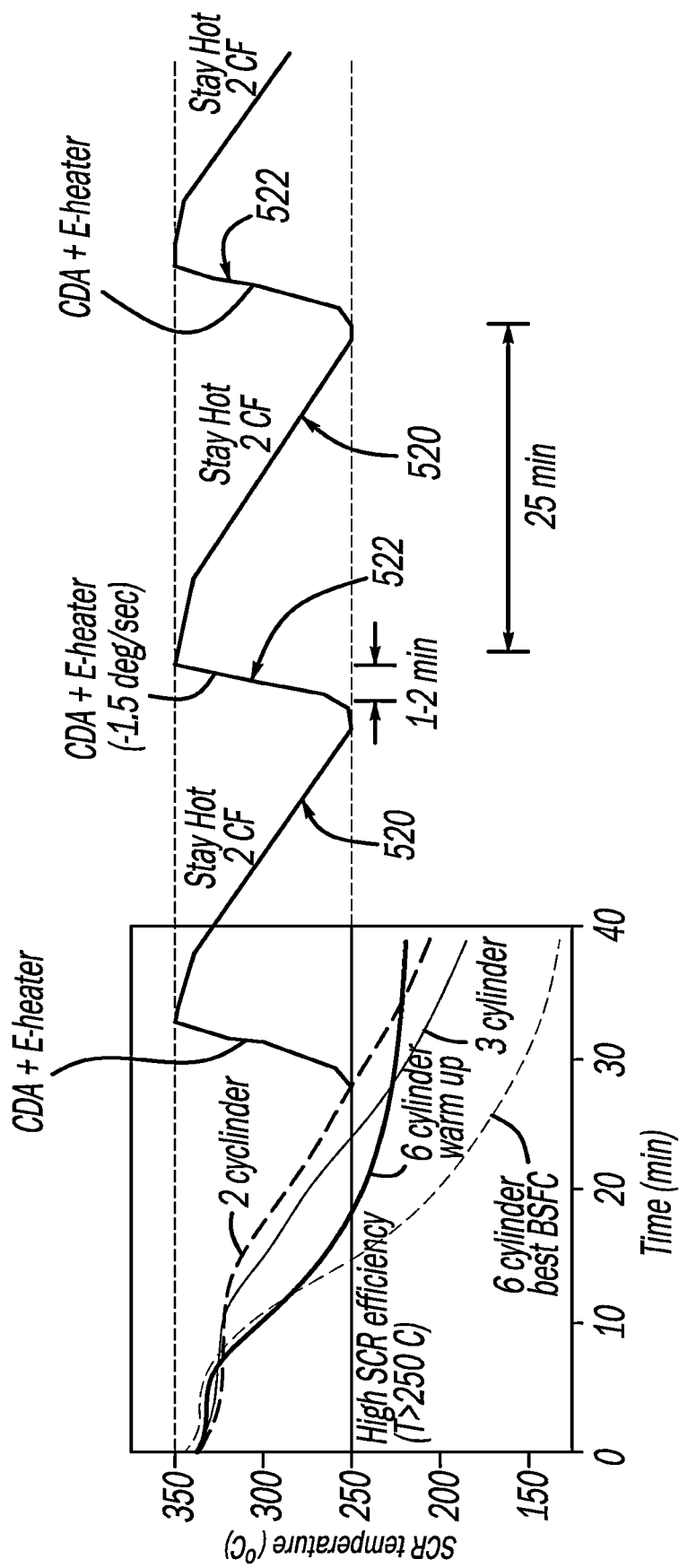
FIG. 21 illustrates temperature versus time when operating the system of the present disclosure to get hot and stay hot indefinitely according to the present disclosure.

With reference to FIGS. 20 and 21, the instant application can activate an electric heater (E-heater) 500 in conjunction with operating the engine 502 in CDA with elevated idle speeds to create elevated power (in this example 29 kW) and therefore elevated heat in the aftertreatment system (ATS) 510. The controller 250 (FIG. 1) can operate in an aftertreatment heat-up mode such that the ATS 510 is heated up to an elevated temperature. Emissions are thereby reduced based on the elevated temperature. The controller 250 is configured to heat up the ATS 510 to reach between 1 and 2 kilowatt hours (kWh) of enthalpy before two minutes at startup of the engine 12. In the particular example shown the ATS 510 is heated to achieve about 1.3 kWh of enthalpy. The target enthalpy is achieved by operating the engine 12 in CDA, operating the engine 12 at elevated idle speed, and operating the accessory device (electric heater 500) at a threshold power. By way of example only an elevated idle speed can be between about 1200 RPM for light duty trucks and 1500 RPM for medium duty trucks. Those skilled in the art will appreciate that an engine speed above a calibrated idle speed for a particular engine is within the scope of the instant application. By way of example, the electric heater 500 can be a 10 kW electrical heater. In one example, operating the engine in CDA and at elevated idle can provide between about 8 and 10 kilowatts of power. Running the electric heater 500 at 12.5 kW, assuming 80% conversion from mechanical to electrical can yield about 10 kW from the electric heater. Additionally, about 10 kW of exhaust enthalpy can be realized by running the engine 12 harder. In this regard, the controller 250 can operate the engine 12 and electric heater 500 in the manner described above to reach about 29 kW of power to satisfy the 1.3 kWh of enthalpy target.

In some systems, the E-heater 500 can increase aftertreatment temperatures about 1.5 degrees Celsius per second. In this regard, the aftertreatment system 510 can be heated up from about 250 degrees Celsius to about 350 degrees Celsius (using CDA and E-heater 500) in about one to two minutes. In the example shown, the aftertreatment system 510 can cool back down (in this example in CDA with two cylinders firing, no E-heater 500) to about 250 degrees Celsius in about 25 minutes. The instant method therefore provides a method of cycling in and out (on and off) of using the E-heater 500 to maintain acceptable aftertreatment temperatures of above 250 degrees Celsius at idle not just at startup but for extended (infinite) periods of time thereafter.

Figure 22:
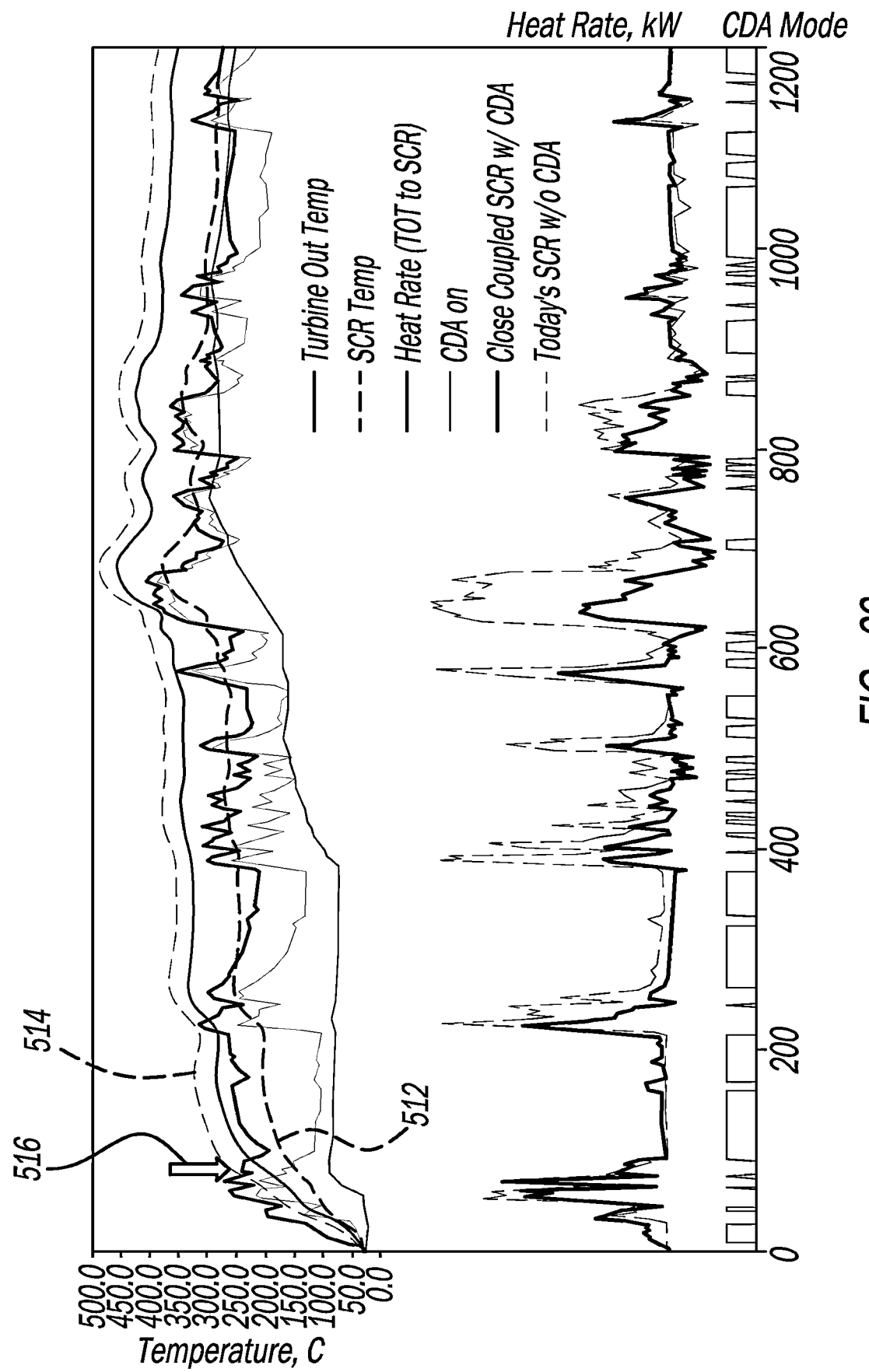
FIG. 22 illustrates a method of adding 19 kW of heating to the aftertreatment system to increase temperature about 1.5 degrees Celsius per second.

With reference to FIG. 22, 19 kW of heating is added causing the aftertreatment system 510 to increase temperature about 1.5 degrees Celsius per second. Line 512 indicates SCR temperature with CDA. With the E-heater 500 turned on, 19 kW of heating can be generated. While the plot in FIG. 22 is specific to getting hot at startup, the same principles are used to stay hot according to various methods of the instant application. Line 514 represents SCR temperature with CDA and E-heater 500 turned on resulting in attaining 250 degrees Celsius after 78 seconds. See arrow 516. At this point, the E-heater 500 can be turned off.

Returning to FIG. 21, if the engine 502 stays at idle, the temperature of the ATS 510 will tend to eventually decrease below the desired 250 degrees Celsius temperature (in this example a dwell time 520 of about 25 minutes). The instant disclosure anticipates this undesirable temperature drop and turns on the E-heater 500 to re-elevate the temperature in the aftertreatment system 510 during CDA plus E-heater influenced time 522 to maintain acceptable elevated temperatures for extended (infinite) periods of time even after startup. Notably, batteries 530 identified in FIG. 20 are not required for the system and method of the instant application. In other words, 48 Volt regulation is not needed. The voltage can vary during heating of the E-heater 500. The E-heater 500 essentially operates as a toaster and will take any of the power given to it. On highway, trucks typically have 12 Volt batteries while busses typically have 24 Volt batteries. The motor generator is two to four times that of today's battery (to get to 48 Volts). Again, the E-heater 500 can take any voltage. In this regard, a voltage greater than 48 Volts can be accepted by the E-heater as well.

Figure 23:
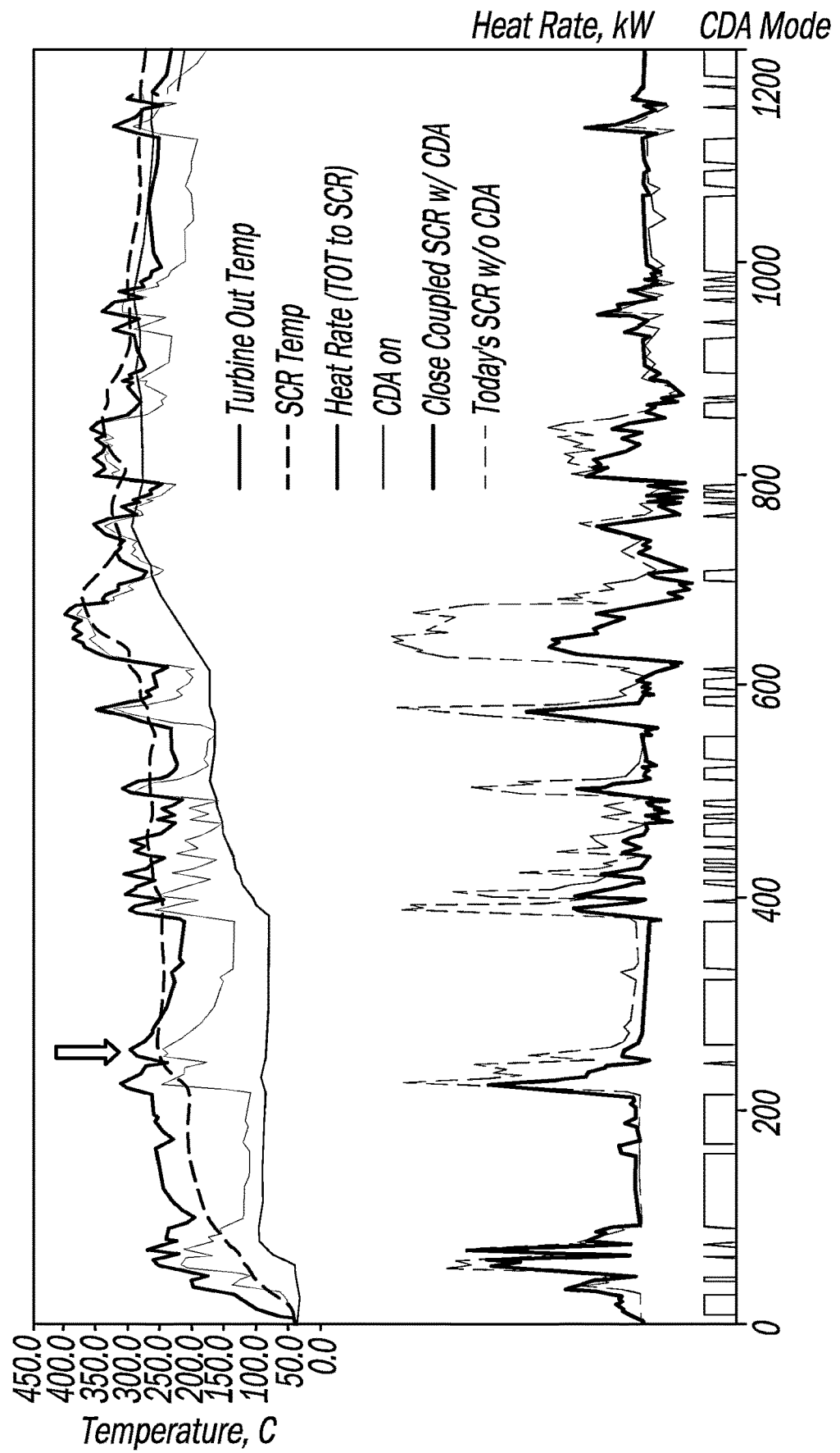
FIG. 23 illustrates a Federal Test Protocol heat up using another method of operating the system of the present disclosure by adding cylinder deactivation to reach 250 degrees Celsius at 249 seconds.
Figure 24:
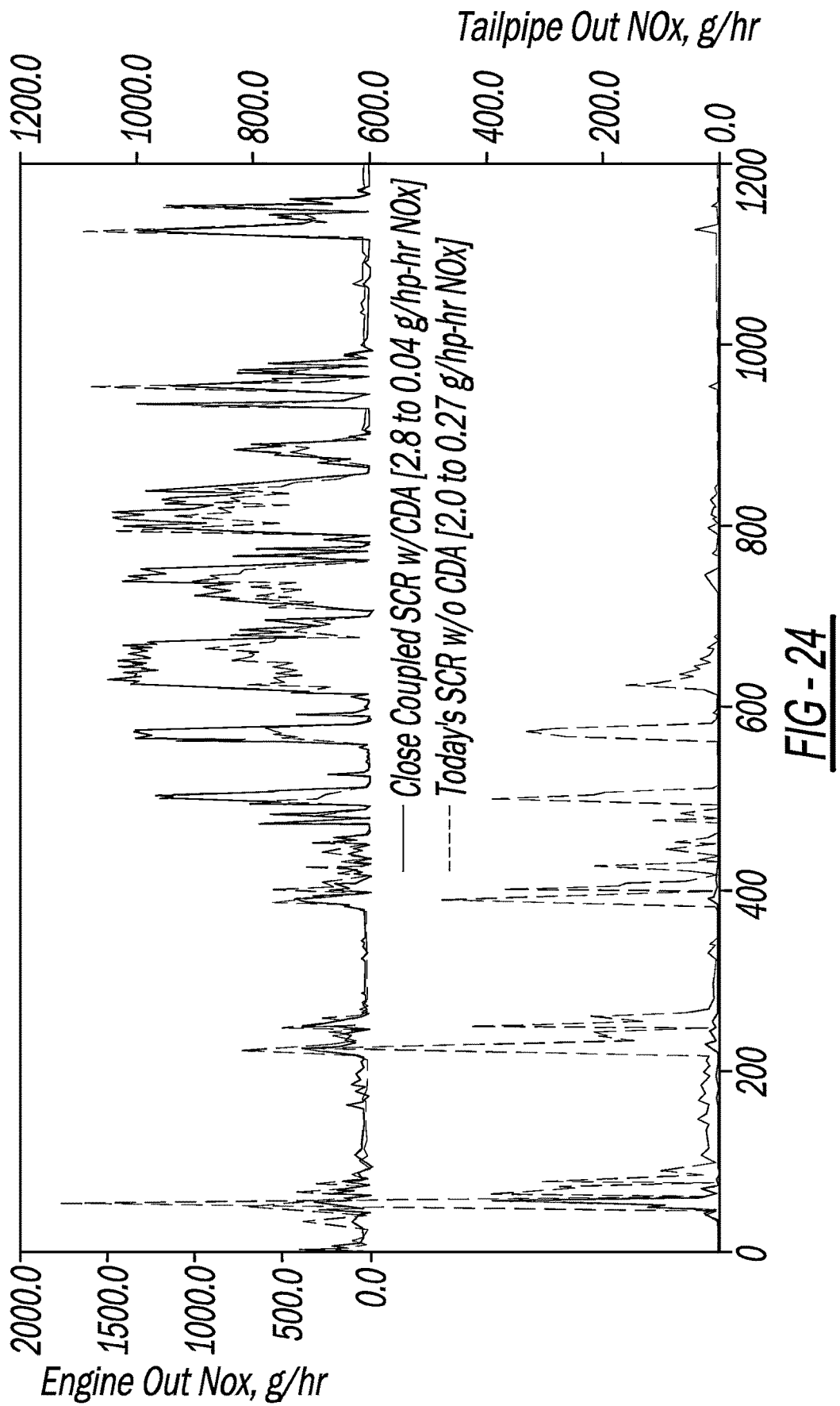
FIG. 24 illustrates a Federal Test Protocol illustrating nitrogen oxides at engine start up.
Figure 25:
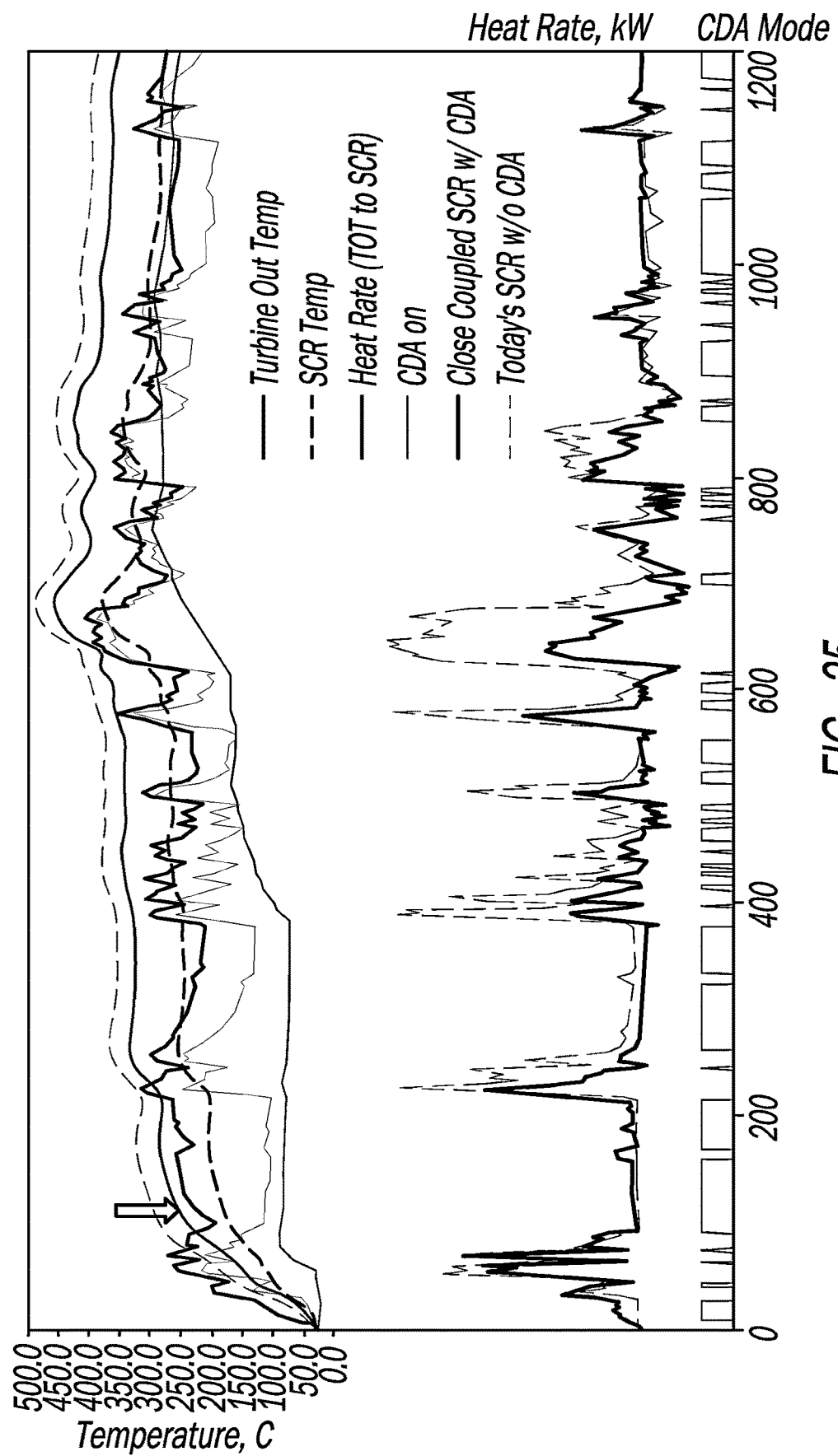
FIG. 25 illustrates a method of adding 10 kW heating to reach 250 degrees Celsius at 104 seconds.
Figure 26A:
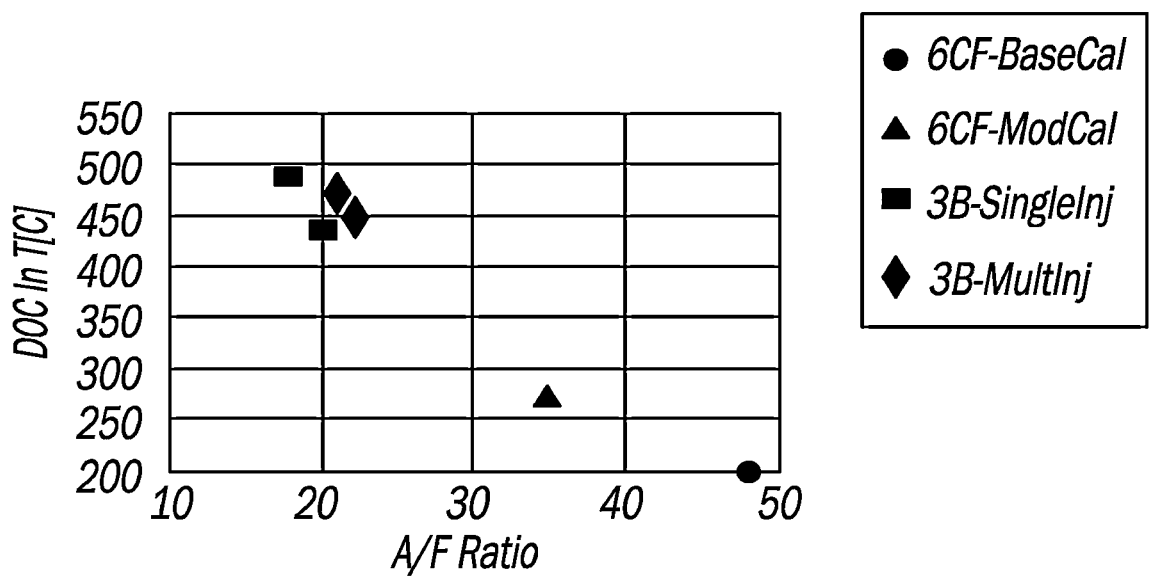
FIGS. 26A and 26B illustrates cylinder deactivation enabling close coupled catalyst allowing for SCR desulfation.
Figure 26B:
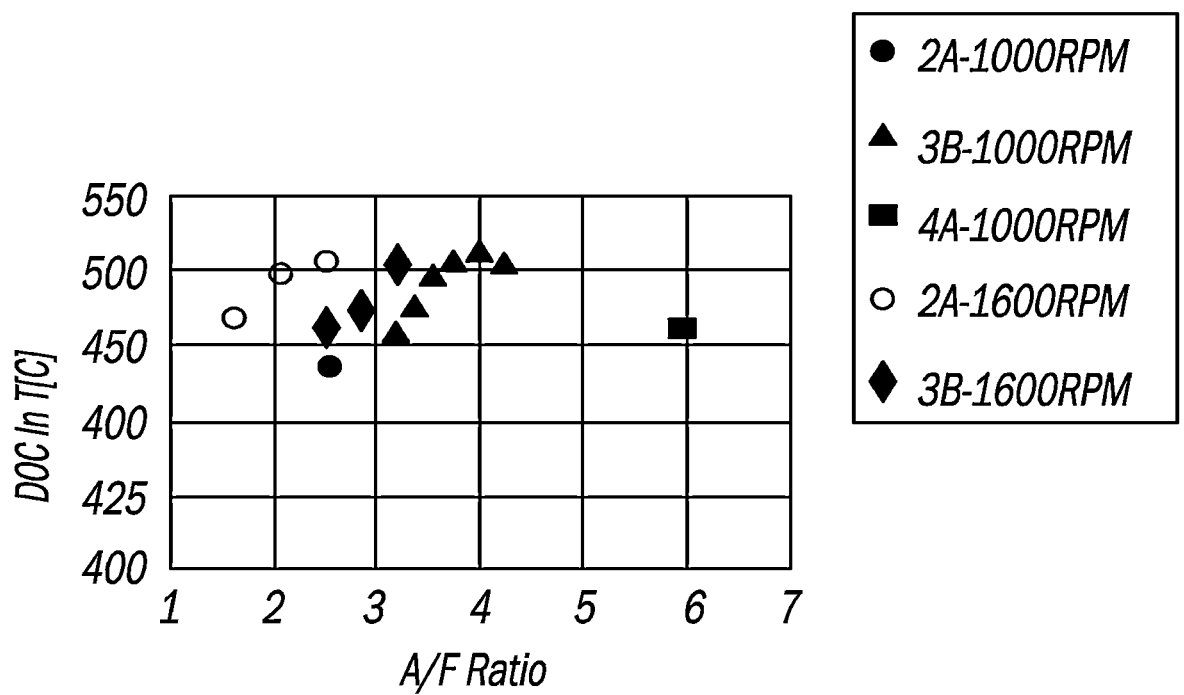

FIG. 23 illustrates a Federal Test Protocol heat up using another method of operating the system of the present disclosure by adding cylinder deactivation to reach 250 degrees Celsius at 249 seconds. FIG. 24 illustrates a Federal Test Protocol illustrating nitrogen oxides at engine start up. FIG. 25 illustrates a method of adding 10 kW heating to reach 250 degrees Celsius at 104 seconds. FIGS. 26A and 26B illustrates cylinder deactivation enabling close coupled catalyst allowing for SCR desulfation.

Figure 26C:
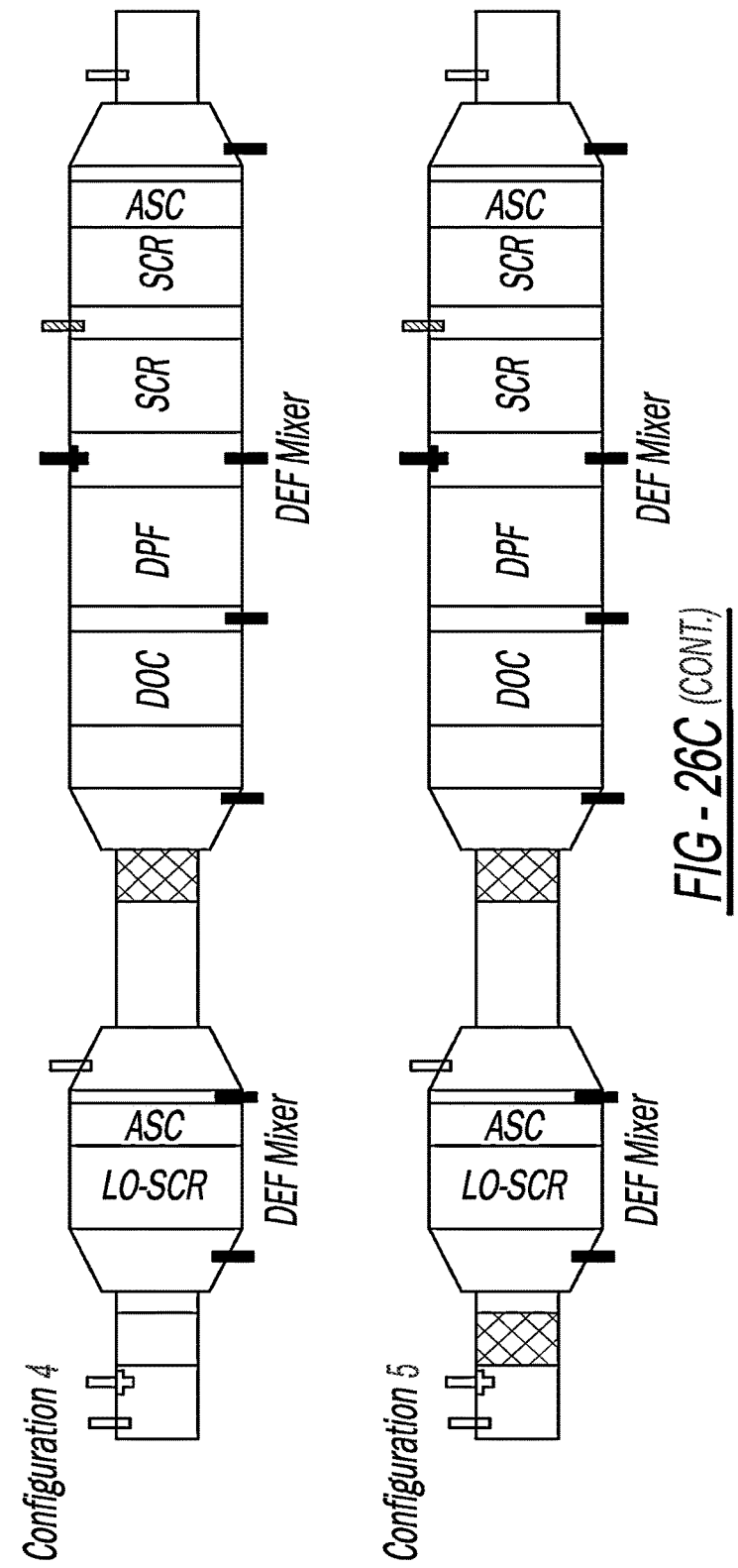
FIG. 26C illustrates two exemplary catalyst configurations according to the present disclosure.

FIG. 26C illustrates exemplary catalyst configurations according to the present disclosure. Fast heat-up can be had a start-up or in the case that the temperature of the aftertreatment assembly 214 drops during operation. A LO SCR can be close-coupled to the engine for fast heat-up at low load operation. One or more additional SCRs (two are illustrated) can be included downstream for medium and high load operations. Other configurations of injectors/dosers, sensors and filters are compatible with the teachings herewith. Configuration 1 shows positions of electric heaters ("eHeaters") in hashed lines. The eHeaters can be used and installed together or in the alternative. So, one eHeater can be used within a LO SCR unit, or one eHeater can be used within a dual SCR unit, or both eHeaters can be used together. The eHeaters can be electrified to add heat directly to the aftertreatment assembly 214. In configuration 2, an alternative arrangement places one eHeater before the LO SCR unit and a second eHeater within the dual SCR unit. These can also be used and installed in the alternative or together. So, an aftertreatment assembly 214 can comprise only one eHeater before the LO SCR. Or, an aftertreatment assembly 214 can comprise an optional LO SCR and eHeater in the SCR unit. Or, an aftertreatment assembly 214 can comprise both eHeaters. Configuration 3 places an eHeater only within the dual SCR unit. Configuration 4 places the eHeater before the dual SCR unit. Configuration 5 places one eHeater before the LO SCR unit and a second eHeater before the dual SCR unit. These examples illustrate the flexible placement of the eHeaters. It is to be understood that alternative aftertreatment assemblies exist in the art. For example, split SCR units exist such that branches of SCR units can be connected in parallel. As another example, the LO SCR can be omitted. The fuel doser can be heated or ambient, with the heater for the fuel doser being another potential load for direct-drive or battery powering. So, an eHeater can be used alone or in combination with a heated fuel doser. A DEF mesh mixer can be optionally used.

One or both eHeaters can be operated in Configurations 1-5 for fast heat-up. In a first example, only the eHeater before the LO SCR of Configuration 2 is powered and the second eHeater is omitted. Then, the eHeater can be powered until the LO SCR reaches a temperature of 225 Degrees Centigrade. A controller turns the eHeater on an off to maintain the temperature, as it can be sensed by a temperature sensor and appropriate feedback control. The temperature of the LO SCR provides good pollution management, but the added heat in the LO SCR does not drive up the SCR temperature beyond its efficiency setpoint. The SCR temperature can be, for example, 350 Degrees Centigrade to maximize its conversion efficiency. NH3 adsorption and storage can be had on the LO SCR catalyst. Other efficiencies for the LO SCR and SCR can be had. For example, the LO SCR can be most efficient in a range of 225-325 Degrees Centigrade while the downstream single or dual SCR is most efficient in a range of 300-400 Degrees Centigrade, among others.

In a second example, only the second eHeater is powered, and the first eHeater is omitted. The LO SCR unit is heated by way of the FIG. 31 technique of increasing engine speed and deactivating cylinders. The SCR unit is heated additionally by powering the eHeater in the aftertreatment assembly 214. eHeater is placed before the SCR unit to heat the exhaust before it enters the SCR unit. The eHeater is powered to bring the SCR unit to its efficient operating range.

In a third example, each of the eHeaters is independently controllable to operate separately to heat its respective LO SCR unit or SCR unit. The eHeaters can be controlled for fast heat-up. Or, when temperature sensors indicate a drop away from the efficient operating range, the eHeaters are controlled to heat the respective LO SCR unit or SCR unit back to an efficient pollution filtering temperature.

In a fourth example, each of the eHeaters is controllable together to operate to heat its respective LO SCR unit or SCR unit. If one of the units is cold, then both eHeaters are turned on together. If one unit has reached an upper threshold temperature, then both eHeaters are turned off.

One example controller is a PID (proportional-integral-derivative equation-driven controller). Then, proportional control of the heater maintains the LO SCR in its lower optimum range without requiring high penalties of electric consumption with unnecessary "extra" heat that could overheat either catalyst. In an alternative, a PWM (pulse width modulated) controller can be used to turn the eHeater on and off at a desired frequency. The frequency can be chosen to result in the desired 225 Degrees Centigrade LO SCR temperature. A high eHeater temperature and low or OFF condition can average out to the desired temperature via PWM. The temperature can be actual, average, or derived, as by placing temperature sensors as illustrated near the inlet and outlet or as by using a gas temperature sensor between the eHeater and the LO SCR, among other techniques.

The motor-generator can be powered by the engine to power the eHeater. This can increase the engine load and exhaust heat, facilitating aftertreatment heat-up. The motor generator can be used with or without the techniques of FIG. 31 to increase aftertreatment assembly temperature. Motor-generator control for powering the eHeater can be used with the CDA techniques of FIG. 31, but without the engine speed adjustments. Motor-generator control can be used for facilitating better NOx conversion that is measurable on any of the LLC, FTP, and stay-hot engine strategies.

Figure 27A:
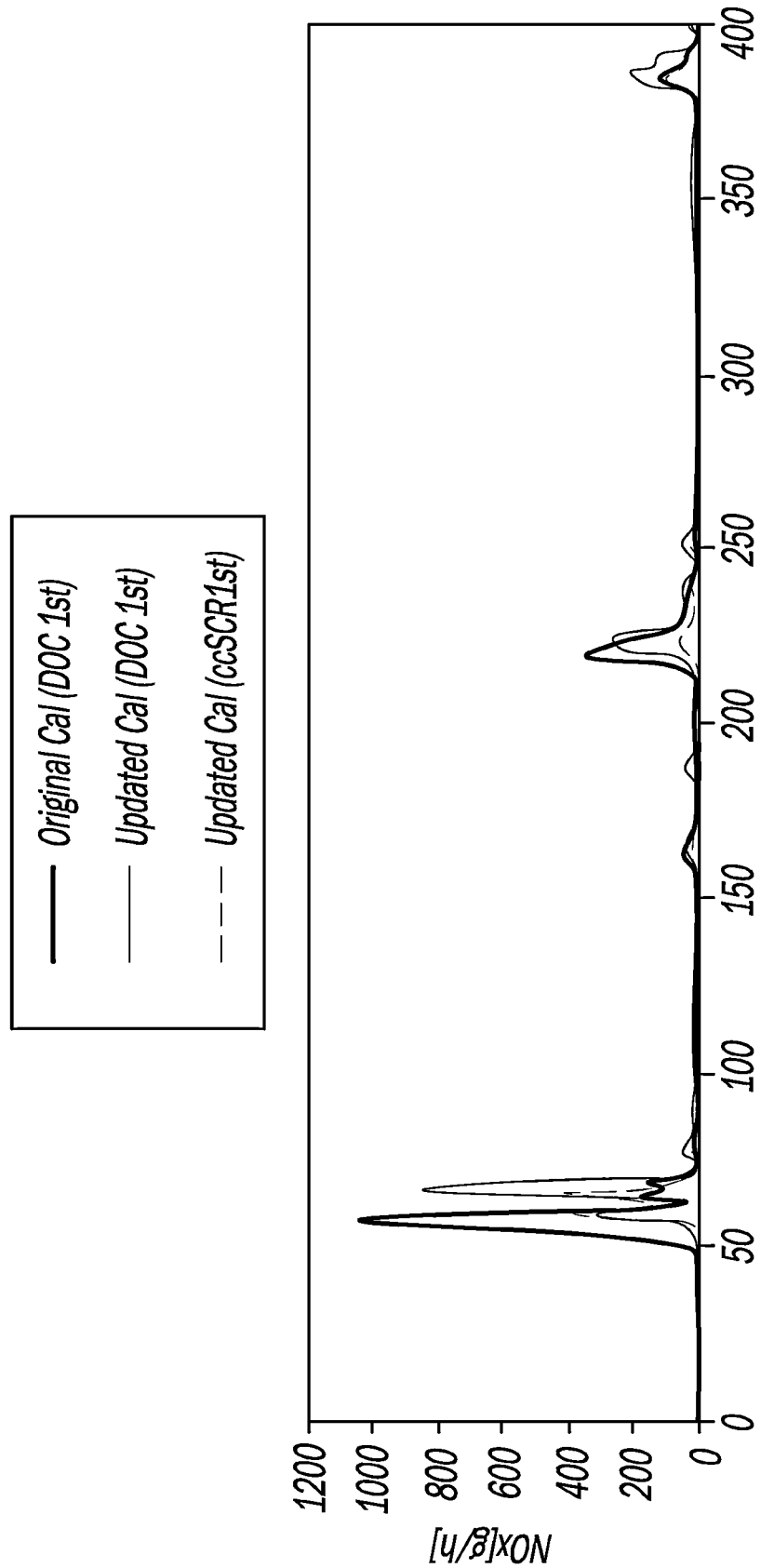
FIG. 27A is a plot of nitrogen oxide versus time illustrating an effect of moving one SCR upstream to get hot faster.
Figure 27B:
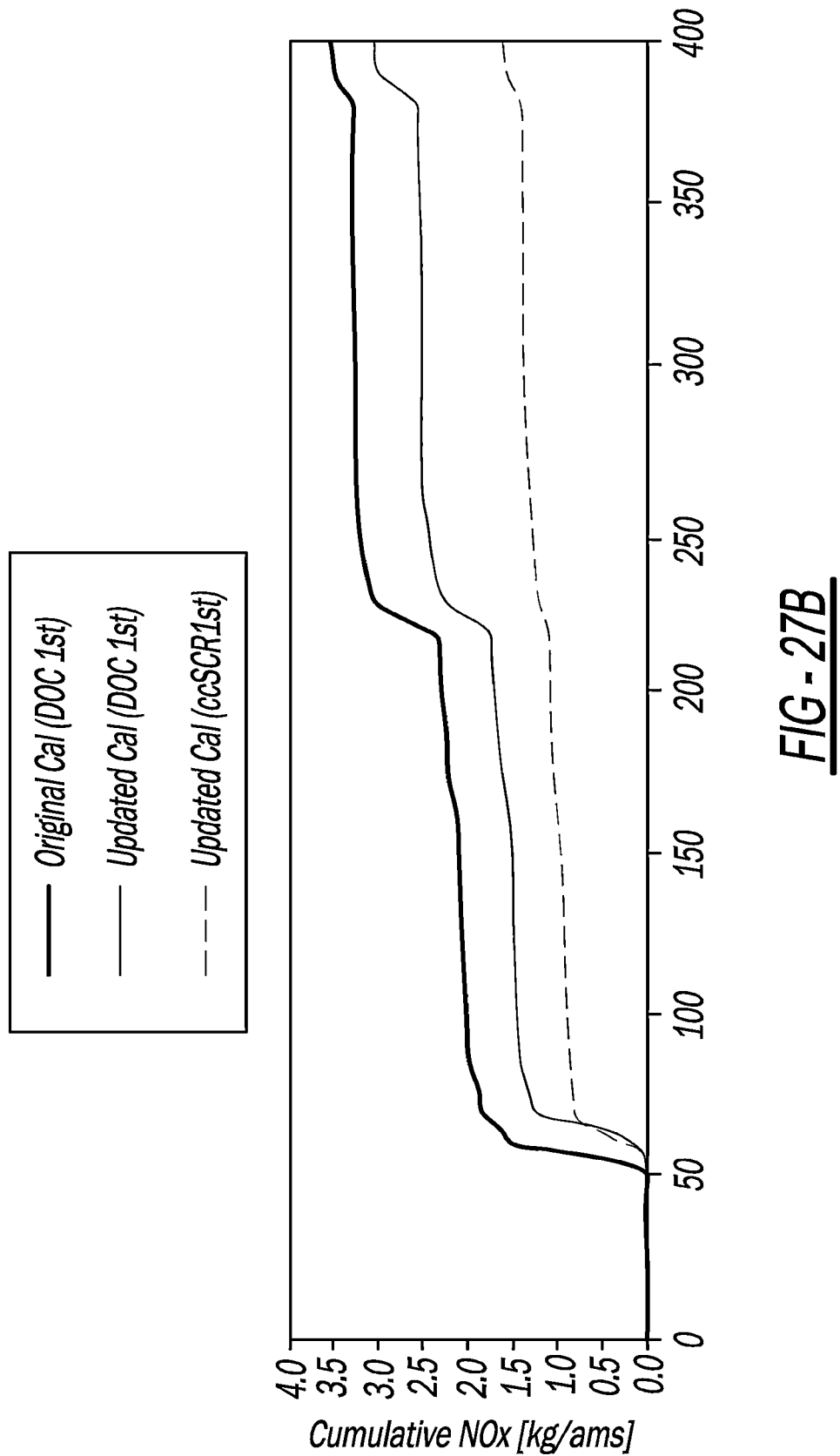
FIG. 27B is a plot of cumulative nitrogen oxide versus time illustrating an effect of moving one SCR upstream to get hot faster.
Figure 28:
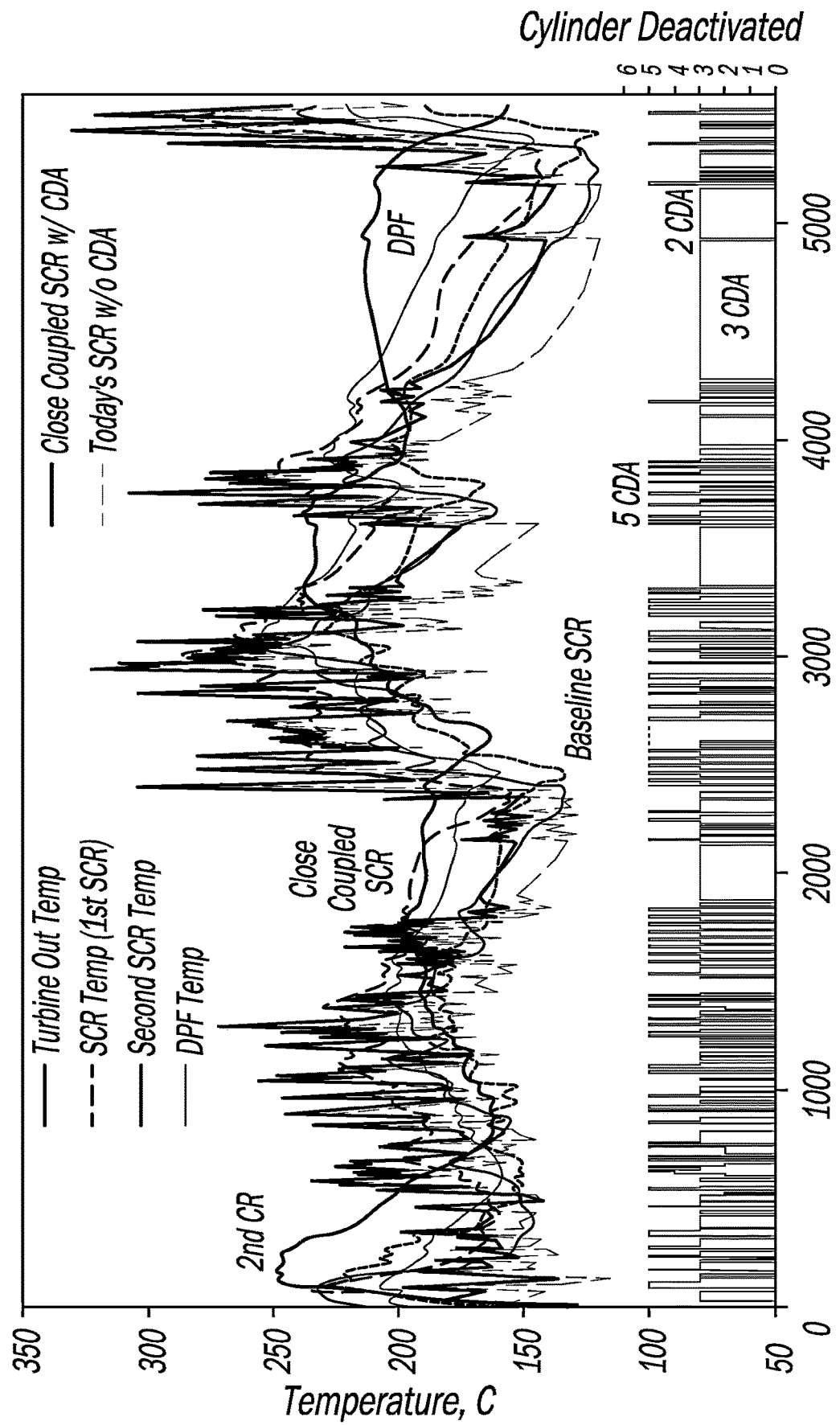
FIG. 28 is a plot of temperature versus time close coupled SCR with CDA and current SCR without CDA.
Figure 29:
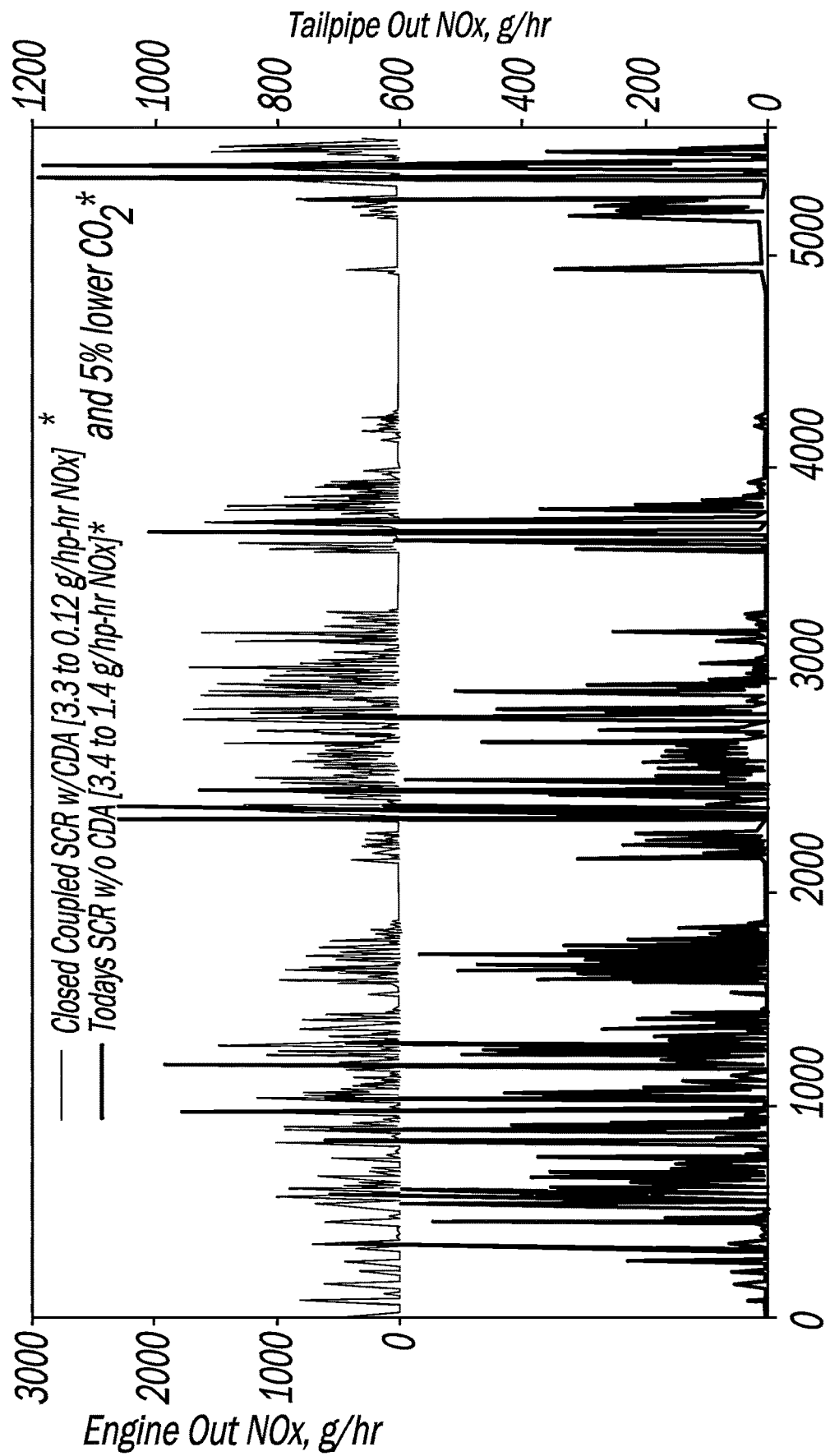
FIG. 29 is a plot of temperature versus time close coupled SCR with CDA and current SCR without CDA showing low load cycle having an order of magnitude lower nitrogen oxide and 5% Carbon Dioxide savings.
Figure 30:
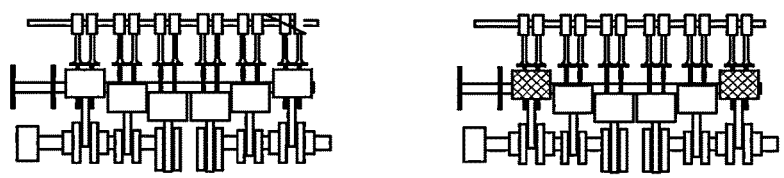
FIG. 30 illustrates a table showing various methods of getting the aftertreatment system hot quickly according to the present disclosure.
Figure 32:
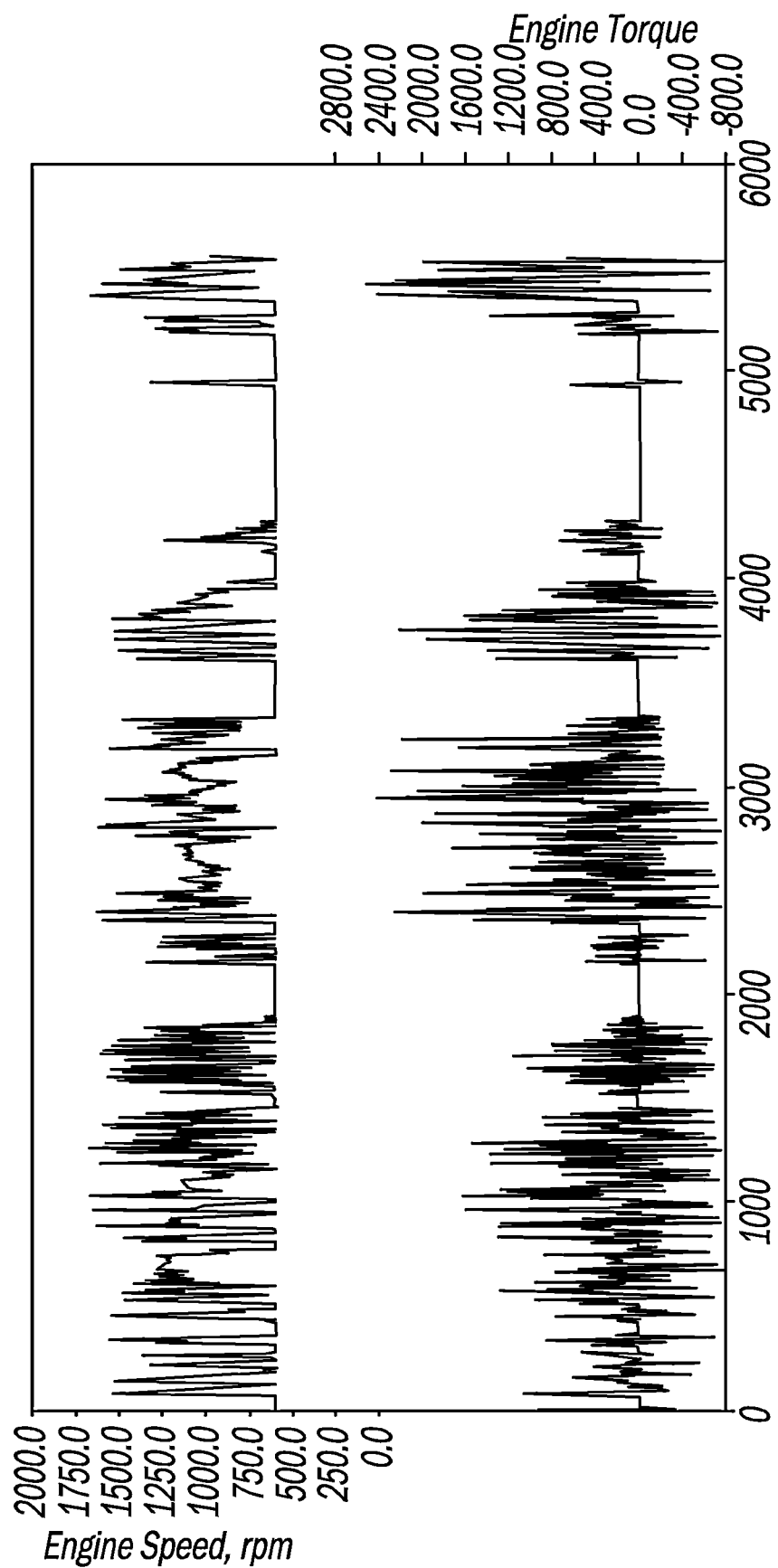
FIG. 32 is a plot of engine speed and engine torque versus time using the principles of the present disclosure.
Figure 33:
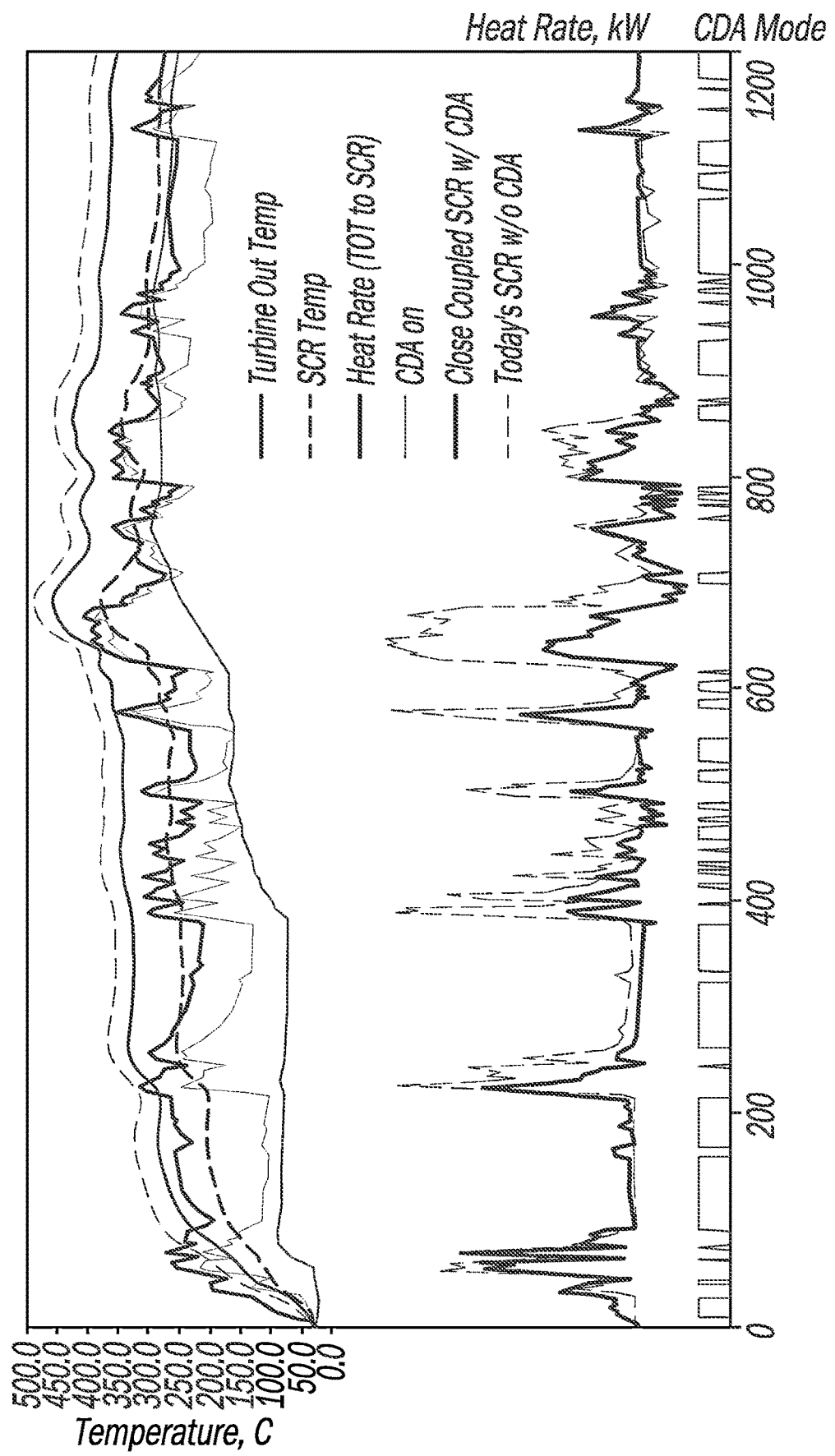
FIG. 33 is a plot of temperature and heat rate versus time shown adding 10 kW and 19 kW of heating according to the present disclosure.
Figure 34:
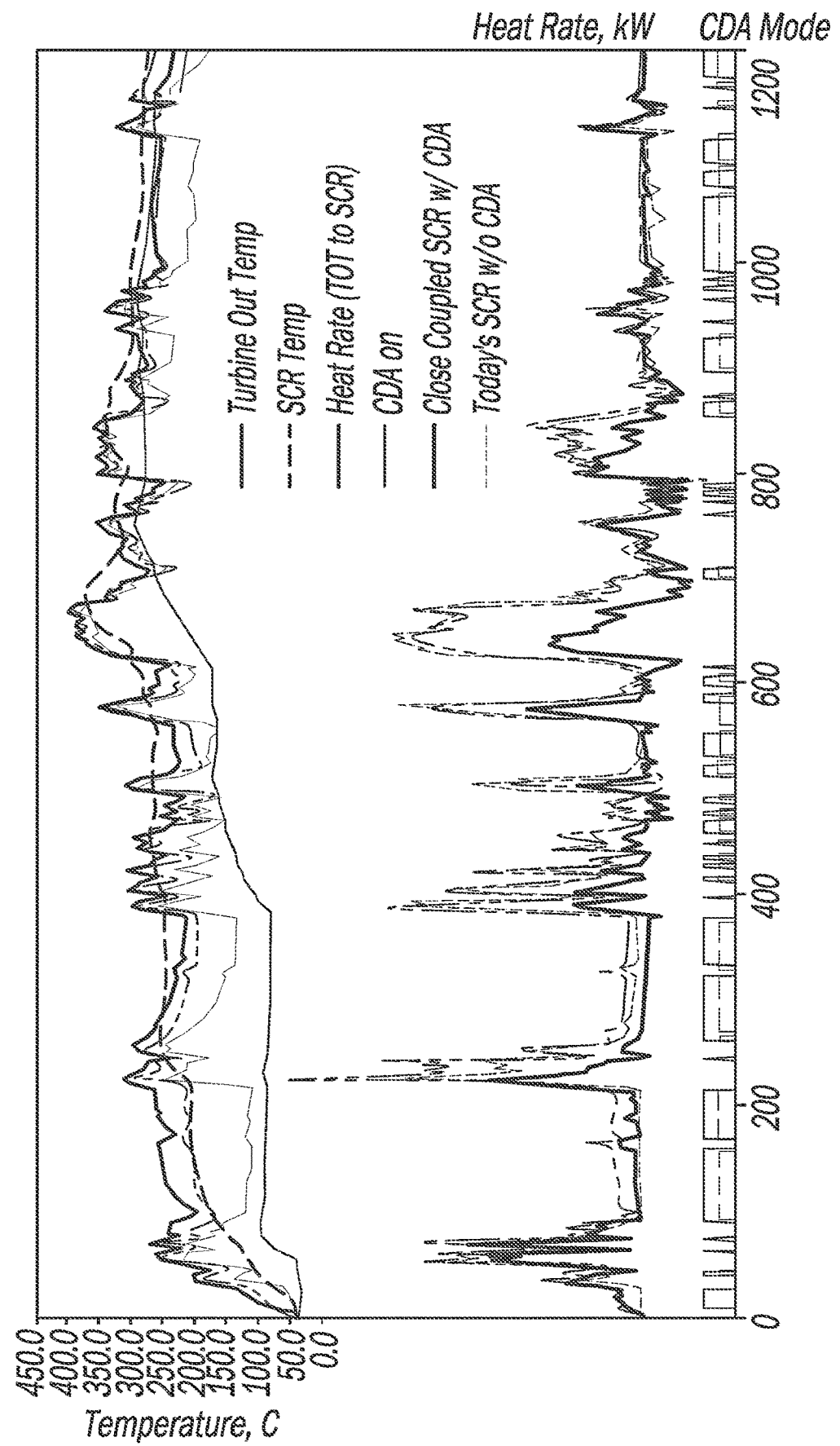
FIG. 34 is a plot of temperature and heat rate versus time showing a cold Federal Test Protocol heat up.

FIG. 27A is a plot of nitrogen oxide versus time illustrating an effect of moving one SCR upstream to get hot faster. FIG. 27B is a plot of cumulative nitrogen oxide versus time illustrating an effect of moving one SCR upstream to get hot faster. FIG. 28 is a plot of temperature versus time close coupled SCR with CDA and current SCR without CDA. FIG. 29 is a plot of temperature versus time close coupled SCR with CDA and current SCR without CDA showing low load cycle having an order of magnitude lower nitrogen oxide and 5% Carbon Dioxide savings. FIG. 30 illustrates a table showing various methods of getting the aftertreatment system hot quickly according to the present disclosure. FIG. 31 illustrates another table showing various methods of getting the aftertreatment system hot quickly according to the present disclosure. It is possible to increase the engine speed at idle from a baseline of 600 rotations per minute (RPMs) to 1000-2000 RPMs. This can add 15 kW for heating the aftertreatment. Adjusting among the number of cylinders firing (CF) further adjusts the exhaust temperature. The combination of 2 cylinders firing (4 cylinders deactivated) and increased RPMs can yield 279-296 Degrees Centigrade Turbine-Out-Temperature (TOT). The 202 & 251 Degrees Centigrade in the chart is augmented up to 279-296 Degrees Centigrade for a NOx-efficient aftertreatment assembly 214. FIG. 32 is a plot of engine speed and engine torque versus time using the principles of the present disclosure. FIG. 33 is a plot of temperature and heat rate versus time shown adding 10 kW and 19 kW of heating according to the present disclosure. FIG. 34 is a plot of temperature and heat rate versus time showing a cold Federal Test Protocol heat up.

Figure 35:
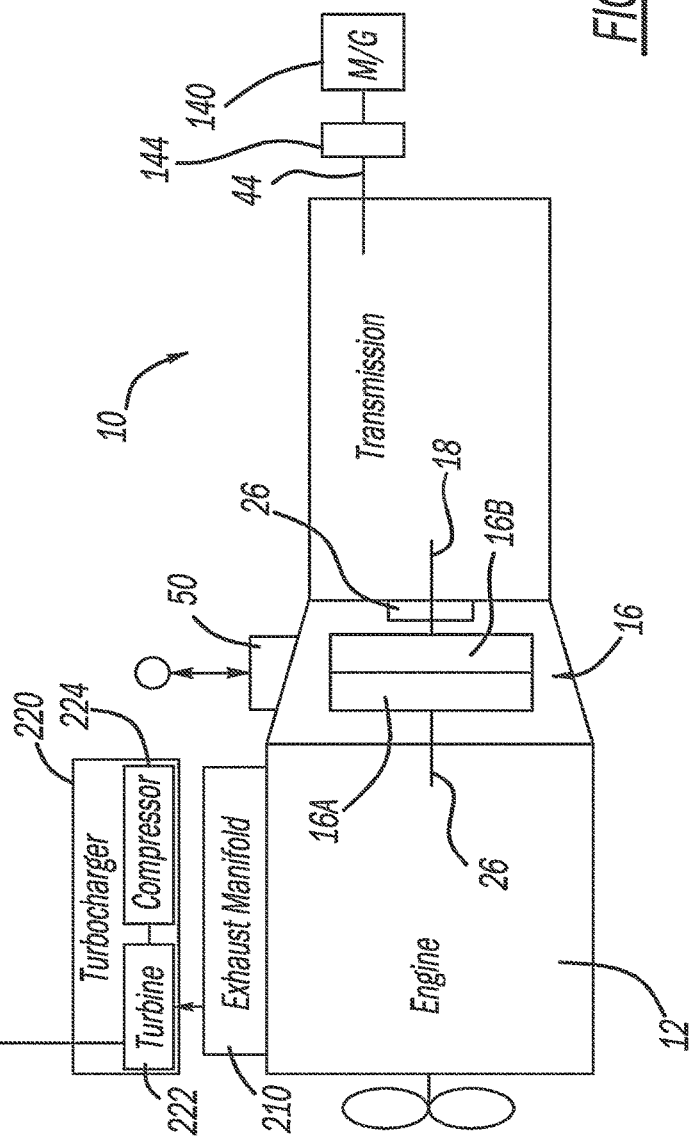
FIG. 35 is a schematic illustration showing a baseline get hot method.
Figure 36:
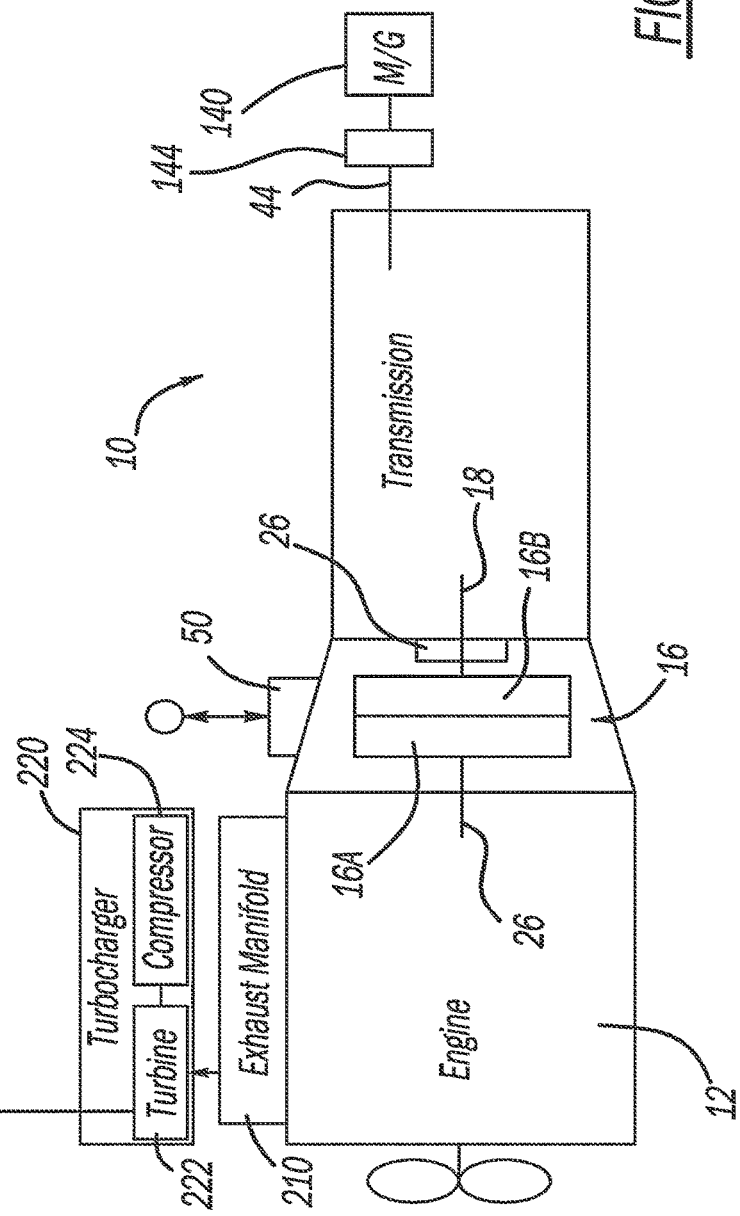
FIG. 36 is a schematic illustration showing a problem to solve by the instant application.
Figure 37:
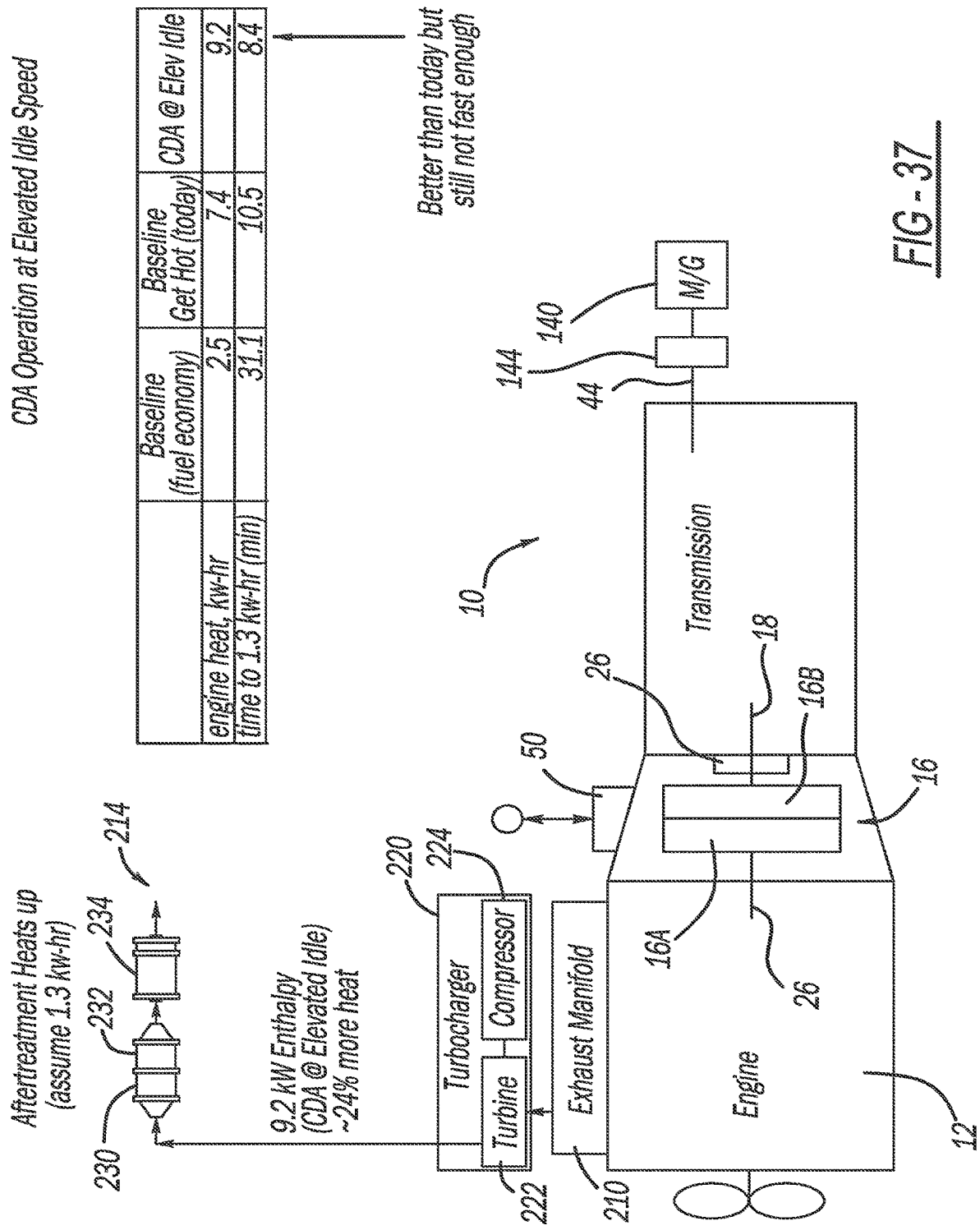
FIG. 37 is a schematic illustration showing operating the engine at CDA and elevated idle.
Figure 38:
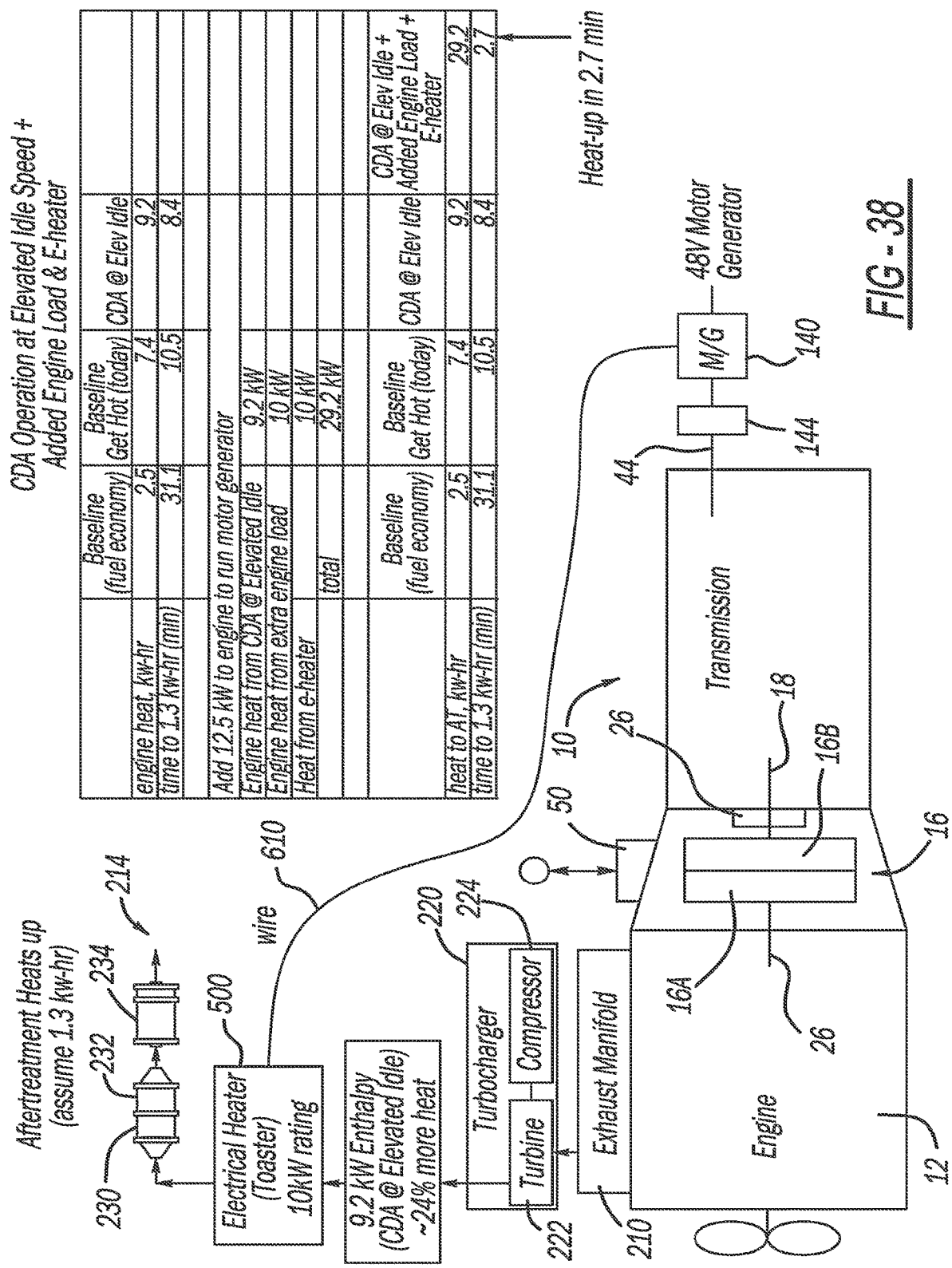
FIG. 38 is a schematic illustration of a transmission system according to the present disclosure configured to operate an engine at CDA and elevated idle while increasing engine load and operating an electric heater.
Figure 39:
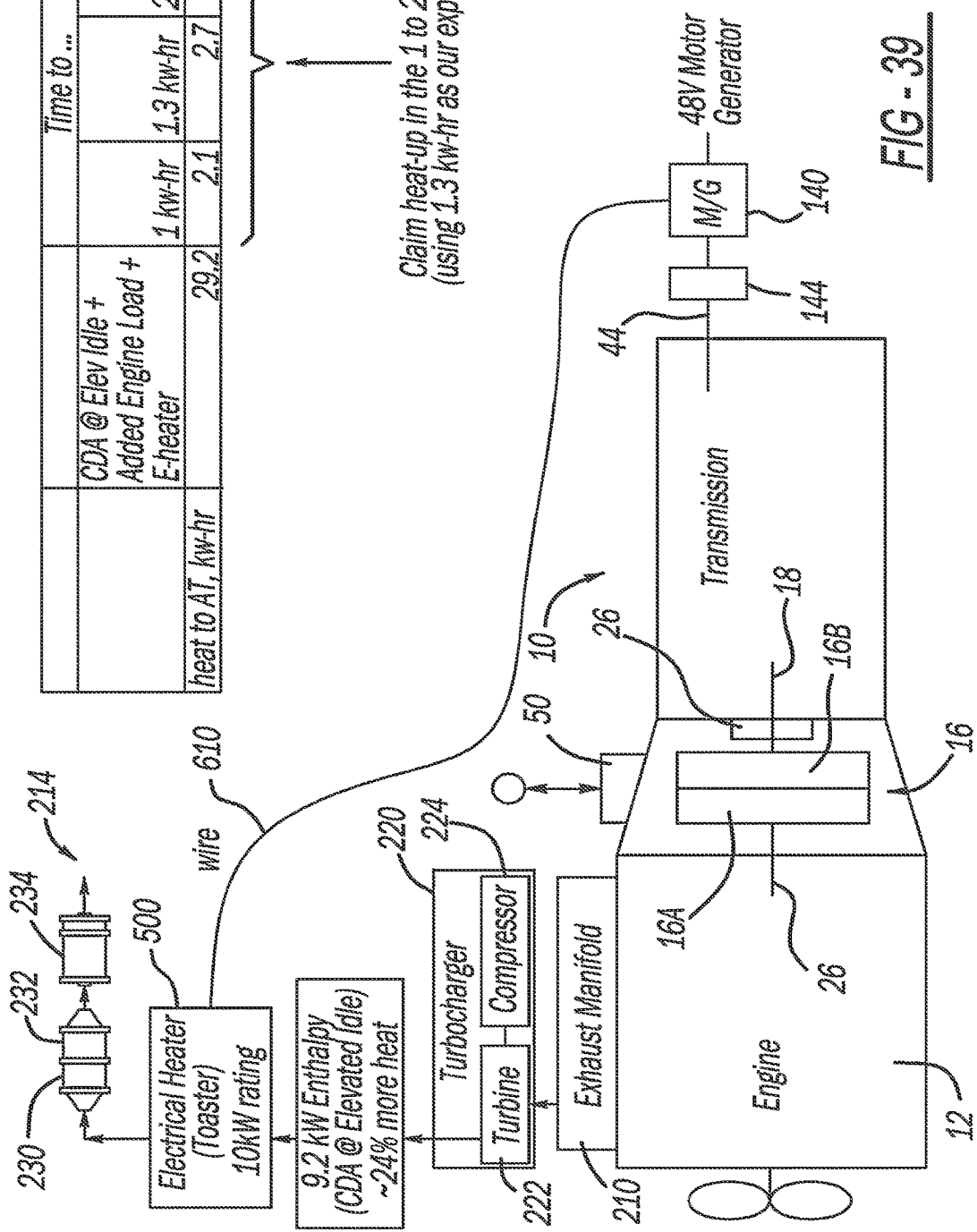
FIG. 39 is a schematic illustration of the transmission system of FIG. 38 showing various times to attain heat to the aftertreatment according to the present teachings.

Turning now to FIGS. 35-39 additional features will be described. FIG. 35 illustrates a baseline engine today during a get hot method. The method illustrated in FIG. 35 requires about 60% additional engine fuel to accomplish (as compared to not running a get hot method). During get hot, about 7.4 kW of enthalpy is provided to the aftertreatment 214 from the engine 12 which heats up the aftertreatment 214 in about 10.5 minutes. For comparison (not running get hot) during normal operation (fuel economy mode), about 2.5 kW of enthalpy is sent to the aftertreatment 214 from the engine 12. Referring now to FIG. 36, the problem the instant application sets out to solve is shown. The goal is to reach 1 to 2 kWh to heat up, using 1.3 kWh as a baseline. A higher grade heat is needed. One method includes running CDA at elevated idle speed (as discussed above) allowing engine heat operating at CDA and elevated idle to reach 9.2 kWh (see FIG. 20). This is 24% more heat than the baseline (7.4 kWh) shown in FIG. 35. In this regard, running with CDA and elevated idle speed is an improvement over the teachings of FIG. 35 but the present teachings, such as shown in FIG. 37, provide even more enthalpy in a reduced period of time. As shown in FIG. 38, the transmission system is operated using CDA and elevated idle (like explained in FIG. 36), but also adds engine load and e-heater 500 (FIG. 20) input. In this regard, 9.2 kW of enthalpy is provided by operating CDA and elevated idle. Added to that is an electric heater 500 providing 10 kW. A wire 610 electrically connects the motor generator 140 and the electric heater 500.

As illustrated in FIG. 38, 12.5 kWh is provided to the engine 12 to run the motor generator 140. Engine heat from running at CDA and elevated idle provides 9.2 kW, engine heat from running the engine 12 at extra load is 10 kW, and heat from the electric heater 500 provides 10 kW all collectively adding to 29.2 kW. With 29.2 kW, the aftertreatment 214 can heat up to 2.7 minutes.

Building further on FIG. 31, it is possible to combine the elevated RPMs with the CDA modes and further heat-up the aftertreatment assembly 214. The motor-generator can be powered to add more exhaust energy. For example, 9 kW of exhaust energy can be added by connecting a 12 kW load to the motor-generator. The direct-drive accessories noted above could provide the load. Or, the load can be in the form of an electric heater, also called an eHeater. Electricity can be directed to an eHeater to add to the aftertreatment assembly temperature. The eHeater does not have to be very large to have a fast heat-up impact.

For example, it is possible to implement a 5 kW eHeater upstream of the LO SCR and still achieve a fast heat-up of the aftertreatment assembly 214. Cylinder deactivation consistent with FIG. 31 can be combined therewith for fuel efficient fast heat-up.

Figure 42A:
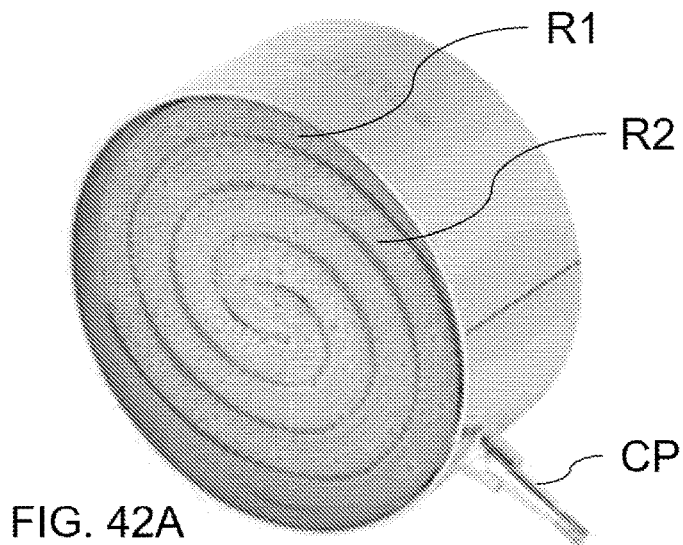
FIG. 42A-42E are schematics for explaining a 2-coil eHeater.
Figure 42D:
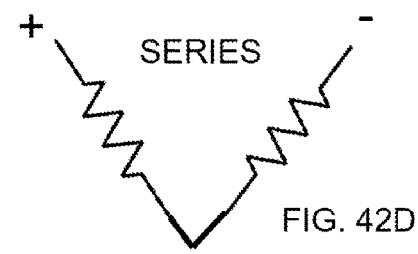
Figure 42E:
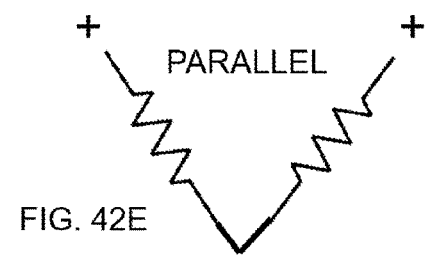
Figure 42B:
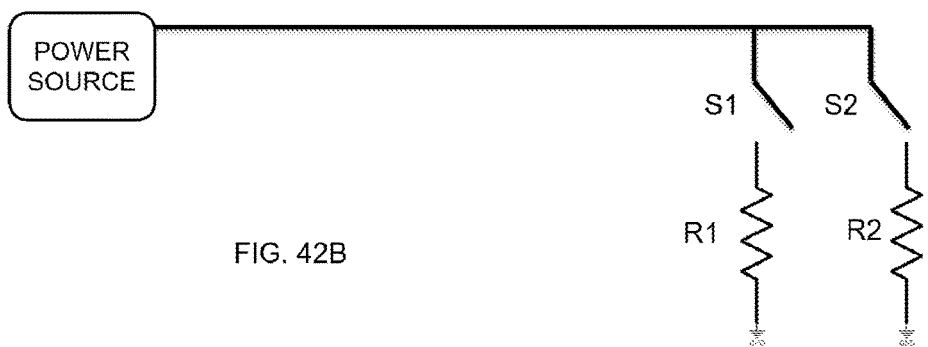

In an alternative outlined in FIGS. 42A-42B, an eHeater can comprise two resistive coils R1, R2 wound into a single eHeater unit. Each coil R1, R2 can be independently controlled, as shown in FIG. 42B. A power source such as the motor generator or batteries or regenerative brakes can supply power when one of switches S1, S2 are closed. Power settings from the power source can be fixed or power control devices and algorithms can be applied via a control port CP that can be linked to the power source as by controller 250 or ECU 28. Or, power control electronics can be included between the power source and the eHeater. The power control devices associated with the power source can select the power setting applied across each switch S1, S2, S3. The voltage (V) at the power source can control the desired current (I) at the resistor (R) to yield the power (P) in kW according to $I^2R=P$.

When using AC power, such as from an alternator, as the power source, a microprocessor and modulator combination can be implemented. Master control programming can be used, or discrete programming at the power source, or power electronics like microprocessors or subassemblies. An AC to DC converter can be implemented. Or, the alternator can be a DC output with a lot of ripple. Or, the alternator can be a positive/negative output AC alternator. Or, the alternator can be continuously driven. Or, the alternator can comprise coils turned on and off to create power. The alternator can be any one of the disclosed voltage outputs: 12V, 24V, 48V or a higher electric vehicle output. One advantage of the alternator is that it can use a low kW and get a glow on the coils regardless of the voltage output.

As one control example, the alternator can be ramped up and ramped down to get the desired power setting to the eHeater. As another control example, controls can be added to interrupt or switch the power supply form the alternator to the eHeater. For example, from battery charging to eHeater control. Or, from alternator power to motor-generator power. In yet another alternative, each coil can be controlled by a different power source. So, the alternator could power one coil, while the motor generator powers the other coil. Or, the batteries can power one coil and the other coil can switch between the alternator and the motor generator. In yet another example, one power source per coil can be used. A first power source can supply 0.5 kW to a coil while a second power source supplies 1.25 kW to a second coil.

Multiphase arrangements can be had so that each coil R1, R2 can have more than one phase, and more than one switch, applied to it. Sensed voltages and currents of the multiphase arrangement can yield the requested power at the coils R1, R2. By having, for example, 4 or 6 phases applied to the coils of the eHeater, noise cancellation is possible as is electromagnetic compatibility (EMC) and electromagnetic interference (EMI) avoidance.

Switchable devices for switches S1, S2, S3 can comprise relays, MOSFETs, or other switches. Bucks and safety structures can be added. As another alternative, the resistive elements of the coils R1, R2 can be substituted with inductive elements. However, additional control circuitry is needed for an inductor that would not be needed for a resistive element. When using AC voltage, as from an alternator, it can be possible to include more than one circuit to control each coil R1, R2. Phasing control, such as MOSFETs can be implemented. Power sequencing for stable operation can be implemented.

The coils R1, R2 can be arranged in series (FIG. 42D) for higher voltage and lower current, or they can be arranged in parallel (FIG. 42E) for lower voltage and higher current. The resistance value can also be adjusted. For example, for a 10V application, a 0.1 OHM eHeater coil R1 yields 1000 W. This is unlike 32V operations with 1 OHM needed for the same 1000 W. So, it is desirable to match the resistive element to the voltage of the system to yield the low kW outputs outlined above and in the Tables.

Figure 42C:
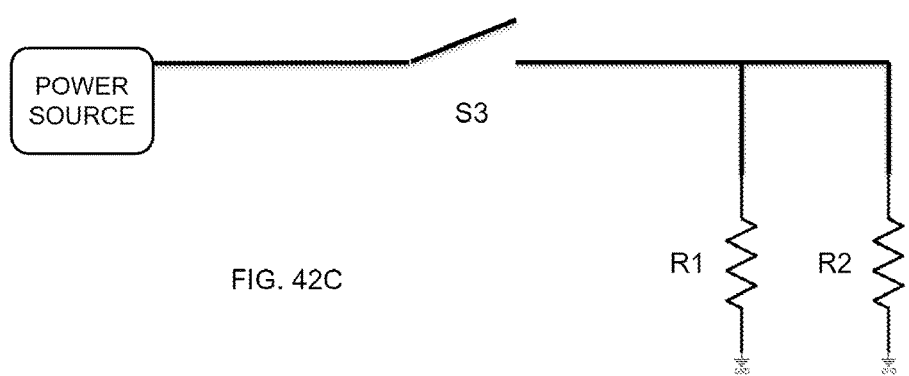

Each coil can have a low power consumption, for example, 6 kW. But, the aggregate heating is 12 kW of heat. Then, the voltage of the system can accommodate the low power consumption of the individual coils. Each coil can be controlled separately (FIG. 42B) or together (FIG. 42C). For example, each coil can draw 6 kW together, for a 12 kW load on the system. Or, one coil at a time can draw 6 kW in a cycle pattern so that the load on the motor generator or battery is limited to 6 kW at any one time. Additional amperage considerations can influence the selection of the eHeater. For example, in a 48 V DC system, a 5 kW eHeater can draw 104 amps. But, a 24 V DC system would draw 208 amps. And, a 12 V DC system operating a 5 kW heater would need to handle 416 amps. So, in the case of the 12 V DC system, the heater capacity can be limited to 3.5 kW to protect the system from high amperage. The eHeater can provide effective fast heat-up at other values, for example 1.25 kW, 2.5 kW, 2.75 kW, or 10 kW.

Figure 41:
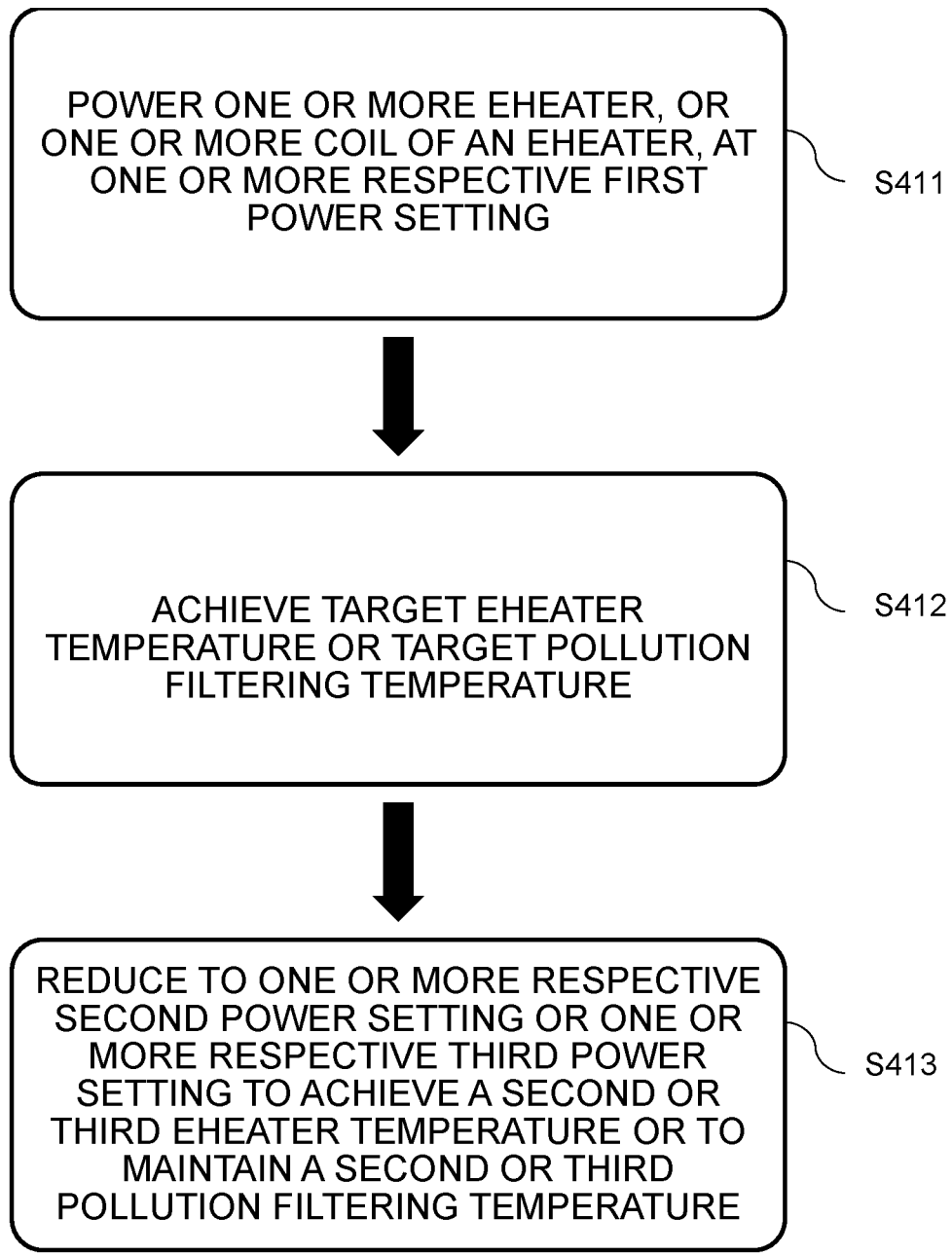
FIG. 41 is a flow diagram for supplying power to one or more eHeater or eHeater coil.

In addition to cycling between the first coil and the second coil of the eHeater, it can be advantageous to cycle the power applied to each coil or to the eHeater in total. So, a control strategy can comprise, like FIG. 41 outlines, applying a first power to an eHeater to achieve a first temperature set-point in step S411, and then switching to a lower power setting as in step S413. A working example comprises heating the eHeater before or within a LO SCR to 275 Degrees Centigrade during a fast heat up mode. Then, during a "stay hot" or operational mode outside of start-up, a second power setting heats the eHeater to 200 Degrees Centigrade. The heat up temperature during start up is higher to get hot fast for pollution filtering. But, a lower power setting can be used on the eHeater when the system is loaded and the exhaust is hotter by way of idle or operation.

Using Configuration 1 as a working example, an additional strategy can comprise heating the SCR unit eHeater during start-up at a first power setting, for example 5 kW. Then, during idle or operation, the eHeater of the LO SCR unit and the eHeater of the SCR unit are each operated at 2.5 kW. Or, only the LO SCR unit eHeater is operated at 2.5 kW, or the eHeaters are alternately operated at 2.5 kW.

As another working example, a first power setting can be an upper setting, for example 5 kW. A second power setting can be a low power setting, for example 1.25 kW. A third power setting can be in the middle, for example 2.5 kW. Then, as a working example, start-up, idle or coast, or loaded idle conditions can be accommodated, among other operational modes such as cruise or platooning.

When temperature feedback control is applied, such as returning to the PID or PWM examples, temperature set points such as 300-400, 250, & 190-200 Degrees Centigrade can be feedback control points, with the power setting adjusted or modulated to achieve the control point temperature. Then, a sensed temperature of the eHeater can be a target temperature or a sensed temperature for a target pollution filtering temperature can trigger a switch to one of the new power settings, as in step S412.

Figure 40:
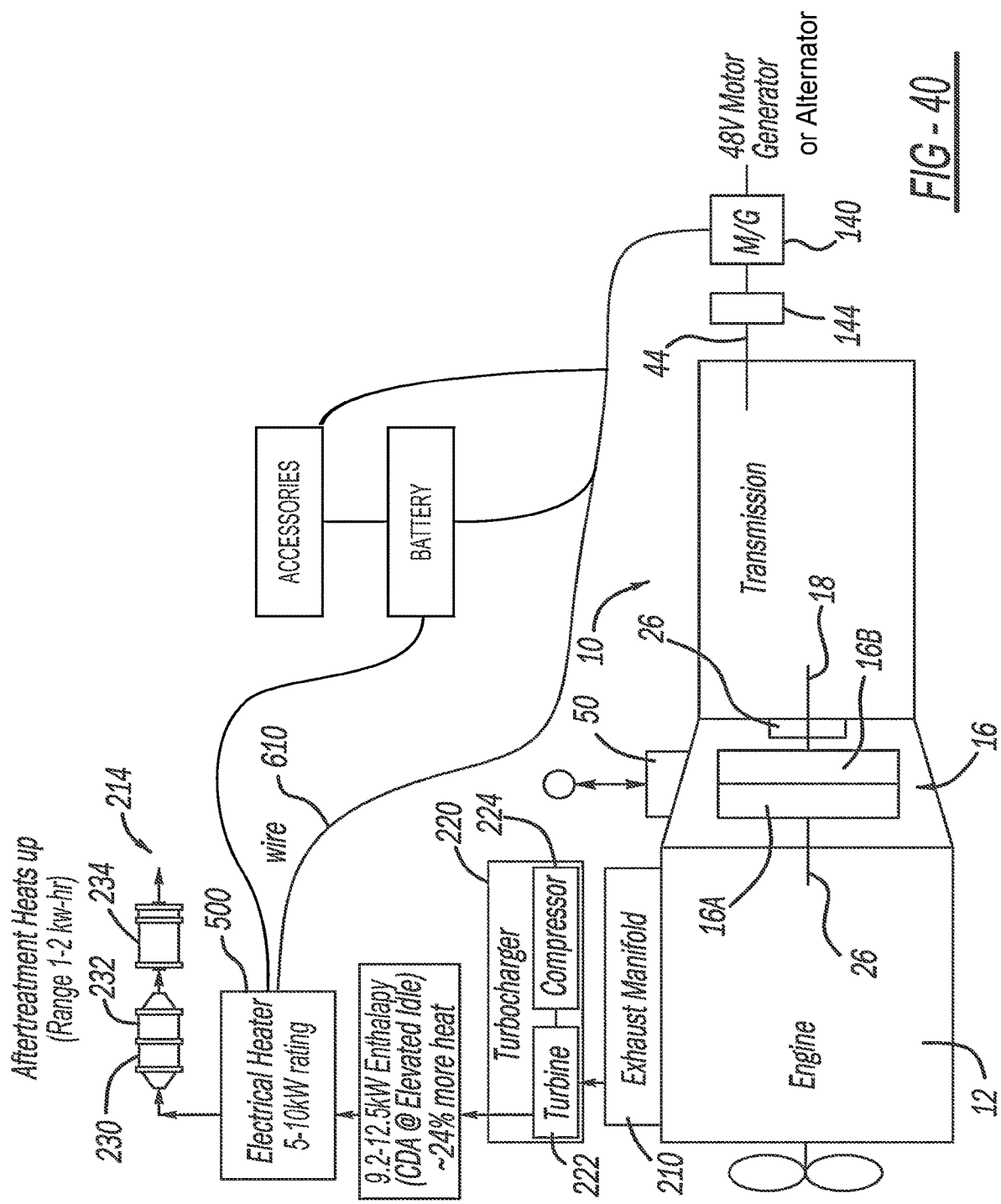
FIG. 40 is a schematic illustration of another transmission system configured for aftertreatment heat up.

Turning to FIG. 40, another schematic alternative is shown where the motor-generator 140 can be applied to the batteries or to the electrical heater 500 (any one or more of the above eHeaters of FIG. 26C). In the illustration, the electrical heater 500 is before the LO SCR of the DOC 230. An additional or alternative electrical heater can be included before or within the SCR 234, or the electrical heater 500 can be within the LO SCR unit herein labeled DOC 230, consistent with the alternative teachings above. The motor-generator 140 can optionally be applied to direct-drive the accessories simultaneously or alternatively with the electrical heater 500 or battery charging. Consistent with the teachings of FIGS. 4B-4E, as another option, energy from the batteries or wheels can be used to power the electrical heater 500.

To enable fast heat-up consistent with FIG. 31, cylinder deactivation can be applied to some of the cylinders of the engine 12 along with an elevated engine speed to yield 9.2-12.5 kW enthalpy. At start-up, this can mean elevating the engine RPMs to higher values while reducing the number of cylinders firing (CF). For example, the engine can be adjusted from 600 RPMs to 800 RPMs, or from 800 RPMs to 1000 RPMs, among other increases in RPMs. The fuel injection to the cylinders firing can be increased.

FIG. 40 also shows that the electrical heater 500 can comprise a 5-10 kW rating. Together with the CDA & RPM increase, the aftertreatment heats up fast with an expenditure of about 1-2 kW-hr.

Additional alternatives exist. For example, the electrical heater 500 can comprise a lower rating, such as between 1-2.5 kW. A maximum power of 2.5, 2.0, 1.5, or 1.0 kW can be applied to the eHeater. Table 1 below shows that the low power eHeater can be used in 12 V, 24V, or 48 V systems, with a limiting factor being Amperage. In systems that cannot accommodate more than 100 Amps, the larger power settings of the eHeater cannot be used. In some systems, a particular kW power setting is not available due to other system settings.

TABLE 1

| kW  | Volt | Amps | Volt | Amps | Vlot | Amps |
|-----|------|------|------|------|------|------|
| 2.5 | 48   | 52   | 24   | 104  | 12   | 208  |
| 2.4 | 48   | 50   | 24   | 100  | N/A  | N/A  |
| 2.0 | 48   | 42   | 24   | 83   | 12   | 167  |
| 1.5 | 48   | 31   | 24   | 63   | 12   | 125  |
| 1.2 | N/A  | N/A  | N/A  | N/A  | 12   | 100  |
| 1.0 | 48   | 21   | 24   | 42   | 12   | 83   |

Since the prior art largely posits that 30-50 kW is needed to heat up the aftertreatment assembly 214, the eHeater arrangements herein are much smaller than previously thought possible. The smaller eHeater has its own heat-up benefits when used alone, but especially when combined with CDA & engine speed-up.

As another alternative working example, and using Configuration 4 as an example, an eHeater is not placed in front of the LO SCR. It is placed in front of (upstream of) the SCR unit. This eHeater position can use 3-5 kW of power since the SCR unit is not benefitting from the eHeater upstream of the LO SCR unit. As one example, 3-4.8 kW of energy is used in a 48 V system to maintain the maximum current draw at 100 Amps. This eHeater strategy can be used with or without CDA and with or without engine RPM speed-up and still yield aftertreatment heat-up benefits. For example, 2.5 kW power setting of the eHeater can be used with a 48V system and CDA. Or, a 2.4 kW power setting can be used in either a 48 V or 24 V system with CDA. For lower power settings, a 2.0 or 1.5 kW power setting can be used on the eHeater with a 48 V or 24 V system and CDA. Table 2 outlines these and other options. Again, the Amperage can limit the application, as a system could require additional settings to go above 100 Amps. Some eHeater power settings could be excluded without implementing additional system settings.

TABLE 2

| kW  | Volt | Amps | Volt | Amps | Volt | Amps |
|-----|------|------|------|------|------|------|
| 5.0 | 48   | 104  | 24   | 208  | 12   | 417  |
| 4.8 | 48   | 100  | 24   | 200  | 12   | 400  |
| 3.0 | 48   | 63   | 24   | 125  | 12   | 250  |
| 2.5 | 48   | 52   | 24   | 104  | 12   | 208  |
| 2.4 | 48   | 50   | 24   | 100  | N/A  | N/A  |
| 2.0 | 48   | 42   | 24   | 83   | 12   | 167  |
| 1.5 | 48   | 31   | 24   | 63   | 12   | 125  |
| 1.2 | N/A  | N/A  | N/A  | N/A  | 12   | 100  |
| 1.0 | 48   | 21   | 24   | 42   | 12   | 83   |

Using Configuration 3 as another working example, an eHeater is placed within the SCR unit upstream of the dual SCR filters. CDA is used to heat up the LO SCR unit while the eHeater is used to heat up the SCR unit. With CDA already contributing to heat-up, a low power setting can be applied to the eHeater, much lower than the 30-40 kW of the prior art. For example, a maximum power setting of 1.0-2.4 kW can be used on a 48 V or 24 V system. As another example, a 1.2 kW power setting of the eHeater is compatible with 12V, 24 V, and 48 V systems. With the 12 V compatibility, standard equipment is compatible for powering the eHeater. The heat-up with the low power setting can be with or without CDA and with or without engine RPM speed up. Table 3 outlines compatible power settings for the eHeater. Amperage can be a limiting factor. And, some system settings can make a power setting incompatible for this working example.

TABLE 3

| kW  | Volt | Amps | Volt | Amps | Volt | Amps |
|-----|------|------|------|------|------|------|
| 2.5 | 48   | 52   | 24   | 104  | 12   | 208  |
| 2.4 | 48   | 50   | 24   | 100  | N/A  | N/A  |
| 2.0 | 48   | 42   | 24   | 83   | 12   | 167  |
| 1.5 | 48   | 31   | 24   | 63   | 12   | 125  |
| 1.2 | N/A  | N/A  | N/A  | N/A  | 12   | 100  |
| 1.0 | 48   | 21   | 24   | 42   | 12   | 83   |

Based on the above Tables 1-3, it can be understood that the power electronics setup can be made to limit eHeater power usage. A power setting in a 48 V system can comprise an upper limit of 2.5 KW for an eHeater placed upstream of an SCR filter. Or, a power setting in a 24 V system can comprise an upper limit of 2.4 kW for an eHeater placed upstream of an SCR filter. Or, a power setting in a 12 V system can comprise an upper limit of 1.2 kW for an eHeater placed upstream of an SCR filter.

In additional implementations, CDA and accessory load during low-load cycles can be provided such as under proposed regulatory low-load cycle (CARB and EPA), that is looking at approximately 90% reduction from state of the art. Moreover, the present teachings can reduce extended idle limits. In particular, current day includes 30 gallons per hour. The present teachings can be used to achieve 10 gallons per hour in 2024 and less than 10 gallons per hour for 2027 and beyond. Extended idle can include about 15 minutes. Other time frames are contemplated.

The foregoing description of the examples has been provided for purposes of illustration and description. It is not intended to be exhaustive. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. A method of controlling temperature of exhaust aftertreatment, comprising:
   applying a first power of 5 kW or less to an electric heater located upstream or within a selective catalytic reduction (SCR) device in an aftertreatment system to achieve a first temperature set-point of the electric heater;
   detecting the first temperature set-point of the electric heater; and
   after achieving the first temperature set-point, applying a second power to the electric heater, wherein the second power is a lower power than the first power.

2. The method of claim 1, wherein the SCR device is a light-off SCR (LO-SCR).

3. The method of claim 1, further comprising turning the electric heater on and off to maintain the first temperature set-point.

4. The method of claim 1, further comprising operating an internal combustion engine at an elevated idle speed.

5. The method of claim 4, further comprising operating the internal combustion engine in a cylinder deactivation (CDA) mode.

6. The method of claim 5, further comprising heating the aftertreatment system to reach 1.3 kWh.

7. The method of claim 4, further comprising suspending an aftertreatment heat-up mode after the aftertreatment system reaches between one (1) and two (2) kWh of enthalpy until a SCR device temperature falls below a threshold, wherein the aftertreatment heat-up mode comprises applying the first power to the electric heater, operating the internal combustion engine at the elevated idle speed, and operating the internal combustion engine in CDA mode.

8. The method of claim 7, further comprising re-entering the aftertreatment heat-up mode upon the SCR device temperature falling below the threshold until a temperature of the aftertreatment system returns to between one (1) and (2) kWh of enthalpy.

9. A controller, configured to:
   apply a first power of 5 kW or less to an electric heater located upstream or within a selective catalytic reduction (SCR) device in an aftertreatment system to achieve a first temperature set-point of the electric heater;
   detect the first temperature set-point of the electric heater; and
   after achieving the first temperature set-point, apply a second power to the electric heater, wherein the second power is a lower power than the first power.

10. The controller of claim 9, wherein the SCR device is a light-off SCR (LO-SCR).

11. The controller of claim 9, wherein the controller is further configured to turn the electric heater on and off to maintain the first temperature set-point.

12. The controller of claim 9, wherein the controller is further configured to direct an internal combustion engine to operate at an elevated idle speed.

13. The controller of claim 12, wherein the controller is further configured to direct the internal combustion engine to operate in a cylinder deactivation (CDA) mode.

14. The controller of claim 13, wherein the controller is further configured to suspend an aftertreatment heat-up mode upon the aftertreatment system reaching between one (1) and two (2) kWh of enthalpy until a SCR device temperature falls below a threshold, wherein the aftertreatment heat-up mode comprises applying a first power to an electric heater, directing the internal combustion engine to operate at the elevated idle speed, and directing the internal combustion engine to operate in the CDA mode.

15. The controller of claim 14, wherein the controller is further configured to re-enter the aftertreatment heat-up mode upon the SCR device temperature falling below the threshold until a temperature of the aftertreatment system returns to between one (1) and (2) kWh of enthalpy.

16. The controller of claim 13, further wherein the controller is configured to heat up the aftertreatment system to reach 1.3 kWh of enthalpy.

17. A transmission system selectively coupled to an engine crankshaft of an internal combustion engine arranged on a vehicle, the transmission system comprising:
   a transmission having an input shaft, a mainshaft, an output shaft and a countershaft offset from the input shaft, the countershaft drivably connected to the input shaft and the mainshaft; an aftertreatment system that reduces emissions in an exhaust of the internal combustion engine;
   an electric heater; and
   a controller, wherein the controller is configured to:
      apply a first power of 5 kW or less to an electric heater located upstream or within a selective catalytic reduction (SCR) device in the aftertreatment system to achieve a first temperature set-point of the electric heater;
      detect the first temperature set-point of the electric heater; and
      after achieving the first temperature set-point, apply a second power to the electric heater, wherein the second power is a lower power than the first power.

18. The transmission system of claim 17, wherein the SCR device is a light-off SCR (LO-SCR).

19. The transmission system of claim 17, wherein the controller is further configured to direct the internal combustion engine to operate at an elevated idle speed.

20. The transmission system of claim 17, wherein the controller is further configured to direct the internal combustion engine to operate in a cylinder deactivation (CDA) mode.

* * * * *